US010368200B2

United States Patent
Ryu et al.

(10) Patent No.: US 10,368,200 B2
(45) Date of Patent: Jul. 30, 2019

(54) DEVICE AND METHOD FOR POSITION MEASUREMENT IN WIRELESS COMMUNICATION SYSTEM

(71) Applicants: Samsung Electronics Co., Ltd, Suwon-si (KR); Research & Business Foundation Sungkyunkwan University, Suwon-si (KR)

(72) Inventors: Hyunseok Ryu, Yongin-si (KR); Hyung-Jin Choi, Seoul (KR); Kyung-Hoon Lee, Seoul (KR); Won-Jun Hwang, Suwon-si (KR); Seung-Hoon Park, Seoul (KR); Peng Xue, Suwon-si (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 15/565,661

(22) PCT Filed: Apr. 8, 2016

(86) PCT No.: PCT/KR2016/003706
§ 371 (c)(1),
(2) Date: Oct. 10, 2017

(87) PCT Pub. No.: WO2016/163803
PCT Pub. Date: Oct. 13, 2016

(65) Prior Publication Data
US 2018/0077529 A1  Mar. 15, 2018

(30) Foreign Application Priority Data
Apr. 10, 2015  (KR) .................. 10-2015-0050778

(51) Int. Cl.
*G01S 5/00* (2006.01)
*G01S 5/02* (2010.01)
(Continued)

(52) U.S. Cl.
CPC ........... *H04W 4/025* (2013.01); *G01S 5/0009* (2013.01); *G01S 5/0215* (2013.01); *G01S 5/0263* (2013.01);
(Continued)

(58) Field of Classification Search
CPC ....... H04W 64/00; H04W 4/02; H04W 4/023; H04W 4/025; H04W 4/026;
(Continued)

(56) References Cited

U.S. PATENT DOCUMENTS 6,266,014 B1  7/2001  Fattouche et al.
7,187,327 B2  3/2007  Coluzzi et al.
(Continued)

FOREIGN PATENT DOCUMENTS

WO  2013/172588 A1  11/2013
WO  2014/193372 A1  12/2014

OTHER PUBLICATIONS

"3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814 V9.0.0, Mar. 2010, 104 pages.
(Continued)

*Primary Examiner* — Nizar N Sivji

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). In particular, the present invention relates to an apparatus and method for position measurement in a wireless communication
(Continued)

system. An operating method of a terminal in the wireless communication system includes transmitting a signal for requesting for positioning, and receiving positioning signals for the positioning of the terminal from a plurality of other terminals.

17 Claims, 47 Drawing Sheets

(51) Int. Cl.
| | |
|---|---|
| G01S 5/06 | (2006.01) |
| G01S 5/10 | (2006.01) |
| G01S 5/12 | (2006.01) |
| G01S 5/14 | (2006.01) |
| H04W 4/02 | (2018.01) |
| H04W 56/00 | (2009.01) |
| H04W 64/00 | (2009.01) |
| H04W 76/14 | (2018.01) |

(52) U.S. Cl.
CPC .............. *G01S 5/0284* (2013.01); *G01S 5/10* (2013.01); *G01S 5/12* (2013.01); *G01S 5/14* (2013.01); *H04W 56/004* (2013.01); *H04W 64/006* (2013.01); *G01S 5/0072* (2013.01); *G01S 5/06* (2013.01); *H04W 76/14* (2018.02)

(58) Field of Classification Search
CPC . H04W 56/004; H04W 4/029; H04W 64/006; H04W 76/14; G01S 5/0284; G01S 5/0289; G01S 5/08; G01S 5/14; G01S 5/0018; G01S 5/0009; G01S 5/0215; G01S 5/0263; G01S 5/10; G01S 5/12; G01S 5/0072; G01S 5/06

See application file for complete search history.

(56) References Cited

U.S. PATENT DOCUMENTS

| | | |
|---|---|---|
| 2004/0080412 A1 | 4/2004 | Smith et al. |
| 2006/0009240 A1 | 1/2006 | Katz |
| 2014/0050482 A1 | 2/2014 | Berlin et al. |
| 2014/0141804 A1* | 5/2014 | Zelinka ................. G01S 5/0284 455/456.2 |
| 2014/0187259 A1* | 7/2014 | Kakani ................. H04W 64/00 455/456.1 |
| 2014/0269638 A1 | 9/2014 | Black et al. |
| 2015/0072708 A1 | 3/2015 | Lim et al. |
| 2015/0350855 A1* | 12/2015 | Huang ................... H04W 4/12 455/426.1 |
| 2015/0356449 A1* | 12/2015 | Vainstein ............... G06N 5/047 706/48 |
| 2016/0080921 A1* | 3/2016 | Yadav ................... H04W 4/008 455/404.2 |
| 2016/0183049 A1* | 6/2016 | Rotstein ................ H04W 64/00 455/456.1 |
| 2016/0192151 A1* | 6/2016 | Marri Sridhar ....... H04W 4/025 455/418 |
| 2017/0215166 A1* | 7/2017 | Disatnik ............. H04W 64/006 |

OTHER PUBLICATIONS

Intel Corporation, "Baseline simulation scenarios for indoor positioning enhancements", 3GPP TSG-RAN WG1 #78bis, Oct. 6-10, 2014, 9 pages, R1-143781.

LG Electronics et al., "WF on evaluation scenarios and assumptions for indoor positioning study", 3GPP TSG RAN WG1 #79, Nov. 17-21, 2014, 8 pages, R1-145396.

Francsco Benedetto et al., "Dynamic LOS/NLOS Statistical Discrimination of Wireless Mobile Channels", IEEE, 2007, 5 pages.

Arghavan Amini et al., "GPS-Free Cooperative Mobile Tracking with the Application in Vehicular Networks", IEEE, 2014, 6 pages.

Xin Zhou et al., "NLOS Error Mitigation in Mobile Location Based on Modified Extended Kalman Filter", IEEE Wireless Communications and Networking Conference: Mobile and Wireless Networks, 2012, 6 pages.

Wade H. Foy, "Position-Location Solutions by Taylor-Series Estimation", IEEE Transactions on Aerospace and Electronic Systems, vol. AES-12, No. 2, Mar. 1976, 8 pages.

Bertrand T. Fang, "Simple Solutions for Hyperbolic and Related Position Fixes", IEEE Transactions on Aerospace and Electronic Systems, vol. 26, No. 5, Sep. 1990, 6 pages.

International Search Report dated Jul. 25, 2016 in connection with International Patent Application No. PCT/KR2016/003706.

* cited by examiner

DEVICE AND METHOD FOR POSITION MEASUREMENT IN WIRELESS COMMUNICATION SYSTEM

CROSS-REFERENCE TO RELATED APPLICATIONS AND CLAIM OF PRIORITY

The present application claims priority under 35 U.S.C. § 365 to International Patent Application No. PCT/KR2016/003706 filed Apr. 8, 2016, which claims priority to Korean Patent Application No. 10-2015-0050778, which was filed on Apr. 10, 2015, each of which are incorporated herein by reference into the present disclosure as if fully set forth herein.

BACKGROUND

The present invention relates to an apparatus and method for position measurement in a wireless communication system.

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Along with the development of the mobile communication technology, a portion of mobile communication users is rapidly increasing. Accordingly, the mobile communication users have a growing interest in public safety, and a technical field related to positioning of the users are drawing attention at present as a representative technical field related to the public safety of the mobile communication users. In this situation, there is ongoing research on various techniques for positioning of the mobile communication users, and various attempts are currently being made to improve positioning performance of the mobile communication users.

SUMMARY

One exemplary embodiment of the present invention provides an apparatus and method for position measurement in a wireless communication system.

Another exemplary embodiment of the present invention provides an apparatus and method for performing position measurement based on a relationship with adjacent devices in a wireless communication system.

Another exemplary embodiment of the present invention provides an apparatus and method for performing position measurement based on a relationship with adjacent base stations in a wireless communication system.

Another exemplary embodiment of the present invention provides an apparatus and method for performing position measurement based on a relationship with adjacent terminals in a wireless communication system.

Another exemplary embodiment of the present invention provides an apparatus and method for performing 2-dimensional position measurement based on a relationship with adjacent base stations in a wireless communication system.

Another exemplary embodiment of the present invention provides an apparatus and method for performing 2-dimensional position measurement based on a relationship with adjacent terminals in a wireless communication system.

Another exemplary embodiment of the present invention provides an apparatus and method for performing 3-dimensional position measurement based on a relationship with adjacent base stations in a wireless communication system.

Another exemplary embodiment of the present invention provides an apparatus and method for performing 3-dimensional position measurement based on a relationship with adjacent terminals in a wireless communication system.

According to an exemplary embodiment of the present invention, an operating method of a terminal in a wireless communication system includes transmitting a signal for requesting for positioning, and receiving positioning signals for the positioning of the terminal from a plurality of other terminals.

According to another exemplary embodiment of the present invention, an operating method of a terminal in a wireless communication system includes receiving a signal for requesting for positioning, and transmitting to a other terminal a positioning signal for the positioning of the other terminal.

According to another exemplary embodiment of the present invention, an operating method of a base station in a wireless communication system includes receiving from a terminal a first signal for requesting for positioning, and transmitting to a plurality of other terminals a second signal for requesting for transmission of a positioning signal for the positioning of the terminal.

According to another exemplary embodiment of the present invention, a method for determining a position of a terminal in a wireless communication system includes acquiring at least one positioning parameter, determining a first part of position information of the terminal on the basis of the at least one positioning parameter, and determining a second part of the position information of the terminal on the basis of the first part.

Since positioning is performed according to an exemplary embodiment of the present invention, accuracy of the positioning can be improved. At the same time, since 3-dimensional position determination is performed, usability on measured position information can be increased. Further, convenience of users who use various application services based on a positioning technique can be significantly improved.

DETAILED DESCRIPTION

Figure 1:
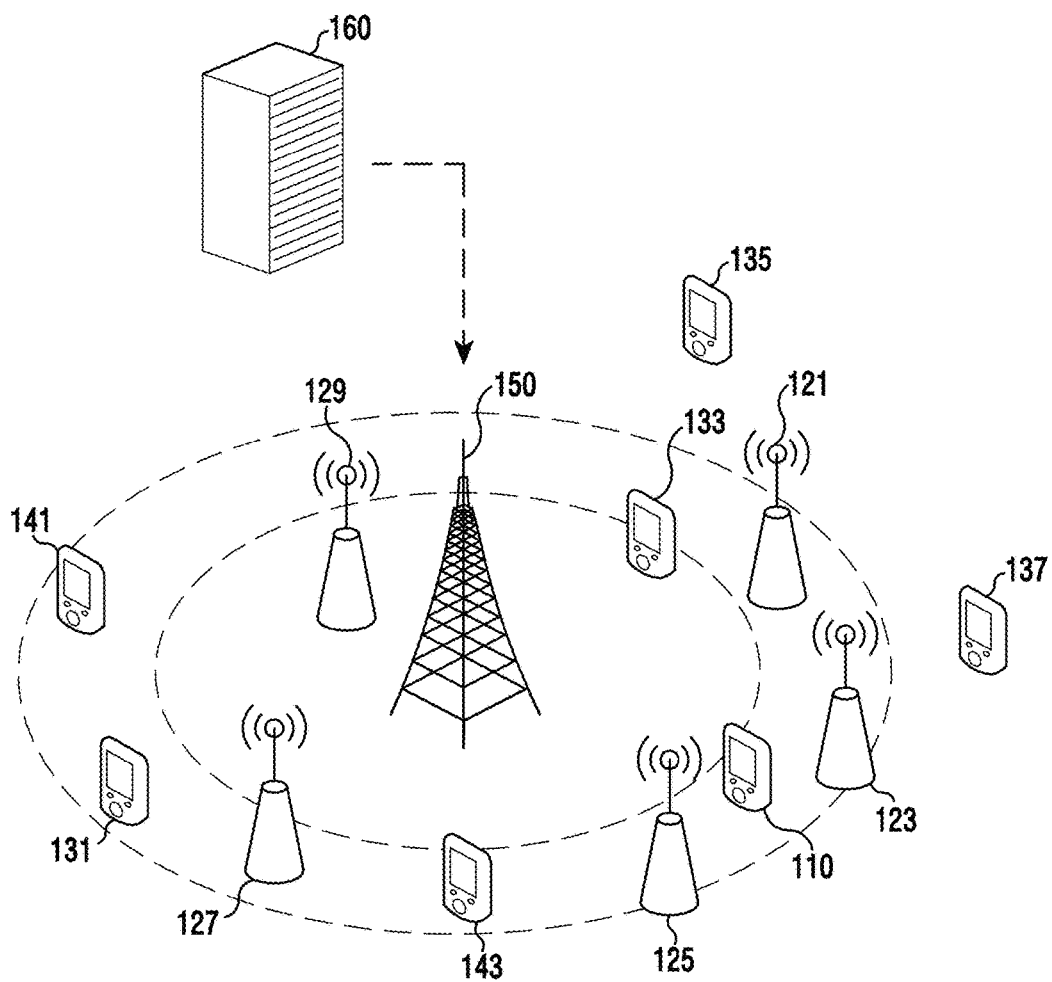
FIG. 1 illustrates a structure of a communication network in a wireless communication system according to exemplary embodiments of the present invention.

The present invention will be described herein below with reference to the accompanying drawings. In the following description, well-known functions or constructions are not described in detail since they would obscure the invention in unnecessary detail. In addition, since the terms used herein are defined according to the functions of the present invention, the terms may vary depending on user's or operator's intension and usage. Therefore, the terms used herein must be understood based on the descriptions made herein.

While various exemplary embodiments of the present invention are susceptible to various modifications and alternative forms, a specific embodiment thereof has been shown by way of example in the drawings and will herein be described in detail. It should be understood, however, that it is not intended to limit the various exemplary embodiments of the present invention to the particular form disclosed, but, on the contrary, the various exemplary embodiments of the present invention are to cover all modifications and/or equivalents and alternatives falling within the spirit and scope of the various exemplary embodiments of the present invention as defined by the appended claims. Like reference numerals denote like constitutional elements throughout the drawings.

The expression "include" or "may include" used in the various exemplary embodiments of the present disclosure is intended to indicate a presence of a corresponding function, operation, or constitutional element disclosed herein, and it is not intended to limit a presence of one or more functions, operations, or constitutional elements. In addition, in the various exemplary embodiments of the present disclosure, the term "include" or "have" is intended to indicate that characteristics, numbers, steps, operations, constitutional elements, and components disclosed in the specification or combinations thereof exist, and thus should be understood that there are additional possibilities of one or more other characteristics, numbers, steps, operations, constitutional elements, components or combinations thereof.

In the various exemplary embodiments of the present disclosure, an expression "or" includes any and all combinations of words enumerated together. For example, "A or B" may include A or B, or may include both A and B.

In the various exemplary embodiments of the present disclosure, although expressions such as "$1^{st}$", "$2^{nd}$", "first", and "second" may be used to express various constitutional elements of the present disclosure, it is not intended to limit the corresponding constitutional elements. For example, the above expressions are not intended to limit an order or an importance of the corresponding constitutional elements. The above expressions may be used to distinguish one constitutional element from another constitutional element. For example, a $1^{st}$ user device and a $2^{nd}$ user device are both user devices, and indicate other user devices. For example, a $1^{st}$ constitutional element may be termed a $2^{nd}$ constitutional element, and similarly, the $2^{nd}$ constitutional element may be termed the $1^{st}$ constitutional element without departing from the scope of the present disclosure.

When a constitutional element is mentioned as being "connected" to or "accessing" another constitutional element, this may mean that it is directly connected to or accessing the other constitutional element, but it is to be understood that there are no intervening constitutional elements present. On the other hand, when a constitutional element is mentioned as being "directly connected" to or "directly accessing" another constitutional element, it is to be understood that there are no intervening constitutional elements present.

The terminology used in the various exemplary embodiments of the present disclosure is for the purpose of describing particular exemplary embodiments only and is not intended to be limiting of the present disclosure. A singular expression includes a plural expression unless there is a contextually distinctive difference therebetween.

Unless otherwise defined, all terms (including technical and scientific terms) used herein have the same meaning as commonly understood by those ordinarily skilled in the art to which the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Through the following description, an apparatus and method for position measurement in a wireless communication system will be explained.

A wireless communication system according to an exemplary embodiment of the present invention may include a cellular system, e.g., a wireless communication system conforming to a Long Term Evolution (LTE) standard or a wireless communication system conforming to a Word interoperability for Microwave Access (WiMAX) standard. In addition, the wireless communication system includes a base station and a terminal. The base station may be referred to as an evolved NodeB (eNB). The terminal may be referred to as a User Equipment (UE).

FIG. 1 illustrates a structure of a communication network in a wireless communication system according to exemplary embodiments of the present invention. Referring to FIG. 1, the communication network may include a plurality of UEs, a plurality of eNBs, and a position determining device. The communication network may include a UE 110 which intends to measure its position, UEs 121, 123, 125, 127, and 129 of which a position is fixed among the plurality of UEs adjacent to the UE 110, UEs 131, 133, 135, and 137 of which a position is not fixed but is known among the plurality of UEs adjacent to the UE 110, UEs 141 and 143 of which a position is not fixed and is not known among the plurality of UEs adjacent to the UE 110, and a position determining device 160.

Herein, the UE 110 may be referred to as a positioning UE or simply a UE, and the plurality of UEs 121, 123, 125, 127, 129, 131, 133, 135, 137, 141, and 143 adjacent to the positioning request UE 110 may be referred to as an adjacent UE. The plurality of UEs 110, 121, 123, 125, 127, 129, 131, 133, 135, 137, 141, and 143 included in the communication network may be coupled to the eNB 150, and may perform wireless communication with the eNB 150. In addition, the position determining device 160 may include a device such as a server device and an Evolved Serving Mobile Location Center (E-SMLC), and may perform communication by being coupled with the eNB in a wired manner.

In addition, the plurality of UEs 110, 121, 123, 125, 127, 129, 131, 133, 135, 137, 141, and 143 included in the communication network may be a portable electronic device having a wireless access function such as a smart phone. For another example, the plurality of UEs may be one of a portable terminal, a mobile phone, a mobile pad, a tablet computer, a handheld computer, and a Personal Digital Assistant (PDA). For another example, the plurality of UEs may be one of a wireless access-enabled media player, a camera, a speaker, and a smart television. For another example, the plurality of UEs may be a wearable electronic device such as a smart watch and a smart glass. For another example, the plurality of UEs may be a Point Of Sales (POS) device or a beacon device. For another example, the plurality of UEs may be a device implemented by combining two or more functions of the aforementioned devices.

In this case, the UE 110 may determine its position by interworking with the plurality of adjacent UEs 121, 123, 125, 127, 129, 131, 133, 135, 137, 141, and 143, the eNB 150, and the position determining device 160.

Figure 2:
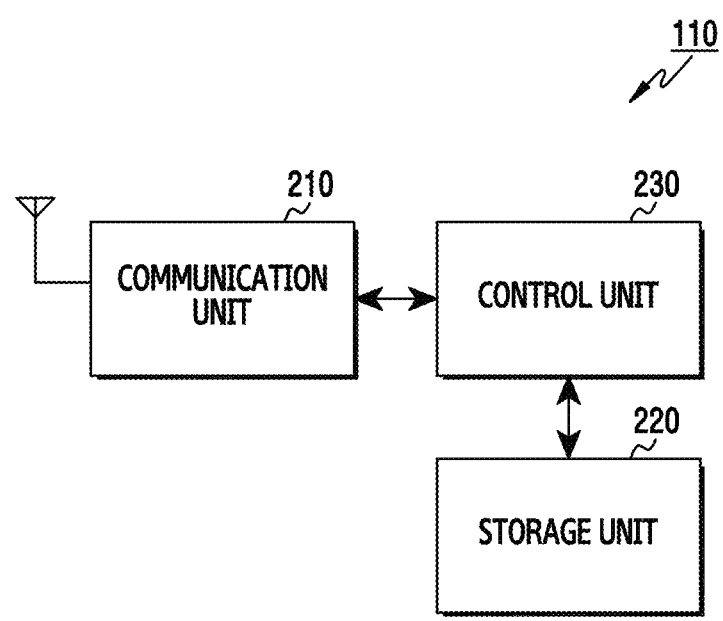
FIG. 2 is a block diagram of a terminal device in a wireless communication system according to exemplary embodiments of the present invention.

FIG. 2 is a block diagram of a terminal device in a wireless communication system according to exemplary embodiments of the present invention. Although it is described herein that the terminal device is the UE 110 for convenience of explanation, the present invention is not limited thereto. For example, the terminal device may be the UEs 121 to 129, the UEs 131 to 137, or the UEs 141 to 143.

Referring to FIG. 2, the UE 110 includes a communication unit 210, a storage unit 220, and a control unit 230. Hereinafter, the term ' . . . unit', ' . . . device', or the like implies a unit of processing at least one function or operation, and may be implemented in hardware or software or in combination of the hardware and the software.

The communication unit 210 performs functions for transmitting and receiving a signal through a radio channel. For example, the communication unit 210 performs a function of conversion between a baseband signal and a bit-stream according to a physical layer standard of a system. For example, in data transmission, the communication unit 210 generates complex symbols by coding and modulating a transmission bit-stream. In addition, in data reception, the communication unit 210 restores a reception bit-stream by demodulating and decoding a baseband signal. In addition, the communication unit 210 up-converts a baseband signal into a Radio Frequency (RF) signal and thereafter transmits it through an antenna, and down-converts an RF signal received through the antenna into a baseband signal. For example, the communication unit 210 may include a transmission filter, a reception filter, an amplifier, a mixer, an oscillator, a Digital to Analog Convertor (DAC), an Analog to Digital Convertor (ADC), or the like.

In addition, the communication unit 210 may include a plurality of RF chains. Further, the communication unit 210 may perform beamforming. For the beamforming, the communication unit 210 may adjust a phase and magnitude of each of signals transmitted and received through a plurality of antennas or antenna elements.

The communication unit 210 transmits and receives a signal as described above. Accordingly, the communication unit 210 may be referred to as a transmitter, a receiver, or a transceiver.

The storage unit 220 stores data such as a basic program, application program, configuration information, or the like for an operation of the UE 110. In addition, the storage unit 220 provides the stored data at the request of the control unit 230.

The control unit 230 controls overall operations of the UE 110. For example, the control unit 230 transmits and receives a signal via the communication unit 210. Further, the control unit 230 writes data to the storage unit 220 and reads the data. For this, the control unit 230 may include at least one processor. For example, the control unit 230 may control the UE 110 to perform procedures shown in FIG. 14 to FIG. 16 and FIG. 29 or the like, and may control the UEs 121 to 129 or the UEs 131 to 137 to perform procedures shown in FIG. 17 to FIG. 19 or the like.

Figure 3:
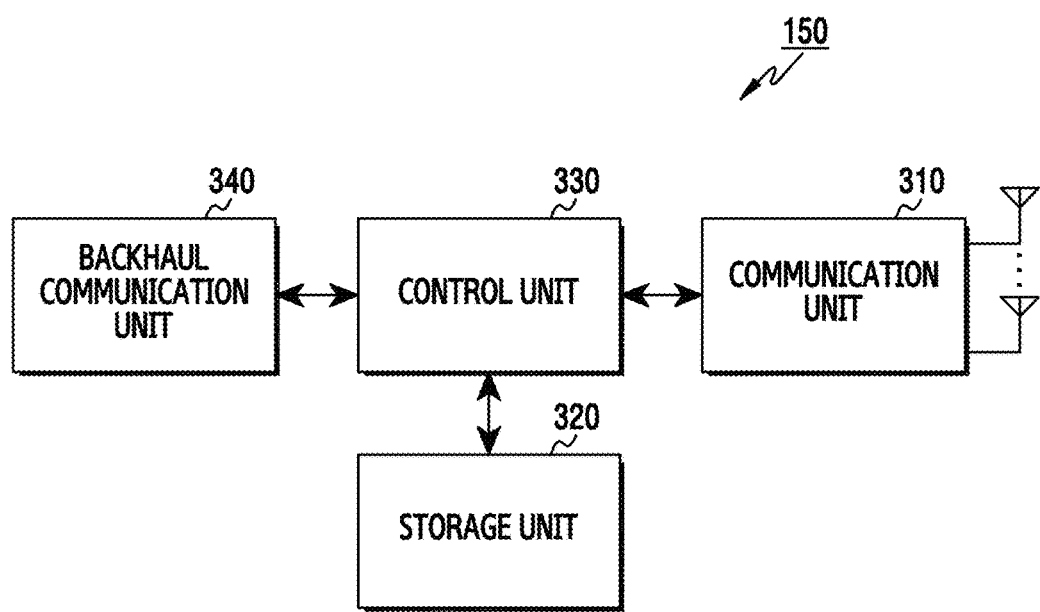
FIG. 3 is a block diagram of a base station in a wireless communication system according to exemplary embodiments of the present invention.

FIG. 3 is a block diagram of a base station in a wireless communication system according to exemplary embodiments of the present invention.

Referring to FIG. 3, the eNB 150 includes a communication unit 310, a storage unit 320, a control unit 330, and a backhaul communication unit 340. Hereinafter, the term ' . . . unit', ' . . . device', or the like implies a unit of processing at least one function or operation, and may be implemented in hardware or software or in combination of the hardware and the software.

The communication unit 310 performs functions for transmitting and receiving a signal through a radio channel. For example, the communication unit 310 performs a function of conversion between a baseband signal and a bit-stream according to a physical layer standard of a system. For example, in data transmission, the communication unit 310 generates complex symbols by coding and modulating a transmission bit-stream. In addition, in data reception, the communication unit 310 restores a reception bit-stream by demodulating and decoding a baseband signal. In addition, the communication unit 310 up-converts a baseband signal into an RF signal and thereafter transmits it through an antenna, and down-converts an RF signal received through the antenna into a baseband signal. For example, the communication unit 310 may include a transmission filter, a reception filter, an amplifier, a mixer, an oscillator, a DAC, an ADC, and the like.

In addition, the communication unit 310 may include a plurality of RF chains. Further, the communication unit 310 may perform beamforming. For beamforming, the communication unit 310 may adjust a phase and magnitude of each of signals transmitted and received through a plurality of antennas or antenna elements.

The communication unit 310 transmits and receives a signal as described above. Accordingly, the communication unit 310 may be referred to as a transmitter, a receiver, or a transceiver.

The storage unit 320 stores data such as a basic program, application program, configuration information, or the like for an operation of the eNB 150. In addition, the storage unit 320 provides stored data at the request of the control unit 330.

The control unit 330 controls overall operations of the eNB 150. For example, the control unit 330 transmits and receives a signal via the communication unit 310. Further, the control unit 330 writes data to the storage unit 320 and reads the data. For this, the control unit 330 may include at least one processor. For example, the control unit 330 may control the eNB 150 to perform procedures shown in FIG. 20, FIG. 21, FIG. 30, or the like.

In addition, the backhaul communication unit 340 provides an interface for performing communication with other nodes in a network. That is, the backhaul communication unit 340 converts a bit-stream transmitted from the eNB 150 to another node, e.g., another eNB, core network, and the like, into a physical signal, and converts a physical signal received from the another node into a bit-stream.

Figure 4:
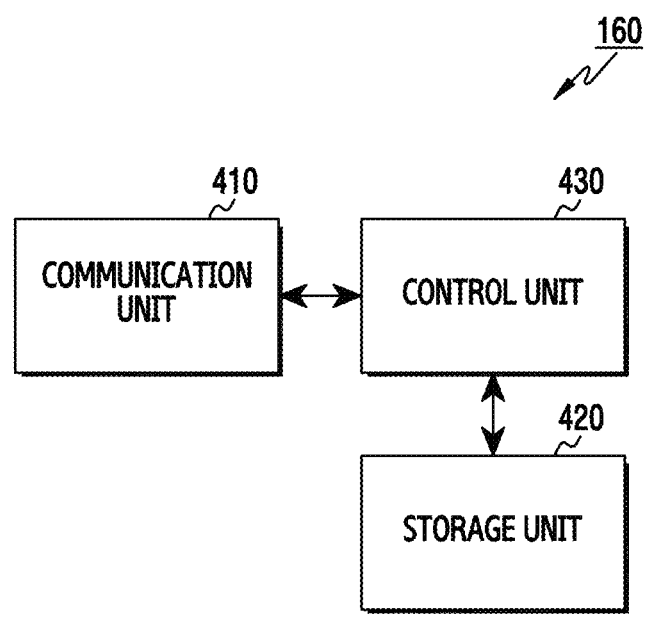
FIG. 4 is a block diagram of a position determining device in a wireless communication system according to exemplary embodiments of the present invention.

FIG. 4 is a block diagram of a position determining device in a wireless communication system according to exemplary embodiments of the present invention.

Referring to FIG. 4, the position determining device 160 includes a communication unit 410, a storage unit 420, and a control unit 430. Hereinafter, the term ' . . . unit', ' . . . device', or the like implies a unit of processing at least one function or operation, and may be implemented in hardware or software or in combination of the hardware and the software.

In particular, the communication unit 410 converts a bit-stream transmitted from the position determining device 160 to another node, e.g., an eNB, a core network, an authentication server, or the like, into a physical signal, and converts a physical signal received from the another node into a bit-stream. That is, the communication unit 410 may transmit and receive a signal. Accordingly, the communication unit 410 may be referred to as a transmitter, a receiver, or a transceiver.

The storage unit 420 stores data such as a basic program, application program, configuration information, or the like for an operation of the position determining device 160. In particular, the storage unit 420 stores serving cell management information of UEs. The serving cell management information may include a serving cell list of each of the UEs, radio link quality information for each serving cell, load level information for each serving cell, or the like, and may be configured in a table form. In addition, the storage unit 420 provides stored data at the request of the control unit 430.

The control unit 430 controls overall operations of the position determining device 160. For example, the control unit 430 transmits and receives a signal via the communication unit 410. Further, the control unit 430 writes data to the storage unit 420 and reads the data. According to the exemplary embodiment of the present invention, the control unit 430 controls the position determining device 160 to perform procedures shown in FIG. 22 and FIG. 31 to FIG. 32.

Figure 5A:
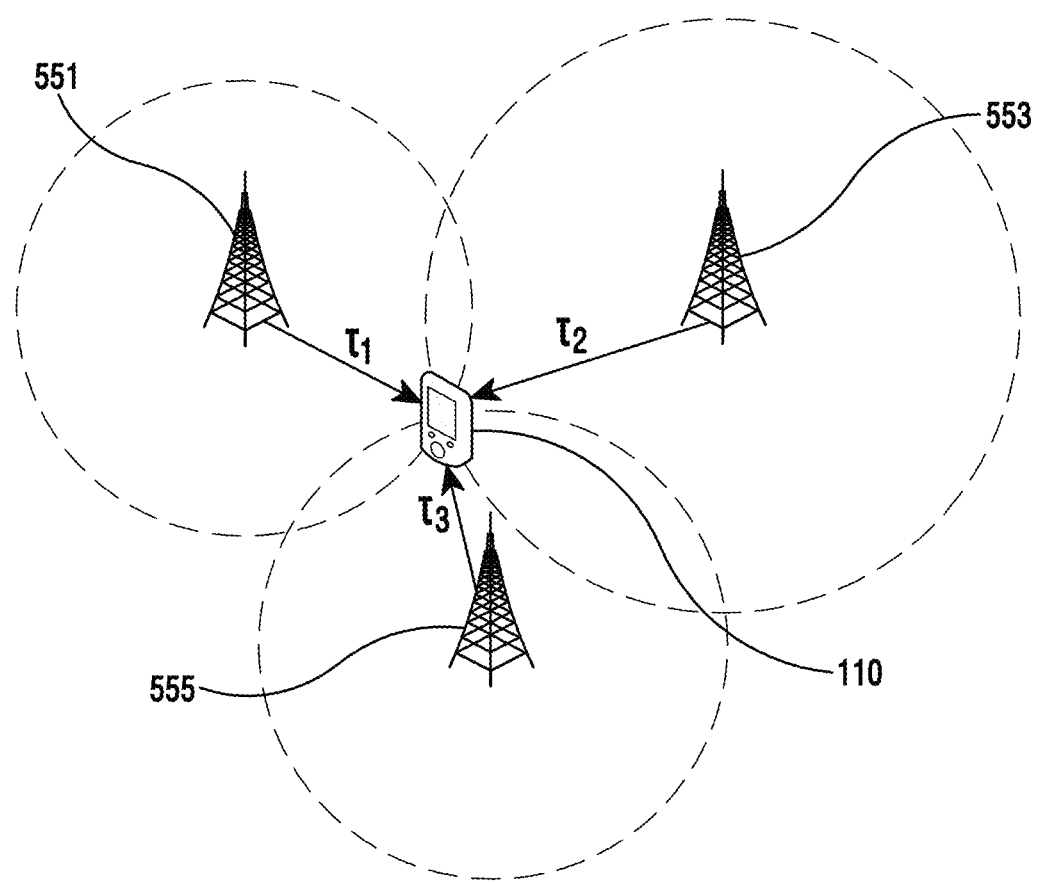
FIG. 5A and FIG. 5B illustrate a method of determining a position of a user equipment (UE) in a wireless communication system according to exemplary embodiments of the present invention.
Figure 5B:
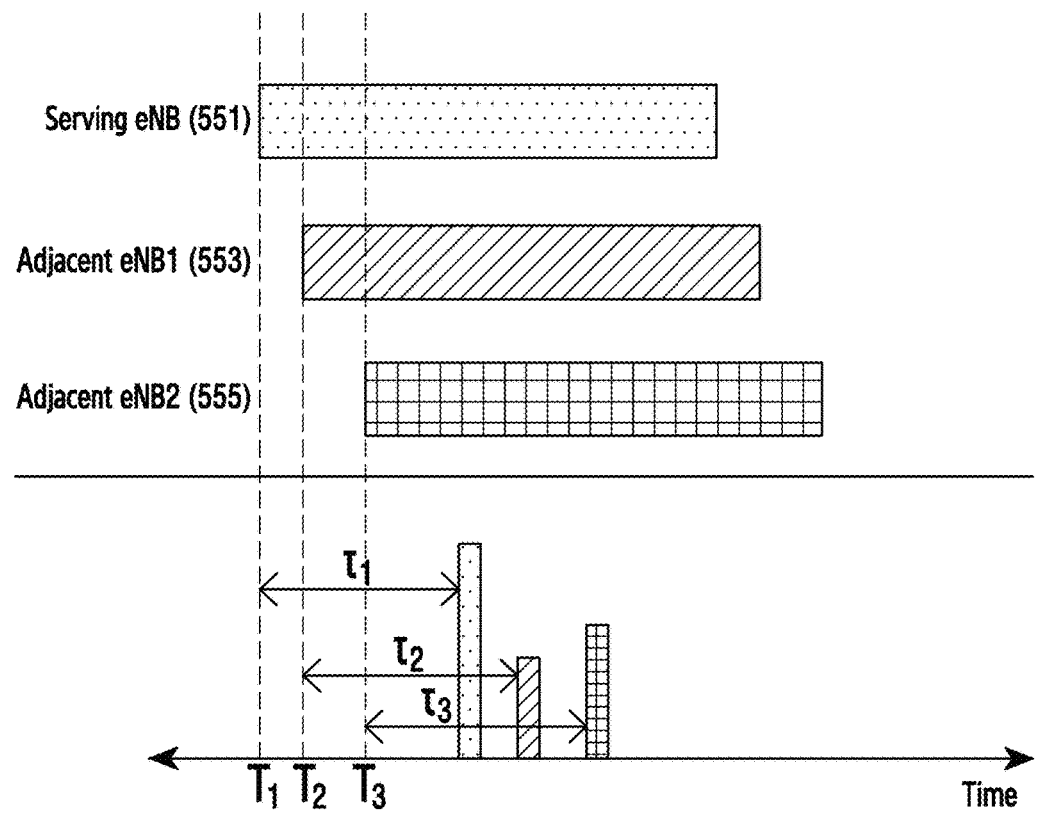

FIG. 5A and FIG. 5B illustrate a method of determining a position of a UE in a wireless communication system according to exemplary embodiments of the present invention.

Referring to FIG. 5A, the UE 110 may measure a position by performing communication with a serving eNB 551, an adjacent eNB-1 553, and an adjacent eNB-2 555. More specifically, the serving eNB 551 may transmit to the UE 110 a $1^{st}$ positioning signal for positioning of the UE 110 at a time point $T_1$. In response thereto, the UE 110 may receive the $1^{st}$ positioning signal at a time point delayed by $\tau_1$ from the time point $T_1$. In addition, the adjacent eNB-1 553 may transmit to the UE 110 a $2^{nd}$ positioning signal for positioning of the UE 110 at a time point $T_2$, and in response thereto, the UE 110 may receive the $2^{nd}$ positioning signal at a time point delayed by $\tau_2$ from the time point $T_2$. In addition, the adjacent eNB-2 555 may transmit to the UE 110 a $3^{rd}$ positioning signal for positioning of the UE 110 at a time point $T_3$, and in response thereto, the UE 110 may receive the $3^{rd}$ positioning signal at a time point delayed by $\tau_3$ from the time point $T_3$. Herein, the $1^{st}$ positioning signal, the $2^{nd}$ positioning signal, and the $3^{rd}$ positioning signal are signals for measuring the position of the UE 110. For example, the $1^{st}$ positioning signal, the $2^{nd}$ positioning signal, and the $3^{rd}$ positioning signal may be a signal designed for the purpose of positioning. The $1^{st}$ positioning signal, the $2^{nd}$ positioning signal, and the $3^{rd}$ positioning signal may be a Positioning Reference Signal (PRS). The PRS may be constructed of a Pseudo Random Binary Sequence (PRBS). The PRS may be a D2D-PRS. For another example, it may be a signal for an additional purpose (e.g., channel estimation, synchronization acquisition). The $1^{st}$ positioning signal, the $2^{nd}$ positioning signal, and the $3^{rd}$ positioning signal may include at least one of a reference signal, a synchronization signal, a preamble, and a pilot signal.

In addition, the UE 110 may transmit to the serving eNB 551 a time point $T_1+\tau_1$ at which the $1^{st}$ positioning signal is received, may transmit to the adjacent eNB-1 553 a time point $T_2+\tau_2$ at which the $2^{nd}$ positioning signal is received, and may transmit to the adjacent eNB-2 555 a time point $T_3+\tau_3$ at which the $3^{rd}$ positioning signal is received. Accordingly, the serving eNB 551 may calculate a difference $\tau_1$ between the value $T_1+\tau_1$ received from the UE 110 and the value of the time point $T_1$ at which the serving eNB 551 transmits the 1st positioning signal, and thereafter may calculate a $1^{st}$ distance between the serving eNB 551 and the UE 110 on the basis of the value $\tau_1$ and the velocity of light (about $3.0 \times 10^8$ m/s).

In addition, the adjacent eNB-1 553 may calculate a difference $\tau_2$ between the value $T_2+\tau_2$ received from the UE 110 and the value of the time point $T_2$ at which the adjacent eNB-1 553 transmits the $2^{nd}$ positioning signal, and thereafter may calculate a $2^{nd}$ distance between the adjacent eNB-1 553 and the UE 110 on the basis of the value $\tau_2$ and the velocity of light. In addition, the adjacent eNB-2 555 may calculate a difference $\tau_3$ between the value $T_3+\tau_3$ received from the UE 110 and the value of the time point $T_3$ at which the adjacent eNB-2 555 transmits the $3^{rd}$ positioning signal, and thereafter may calculate a $3^{rd}$ distance between the adjacent eNB-2 555 and the UE 110 on the basis of the value $\tau_3$ and the velocity of light.

In addition, the serving eNB 551 may transmit the $1^{st}$ distance to a position determining device (not shown in FIG. 5A), e.g., a server device, the adjacent eNB-1 553 may transmit the $2^{nd}$ distance to the position determining device, and the adjacent eNB-2 555 may transmit the $3^{rd}$ distance to the position determining device. According to the exemplary embodiment of the present invention, it may be assumed that the position determining device recognizes in advance a coordinate on a 2-dimensional plane of the serving eNB 551, the adjacent eNB-1 553, and the adjacent eNB-2 555. Therefore, the position determining device may determine a coordinate corresponding to a point of contact of a circle centered on the coordinate of the serving eNB 551 and having a radius corresponding to the $1^{st}$ distance value, a circle centered on the coordinate of the adjacent eNB-1 553 and having a radius corresponding to the $2^{nd}$ distance value, and a circle centered on the coordinate of the adjacent eNB-2 555 and having a radius corresponding to the $3^{rd}$ distance value as the position of the UE 110. In addition, such a positioning method may be referred to as a Time Of Arrival (TOA) method.

According to the exemplary embodiment of the present invention, the position of the UE 110 may be determined by a positioning determining device. However, according to another exemplary embodiment of the present invention, one of eNBs (e.g., the serving eNB 551) adjacent to the UE 110 may determine the position of the UE 110 by receiving the $2^{nd}$ distance value and the $3^{rd}$ distance value respectively from the adjacent eNB-1 553 and the adjacent eNB-2 555.

In addition, for convenience of explanation, the position determining process has been described under the assumption that the UE 110 is located on the 2-dimensional plane. However, the present invention is not limited thereto, and thus the UE 110 may receive positioning signals respectively from four or more adjacent eNBs, and a 3-dimensional position of the UE 110 may be determined on the basis of the positioning signals.

Figure 6A:
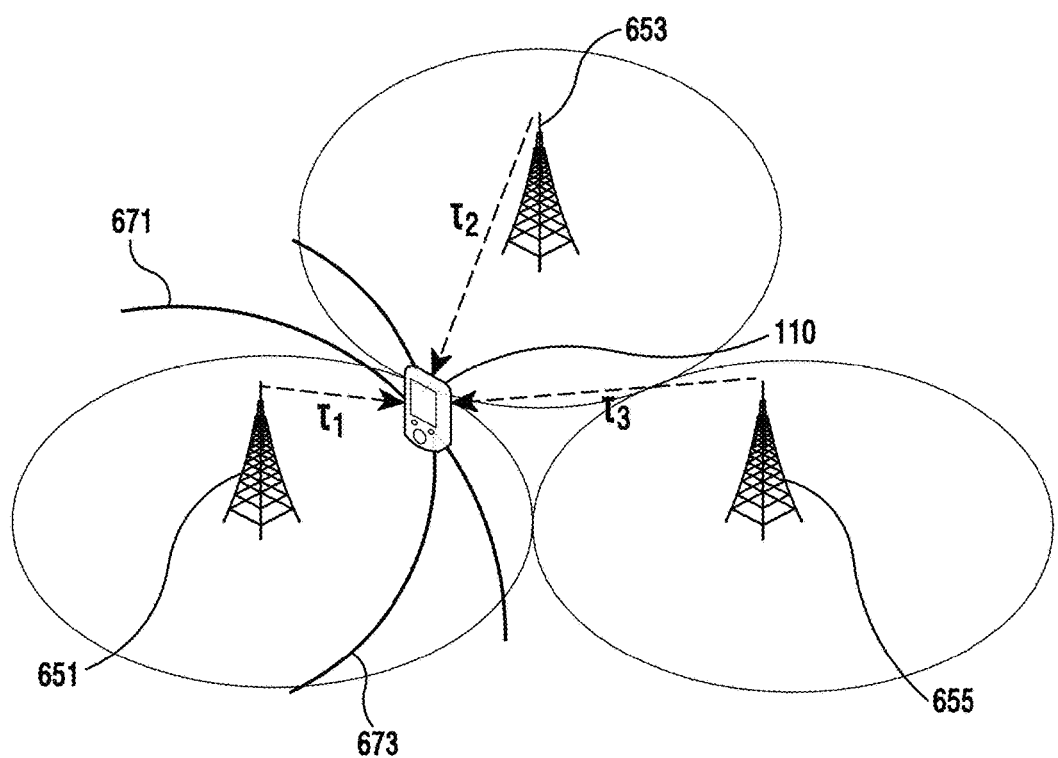
FIG. 6A and FIG. 6B illustrate a method of determining a position of a UE in a wireless communication system according to other exemplary embodiments of the present invention.
Figure 6B:
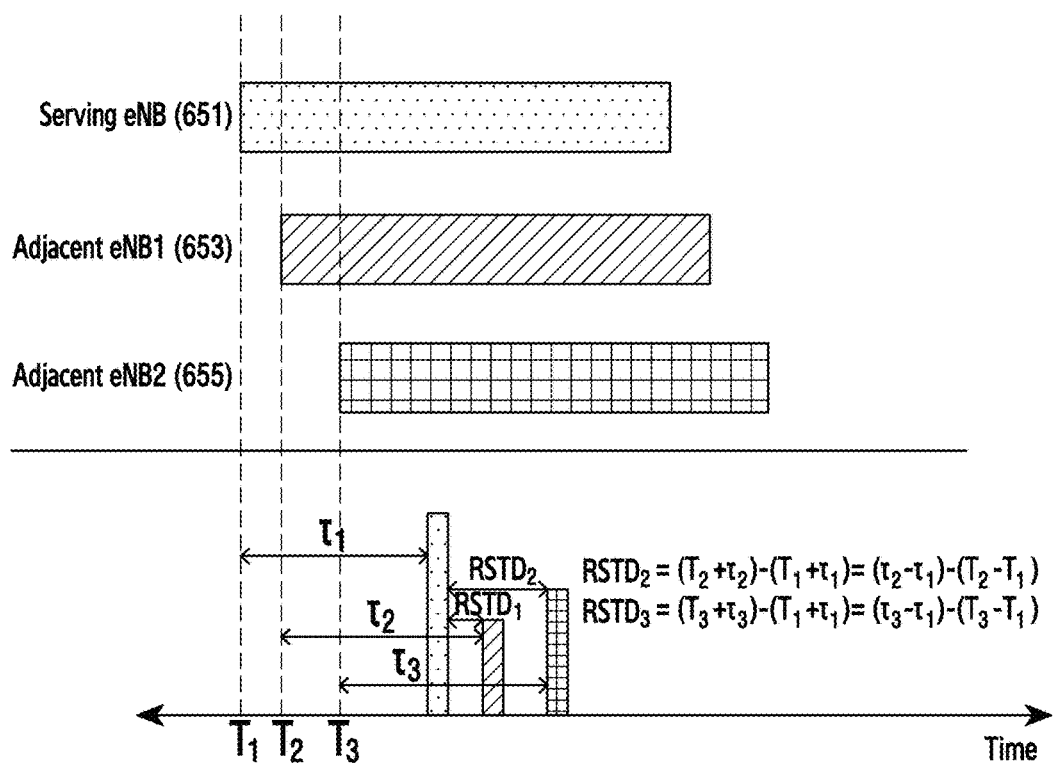

FIG. 6A and FIG. 6B illustrate a method of determining a position of a UE in a wireless communication system according to other exemplary embodiments of the present invention.

Referring to FIG. 6A, the UE 110 may measure a position by performing communication with a serving eNB 651, an adjacent eNB-1 653, and an adjacent eNB-2 655. More specifically, the serving eNB 651 may transmit to the UE 110 a $1^{st}$ positioning signal for positioning of the UE 110 at a time point $T_1$. In response thereto, the UE 110 may receive the $1^{st}$ positioning signal at a time point delayed by $\tau_1$ from the time point $T_1$. In addition, the adjacent eNB-1 653 may transmit to the UE 110 a $2^{nd}$ positioning signal for positioning of the UE 110 at a time point $T_2$, and in response thereto, the UE 110 may receive the $2^{nd}$ positioning signal at a time point delayed by $\tau_2$ from the time point $T_2$. In addition, the adjacent eNB-2 655 may transmit to the UE 110 a $3^{rd}$ positioning signal for positioning of the UE 110 at a time point $T_3$, and in response thereto, the UE 110 may receive the $3^{rd}$ positioning signal at a time point delayed by $\tau_3$ from the time point $T_3$. Herein, the $1^{st}$ positioning signal, the $2^{nd}$ positioning signal, and the $3^{rd}$ positioning signal may respectively include reference signals as signals for measuring the position of the UE 110.

According to the exemplary embodiment of the present invention, the UE 110 may determine a value $RSTD_i$ corresponding to a difference between a time point $T_1+\tau_1$ at which the UE 110 receives the $1^{st}$ positioning signal and time points at which positioning signals transmitted by adjacent eNBs are received on the basis of the time point $T_1+\tau_1$ at which the $1^{st}$ positioning signal is received, a time point $T_2+\tau_2$ at which the $2^{nd}$ positioning signal is received, and a time point $T_3+\tau_3$ at which the $3^{rd}$ positioning signal is received. In addition, the UE 110 may transmit each of the determined values $RSTD_i$ to the eNB 651 or the eNB 653. Upon receiving each value $RSTD_i$, the eNB may transmit each of the values $RSTD_i$ to a position determining device (not shown in FIG. 6A), e.g., a server device. Specifically, the value $RSTD_i$ is determined by Equation (1) below.

$$RSTD_i = (T_i + \tau_i) - (T_1 + \tau_1) = (\tau_i - \tau_1) + (T_i - T_1) \quad (1)$$

Herein, i denotes an index corresponding to eNBs adjacent to a UE subjected to positioning. According to the exemplary embodiment of the present invention, i may be determined as an integer value greater than or equal to 2. In addition, $T_i$ denotes a time point at which an $i^{th}$ eNB adjacent to the UE subjected to positioning transmits a positioning signal, and $\tau_i$ denotes a propagation delay time corresponding to a difference between a time point at which the $i^{th}$ eNB adjacent to the UE subjected to positioning transmits the positioning signal and a time point at which the UE subjected to positioning receives the positioning signal. In addition, $T_i$ denotes a time point at which a serving eNB of the UE subjected to positioning transmits a positioning signal, and $\tau_i$ denotes a propagation delay time corresponding to a difference between a time point at which the serving eNB transmits the positioning signal and a time point at which the UE subjected to positioning receives the positioning signal.

According to another exemplary embodiment of the present invention, the UE 110 may transmit to the serving eNB 651 a time point $T_1+\tau_1$ at which the $1^{st}$ positioning signal is received, may transmit to the adjacent eNB-1 653 a time point $T_2+\tau_2$ at which the $2^{nd}$ positioning signal is received, and may transmit to the adjacent eNB-2 655 a time point $T_3+\tau_3$ at which the $3^{rd}$ positioning signal is received. Accordingly, the serving eNB 651 may transmit the value $T_1+\tau_1$ received from the UE 110 to a position determining device (not shown in FIG. 6A), for example, a server device, the adjacent eNB-1 653 may transmit the value $T_2+\tau_2$ received from the UE 110 to the position determining device, and the adjacent eNB-2 655 may transmit the value $T_3+\tau_3$ received from the UE 110 to the position determining device. In this case, the position determining device may determine a value $RSTD_i$ corresponding to a difference between a time point at which the UE 110 receives the $1^{st}$ positioning signal and time points at which positioning signals transmitted by the adjacent eNBs are received.

According to the exemplary embodiment of the present invention, in case of Equation (1) above, although it is described that the $RSTD_i$ is determined on the basis of the time point $T_1+\tau_1$ at which the UE 110 receives the $1^{st}$ positioning signal, this is for exemplary purposes only. Thus, the $RSTD_i$ may be determined on the basis of the time point $T_2+\tau_2$ at which the UE 110 receives the $2^{nd}$ positioning signal and the time point $T_3+\tau_3$ at which the UE 110 receives the $3^{rd}$ positioning signal.

In addition, it may be assumed that the position determining device knows in advance a value $T_i-T_1$ in Equation (1) above, and a value $TDOA_i$ obtained by eliminating the term $T_i-T_1$ in Equation (1) above may be determined by Equation (2) below.

$$\begin{aligned} TDOA_i &= \tau_i - \tau_1 \\ &= \sqrt{(x_{UE}-x_i)^2+(y_{UE}-y_i)^2}\big/c - \\ &\quad \sqrt{(x_{UE}-x_1)^2+(y_{UE}-y_1)^2}\big/c \end{aligned} \quad (2)$$

Herein, i denotes an index corresponding to eNBs adjacent to a UE subjected to positioning. According to the exemplary embodiment of the present invention, i may be determined as an integer value greater than or equal to 2. In addition, $\tau_i$ denotes a propagation delay time corresponding to a difference between a time point at which an $i^{th}$ eNB adjacent to the UE subjected to positioning transmits the positioning signal and a time point at which the UE subjected to positioning receives the positioning signal, and $\tau_i$ denotes a propagation delay time corresponding to a difference between a time point at which the serving eNB of the UE subjected to positioning transmits the positioning signal and a time point at which the UE subjected to positioning receives the positioning signal. In addition, $(x_1, y_1)$ denotes a coordinate on a 2-dimensional plane of the serving eNB, and $(x_{UE}, y_{UE})$ denotes a coordinate on a 2-dimensional plane of the UE subjected to positioning. In addition, c denotes the velocity of light.

Accordingly, under the assumption that a coordinate $(x_1, y_1)$ on a 2-dimensional plane of the serving eNB 651 is recognized, the position determining device may determine a $1^{st}$ hyperbolic equation corresponding to a value $TDOA_1$, may determine a $2^{nd}$ hyperbolic equation corresponding to a value $TDOA_2$ and may geometrically determine a position of the UE 110 corresponding to a point of contact of the $1^{st}$ hyperbola and the $2^{nd}$ hyperbola. A detailed computation process of determining the position of the UE 110 on the basis of the value $TDOA_i$ will be determined below in greater detail with reference to FIG. 25.

Although it is described above that the position determining device directly determines the values $RSTD_i$ and $TDOA_i$, optionally, the serving eNB 651 may calculate the value $\tau_1$ and transmit it to the position determining device, the adjacent eNB-1 653 may calculate the value $\tau_2$ and transmit it to the position determining device, and the adjacent eNB-2 655 may calculate the value $\tau_3$ and transmits it to the position determining device. As a result, the position determining device may directly determine the value $TDOA_i$ on the basis of the values $\tau_1$, $\tau_2$, and $\tau_3$. Such a positioning method may be referred to as a Time Difference Of Arrival (TDOA) method or a Observed Time Difference Arrival (OTDOA) method.

In addition, although the position determining process has been described for convenience of explanation under the assumption that the UE 110 is located on the 2-dimensional plane, the present invention is not limited thereto, and thus the UE 110 may receive positioning signals respectively from four or more adjacent eNBs, and a 3-dimensional position of the UE 110 may be determined on the basis of the positioning signals.

Figure 7A:
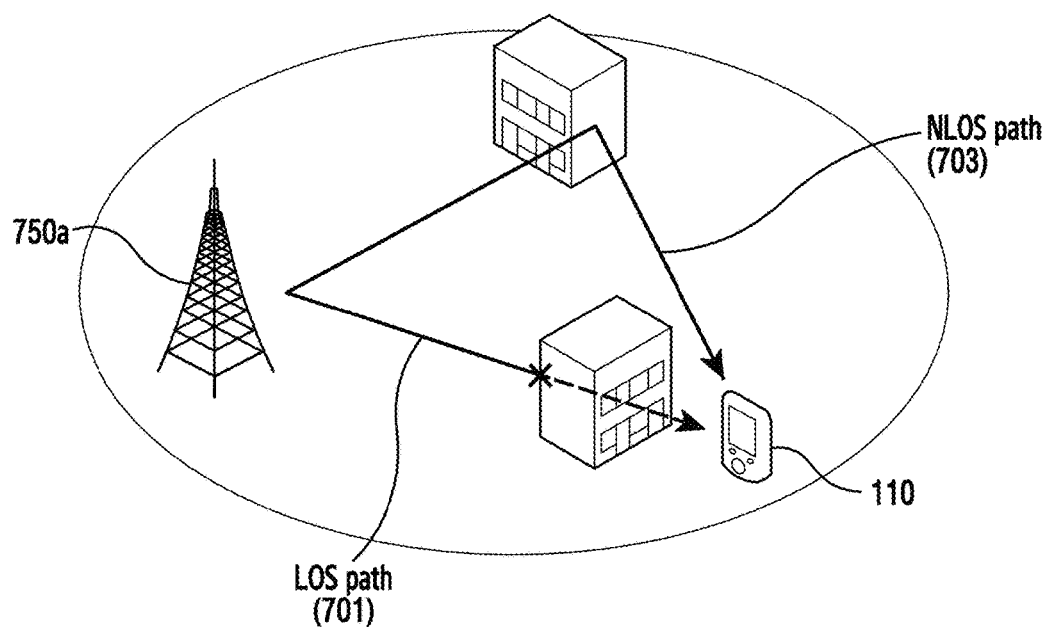
FIG. 7A and FIG. 7B illustrate a problematic situation regarding determining of a position of a UE in a wireless communication system according to exemplary embodiments of the present invention.
Figure 7B:
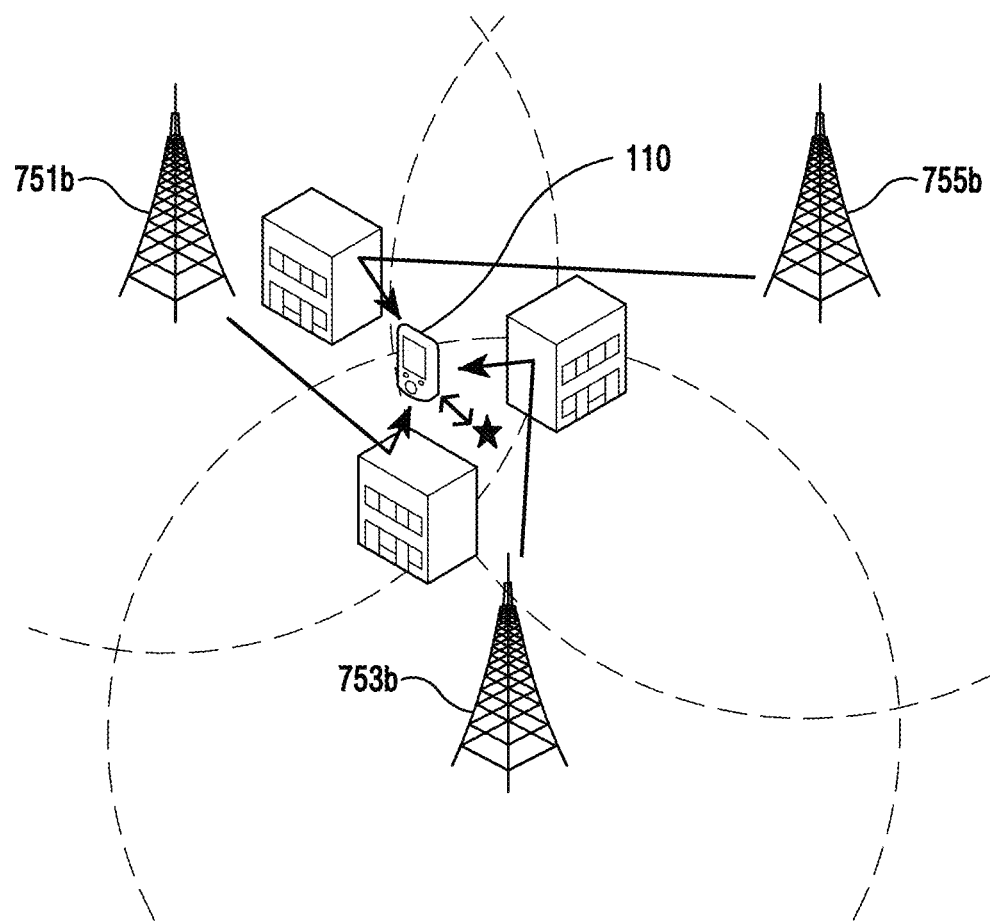

FIG. 7A and FIG. 7B illustrate a problematic situation regarding determining of a position of a UE in a wireless communication system according to exemplary embodiments of the present invention.

If positioning of a UE is performed according to the method described above in FIG. 5 or as shown in FIG. 6, the following problematic situation may occur. In other words, referring to FIG. 7A, an eNB 750a may transmit a positioning signal to the UE 110. In this case, if a Line-Of-Sight (LOS) path 701 is ensured as shown in FIG. 7A, since a distance between the eNB 750a and the UE 110 can be relatively accurately measured, the position of the UE 110 can also be relatively accurately determined. However, if the LOS path is not ensured, in other words, if the positioning signal is transmitted through a Non-Line-Of-Sight (NLOS) path 703, since an error occurs in which a measured distance is greater than an actual distance between the eNB 750a and the UE 110, the position of the UE 110 is relatively inaccurately determined.

In addition, as shown in FIG. 7B, if a serving eNB 751b transmits a $1^{st}$ positioning signal to the UE 110 through the NLOS path, an adjacent eNB-1 753b transmits a $2^{nd}$ positioning signal to the UE 110 through the NLOS path, and if an adjacent eNB-2 755b transmits a $3^{rd}$ positioning signal to the UE 110 through the NLOS path, the position of the UE 110 is inaccurately determined due to the problem in the NLOS path as mentioned above in FIG. 7A. Accordingly, a position of a UE which requires positioning is accurately determined under the premise that the LOS path is ensured between a specific node for transmitting a positioning signal and a UE subjected to positioning.

Therefore, a wireless communication system according to the exemplary embodiment of the present invention uses not only an eNB but also other UEs other than the UE subjected to positioning in order to avoid a situation where the NLOS path is used when positioning. This is because a possibility of forming the LOS path is increased when the other UEs are adjacent to the UE. Hereinafter, the present invention describes various exemplary embodiments for performing positioning by using a signal transmitted between UEs.

Figure 8A:
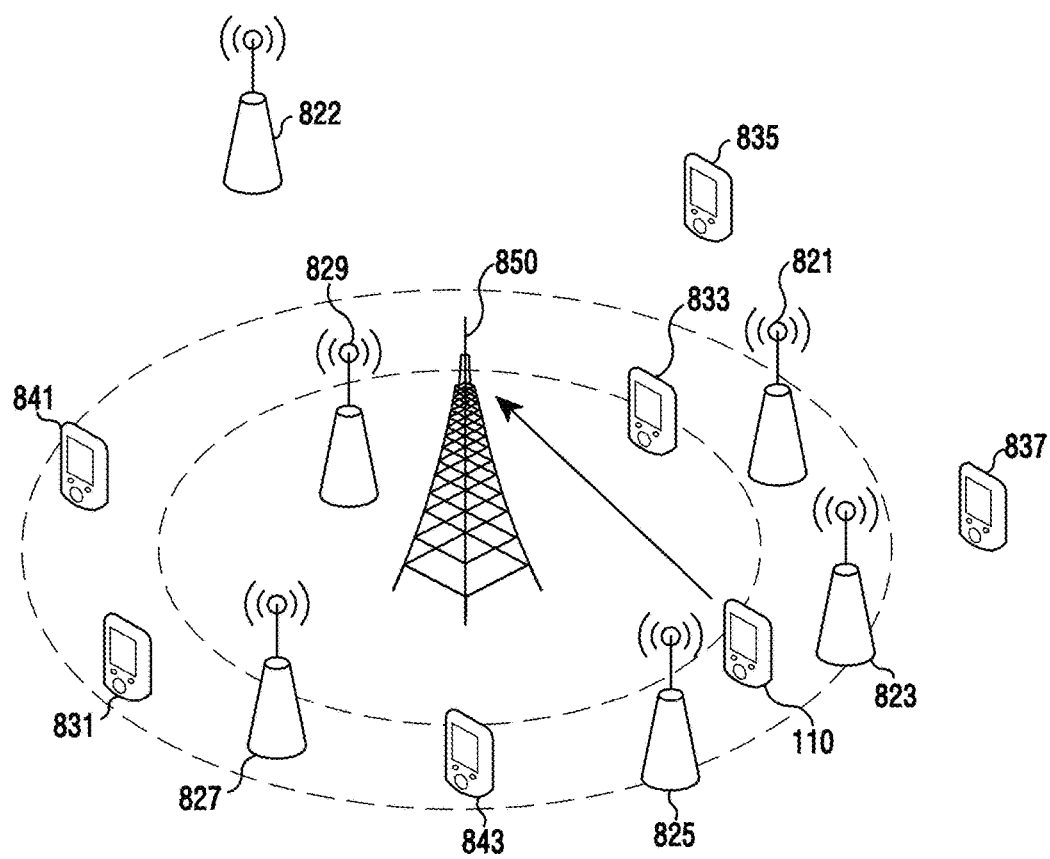
FIG. 8A and FIG. 8B illustrate a method of selecting adjacent UEs for participating in a procedure of determining a position of a UE in a wireless communication system according to exemplary embodiments of the present invention.
Figure 8B:
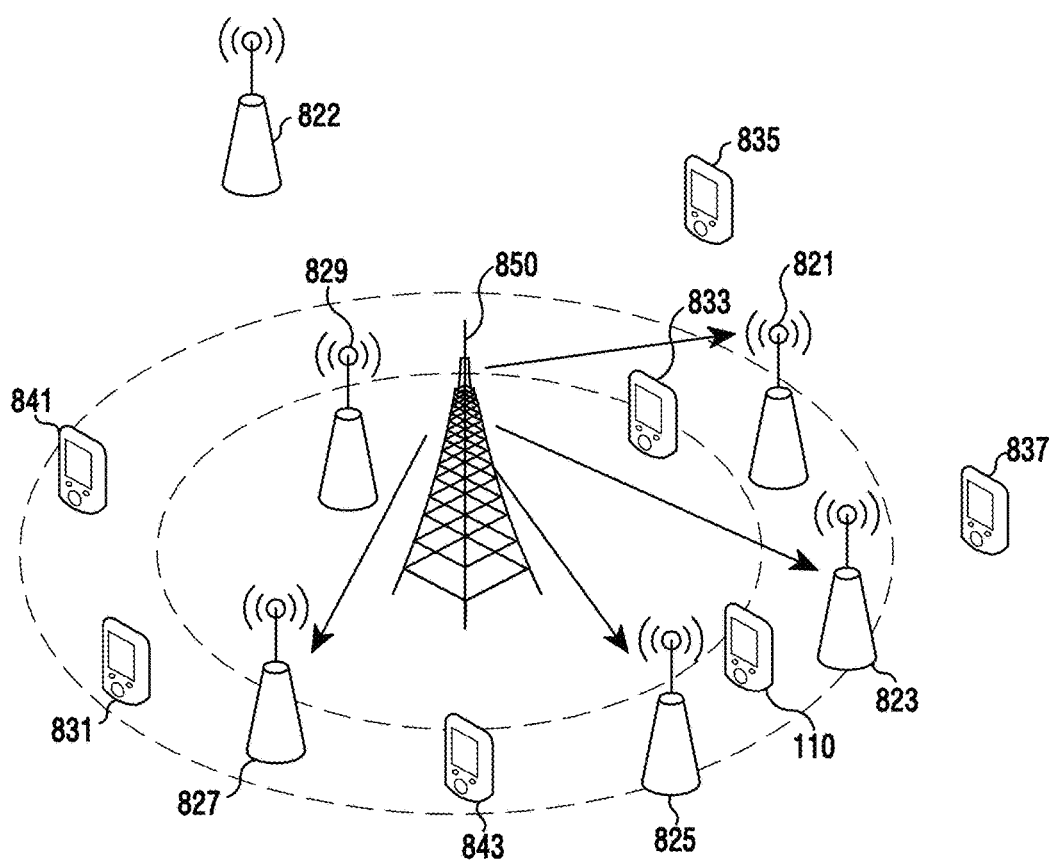

FIG. 8A and FIG. 8B illustrate a method of selecting adjacent UEs for participating in a procedure of determining a position of a UE in a wireless communication system according to exemplary embodiments of the present invention. A case of measuring a position of the UE 110 is exemplified in FIG. 8A and FIG. 8B.

Referring to FIG. 8A and FIG. 8B, a communication network shown in FIG. 8A and FIG. 8B may include a plurality of UEs and an eNB. That is, the communication network may include the UE 110 which intends to measure its position, UEs 821, 823, 825, 827, 829, and 822 of which a position is fixed among the plurality of UEs adjacent to the UE 810, UEs 831, 833, 835, and 837 of which a position is not fixed but is known among the plurality of UEs adjacent to the UE 810, and UEs 841 and 843 of which a position is not fixed and is not known among the plurality of UEs adjacent to the UE 810, and an eNB 850.

As described above, it is important to ensure an LOS path between a specific node for transmitting a positioning signal and a UE which requires positioning in order to accurately determine the position of the UE 110. Therefore, according to the exemplary embodiment of the present invention, the positioning UE 810 may perform positioning on the basis of Device-to-Device (D2D) communication. Herein, the D2D communication implies direct communication between wireless devices existing in a near distance, and the D2D communication may be performed by using various radio access schemes. For example, the D2D communication may be performed by using a near-distance communication technique such as Bluetooth, Wireless Fidelity (Wi-Fi), or the like and a cellular communication technique such as LTE or the like.

Referring to FIG. 8A, according to the exemplary embodiment of the present invention, in order for the UE 110 to perform positioning on the basis of D2D communication, the UE 110 may perform the D2D communication with the plurality of UEs 821, 823, 825, 827, 829, 831, 833, 835, 837, 841, and 843 adjacent to the UE 110. In other words, for the positioning of the UE 110 on the basis of the D2D communication, the UE 110 may determine a plurality of adjacent UEs for participating in the positioning process, and may perform the positioning of the UE 110 on the basis of the D2D communication with the plurality of adjacent UEs.

As a result, a method of selecting adjacent UEs for participating in a procedure of determining a position of a UE in a wireless communication system according to exemplary embodiments of the present invention is shown in FIG. 8A and FIG. 8B. According to the exemplary embodiment of the present invention, the UE 110 may allow the eNB 850 to determine a plurality of adjacent UEs for participating in the position determining process by transmitting to the eNB 850 a request signal for allowing the eNB 850 to determine the plurality of adjacent UEs for participating in the position determining process. Specifically, as shown in FIG. 8A, the UE 110 may transmit a positioning request signal to the eNB 850. In response thereto, the eNB 850 may receive the positioning request signal from the UE 110, and may determine the plurality of adjacent UEs for participating in the positioning process.

According to the exemplary embodiment of the present invention, upon receiving the positioning request signal, the eNB 850 may estimate a distance difference between the eNB 850 and the UE 110 from Timing Advance (TA) information of the UE 110. In addition, an approximate radius centered at the eNB 850 with respect to a position at which the UE 110 is located may be estimated on the basis of the distance difference. In this case, the eNB 850 may determine the fixed UEs 821, 823, 825, and 827 located in a radius similar to the estimated approximate radius of the UE 110 as the plurality of UEs for participating in the positioning process.

As shown in FIG. 8B, the eNB 850 may transmit a signal for requesting for transmission of a positioning signal for positioning of the UE 110 to the fixed UEs 821, 823, 825, and 827. According to the exemplary embodiment of the present invention, the positioning signal may include a D2D-Positioning Reference Signal (D2D-PRS), and the signal for requesting for transmission of the positioning signal may be referred to as a positioning signal transmission request signal, a positioning signal transmission indication signal, a positioning signal transmission instruction, a D2D-PRS transmission request signal, a D2D-PRS transmission indication signal, a D2D-PRS transmission instruction, or the like.

In addition, upon receiving the positioning signal transmission request signal, each of the fixed UEs 821, 823, 825, and 827 may transmit a positioning signal to the UE 110. Accordingly, after receiving the positioning signal from each of the fixed UEs 821, 823, 825, and 827, the UE 110 may perform positioning on the basis of the received positioning signals. In this case, a procedure of performing positioning of the UE 110 will be described below in greater detail with reference to FIG. 11.

Figure 9A:
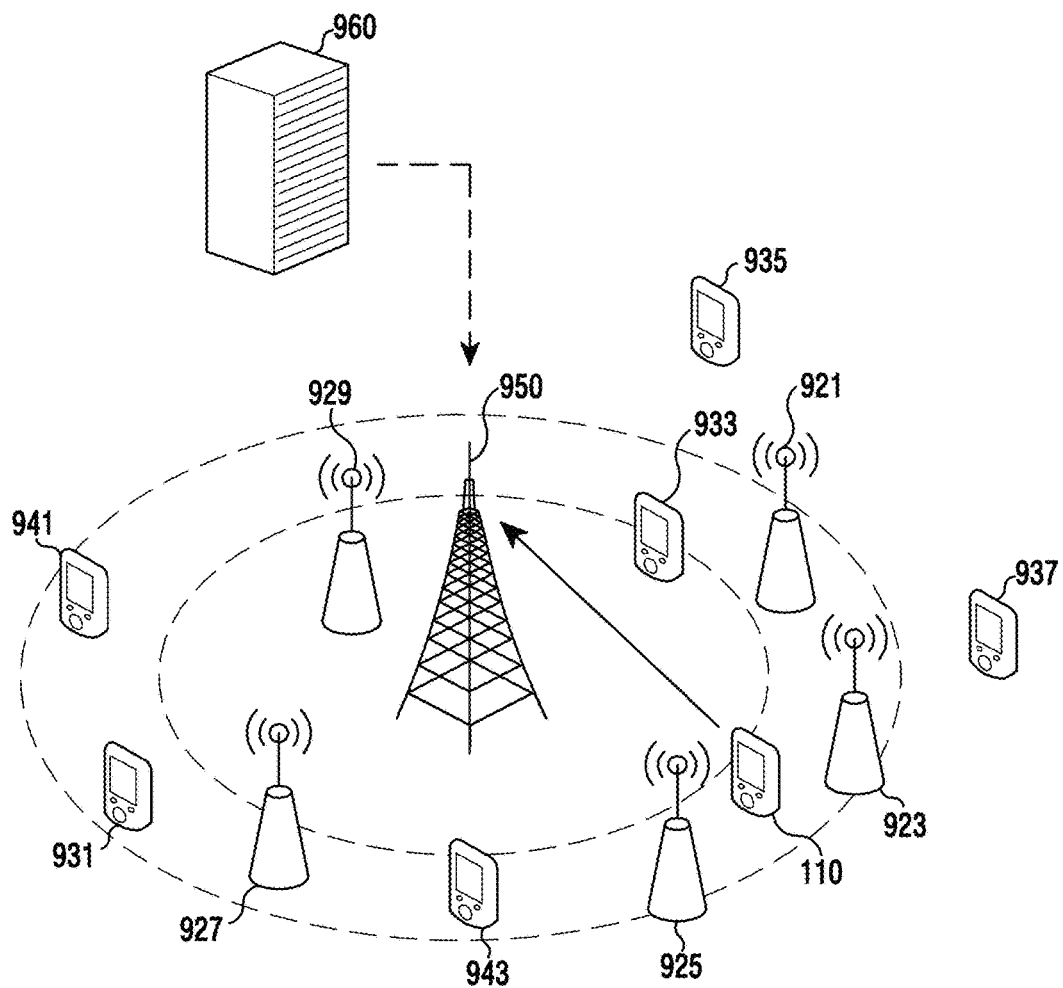
FIG. 9A to FIG. 9C illustrate a method of selecting adjacent UEs for participating in a procedure of determining a position of a UE in a wireless communication system according to other exemplary embodiments of the present invention.
Figure 9B:
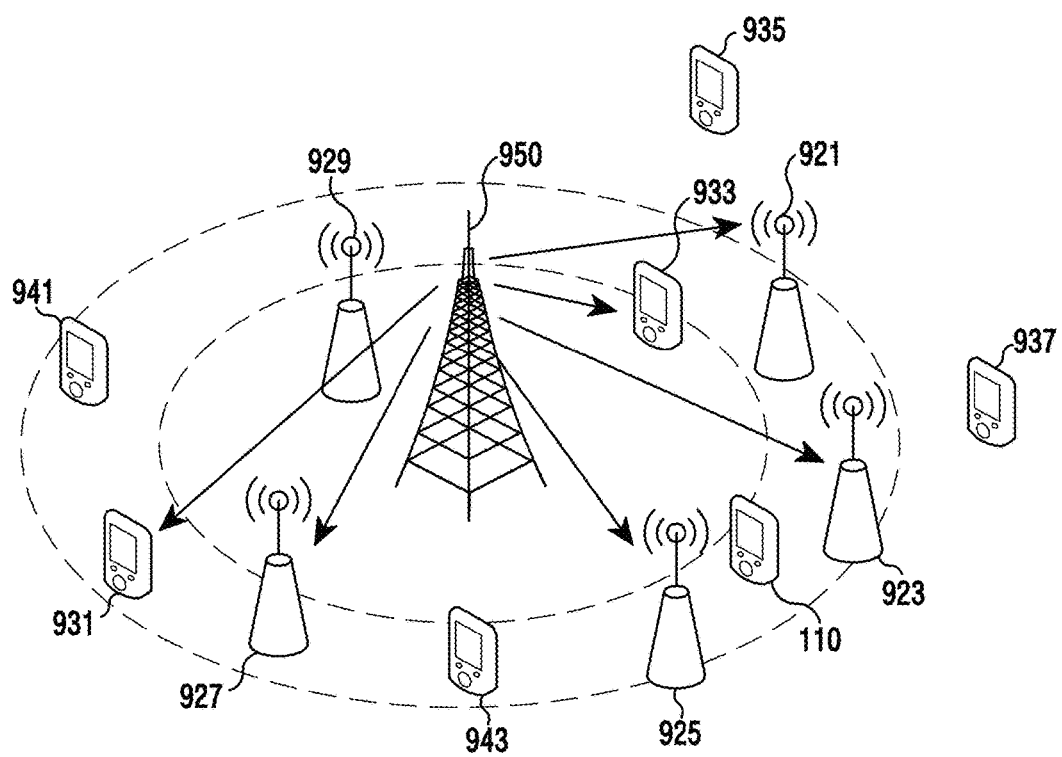
Figure 9C:
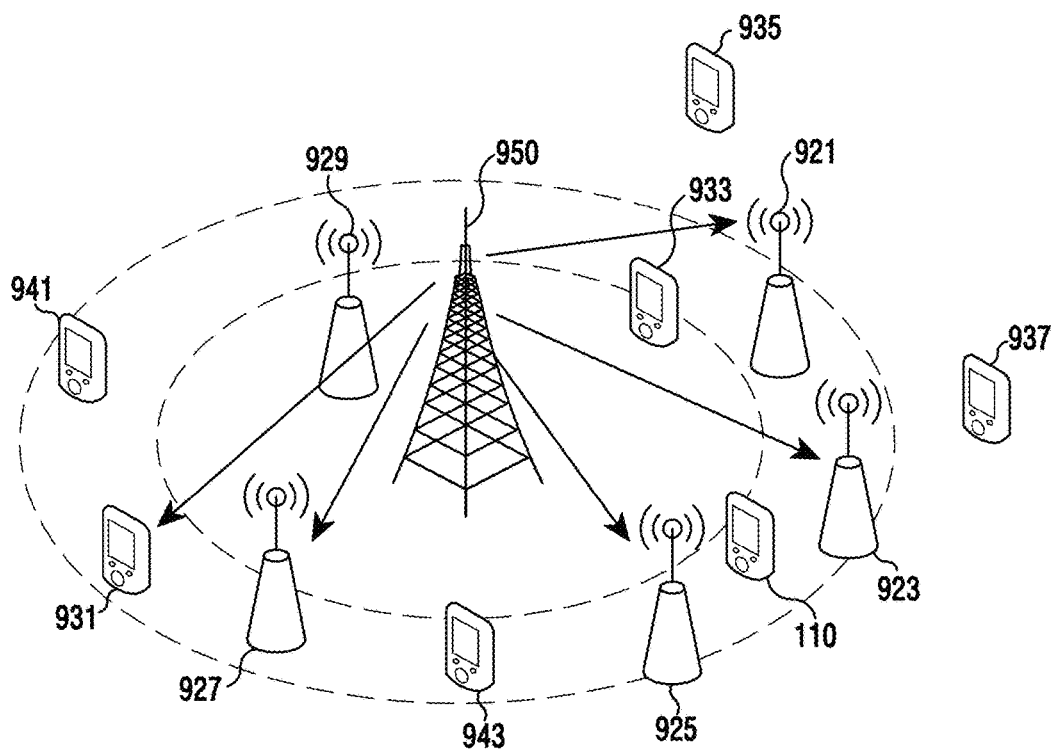

FIG. 9A to FIG. 9C illustrate a method of selecting adjacent UEs for participating in a procedure of determining a position of a UE in a wireless communication system according to other exemplary embodiments of the present invention. A case of measuring a position of the UE 110 is exemplified in FIG. 9A to FIG. 9C.

Referring to FIG. 9A to FIG. 9C, a communication network shown in FIG. 9A to FIG. 9C may include a plurality of UEs, an eNB 950, and a server device 960. According to the exemplary embodiment of the present invention, the server device 960 may include an E-SMLC device. In addition, the communication network may include the UE 110 which intends to measure its position, UEs 921, 923, 925, 927, and 929 of which a position is fixed among the plurality of UEs adjacent to the UE 110, UEs 931, 933, 935, and 937 of which a position is not fixed but is known among the plurality of UEs adjacent to the UE 110, UEs 941 and 943 of which a position is not fixed and is not known among the plurality of UEs adjacent to the UE 110, and the eNB 950.

According to the above description, the position of the UE 110 is accurately determined under the premise that an LOS path is ensured between a specific node for transmitting a positioning signal and a UE subjected to positioning. Therefore, the positioning UE 910 may perform positioning on the basis of D2D communication according to the exemplary embodiment of the present invention. Referring to FIG. 9A, according to the exemplary embodiment of the present invention, the eNB 950 may receive, from the server 960, position information and expiration time information regarding UEs on which positioning is performed by using another positioning scheme within its cell coverage. For example, the another positioning scheme may be based on an Assisted-Global Navigation Satellite System (A-GNSS), a Global Positioning System (GPS), or the like. In this case, the eNB 950 may store and manage position information and expiration time information regarding UEs on which positioning is performed. In addition, the position information and the expiration time information may be managed in a table form. Herein, the expiration time information implies a duration during which position information measured based on the another positioning scheme is reliable. A specific value of the expiration time may vary depending on various exemplary embodiments of the invention, and for example, may be set to a proper value by considering a mobility of the UE and a time elapsed from a time point at which initial positioning is performed.

According to the exemplary embodiment of the present invention, the UEs 931, 933, 935, and 937 of which a position is determined by a separate position determining system may be determined in a cell of the eNB 950. According to the exemplary embodiment of the present invention, it may be determined that the UE 931 has a position coordinate $(x_0, y_0)$ and an expiration time of 500 ms, the UE 933 has a position coordinate $(x_1, y_1)$ and an expiration time of 400 ms, the UE 935 has a position coordinate $(x_2, y_2)$ and an expiration time of 500 ms, and the UE 937 has a position coordinate $(x_3, y_3)$ and an expiration time of 300 ms.

Referring to FIG. 9A, for positioning of the UE 110 on the basis of D2D communication, the UE 110 may determine a plurality of adjacent UEs for participating in a positioning process, and may perform the positioning of the UE 110 on the basis of D2D communication with the plurality of adjacent UEs. According to the exemplary embodiment of the present invention, the UE 110 may allow the eNB 950 to determine a plurality of adjacent UEs for participating in the position determining process by transmitting to the eNB 950 a request signal for allowing the eNB 950 to determine the plurality of adjacent UEs for participating in the position determining process. According to the exemplary embodiment of the present invention, as shown in FIG. 9A, the UE 110 may transmit a positioning request signal to the eNB 950. In response thereto, the eNB 950 may receive the positioning request signal from the UE 110, and may determine the plurality of adjacent UEs for participating in the positioning process.

According to the exemplary embodiment of the present invention, upon receiving the positioning request signal, the eNB 950 may estimate a distance difference between the eNB 950 and the UE 110 from TA information of the UE 110. In addition, an approximate radius centered at the eNB 950 with respect to a position at which the UE 110 is located may be estimated on the basis of the distance difference. In this case, the eNB 950 may determine the fixed UEs 921, 923, 925, and 927 located in a radius similar to the estimated approximate radius of the UE 110 as the plurality of UEs for participating in the positioning process. In addition, on the basis of position coordinate information of the UEs 931, 933, 935, and 937 of which a position is determined by a separate position determining system, the eNB 950 may determine UEs located in a radius similar to an estimated approximate radius of the UE 110 as the plurality of UEs for participating in the positioning process among the UEs. According to the exemplary embodiment of the present invention, the UEs 931 and 933 may be determined as the plurality of UEs for participating in the positioning process.

As shown in FIG. 9B, the eNB 950 may transmit a signal for requesting for transmission of a positioning signal for positioning of the UE 110 to the fixed UEs 921, 923, 925, and 927 and the UEs 931 and 933 of which a position is determined by a separate position determining system. According to the exemplary embodiment of the present invention, the positioning signal may include a D2D-PRS, and the signal for requesting for transmission of the positioning signal may be referred to as a positioning signal transmission request signal, a positioning signal transmission indication signal, a positioning signal transmission instruction, a D2D-PRS transmission request signal, a D2D-PRS transmission indication signal, a D2D-PRS transmission instruction, or the like.

In addition, upon receiving the positioning signal transmission request signal, each of the fixed UEs 921, 923, 925, and 927 and the UEs 931 and 933 of which a position is determined may transmit a positioning signal to the UE 110. Accordingly, after receiving the positioning signal from each of the fixed UEs 921, 923, 925, and 927 and the UEs 931 and 933 of which a position is determined, the UE 110 may perform positioning on the basis of the received positioning signals. In this case, a procedure of performing positioning of the UE 110 will be described below in greater detail with reference to FIG. 11.

In addition, as described above, since the eNB 950 configures and stores the position coordinate and expiration time information regarding each of the UEs 931, 933, 935, and 937 of which a position is determined by the separate position determining system, according to the exemplary embodiment of the present invention, it may be determined that the UE 933 has a position coordinate ($x_1$, $y_1$) and an expiration time of 400 ms. If it is assumed that a time elapses by 400 ms from a time point at which the expiration time information of the UE 933 is configured and stored, the position information of the UE 933 is no longer reliable. As a result, as shown in FIG. 9C, the eNB 950 may request the remaining UEs other than the UE 933 to transmit positioning signals, and the UE 110 may perform positioning on the basis of the received positioning signals.

Figure 10A:
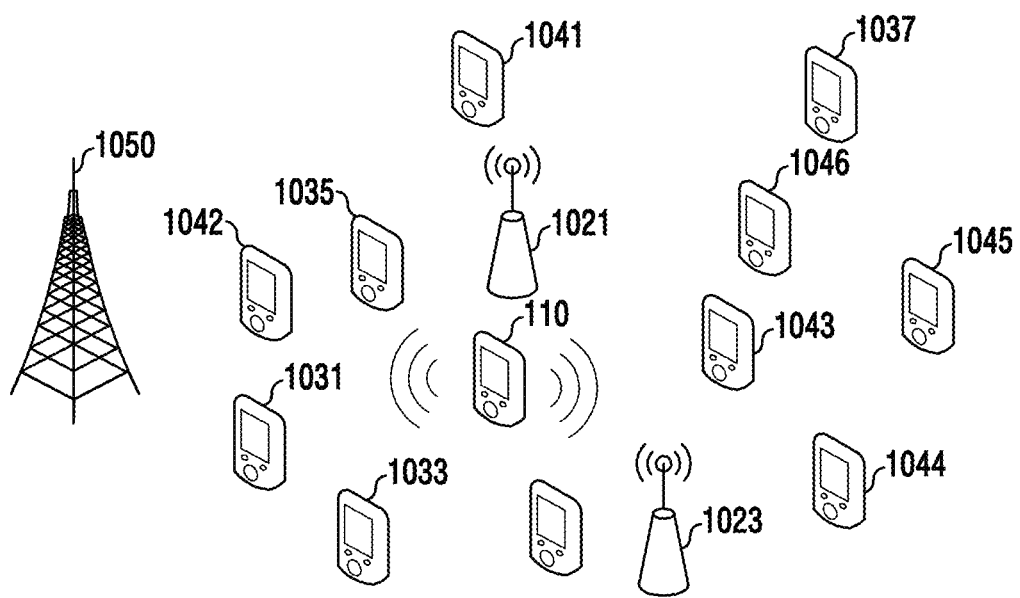
FIG. 10A and FIG. 10B illustrate a method of selecting adjacent UEs for participating in a procedure of determining a position of a UE in a wireless communication system according to other exemplary embodiments of the present invention.
Figure 10B:
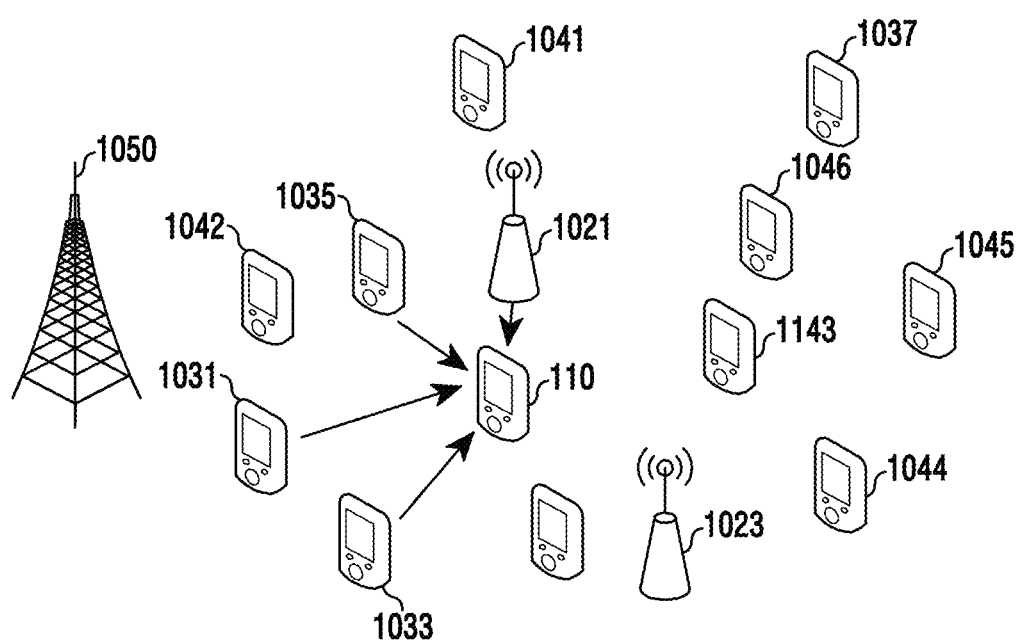

FIG. 10A and FIG. 10B illustrate a method of selecting adjacent UEs for participating in a procedure of determining a position of a UE in a wireless communication system according to other exemplary embodiments of the present invention. A case of measuring a position of the UE 110 is exemplified in FIG. 10A and FIG. 10B.

Referring to FIG. 10A and FIG. 10B, a communication network shown in FIG. 10A and FIG. 10B may include a plurality of UEs and an eNB 1050. According to the exemplary embodiment of the present invention, the communication network may include the UE 110 which intends to measure its position, UEs 1021 and 1023 of which a position is fixed among the plurality of UEs adjacent to the UE 110, UEs 1031, 1033, 1035, and 1037 of which a position is not fixed but is known among the plurality of UEs adjacent to the UE 110, and UEs 1041, 1042, 1043, 1044, 1045, and 1046 of which a position is not fixed and is not known among the plurality of UEs adjacent to the UE 110, and the eNB 1050.

As described above, it is important to ensure an LOS path between at least one specific node for transmitting a positioning signal and the UE 110 in order to accurately determine the position of the UE 110. Therefore, according to the exemplary embodiment of the present invention, the positioning UE 1010 may perform positioning on the basis of D2D communication. Referring to FIG. 10A, for the positioning of the UE 110 on the basis of the D2D communication, the UE 110 may determine a plurality of adjacent UEs for participating in the positioning process, and may perform the positioning of the UE 110 on the basis of the D2D communication with the plurality of adjacent UEs. According to the exemplary embodiment of the present invention, the UE 110 directly transmits to the plurality of adjacent UEs a request signal for determining the plurality of adjacent UEs for participating in the position determining process, and thus the plurality of adjacent UEs for participating in the position determining process can be determined without an intervention of the eNB. According to the exemplary embodiment of the present invention, as shown in FIG. 10A, the UE 110 may transmit a positioning request signal to the plurality of adjacent UEs. In this case, the positioning request signal may be transmitted in a form of a D2D discovery signal or a broadcast signal.

Upon receiving the positioning request signal, the adjacent UEs may measure a receive power value of the positioning request signal. In this case, if the measured receive power value of the positioning request signal is greater than or equal to a threshold and if the adjacent UE which has received the positioning request signal is a fixed UE or a UE of which a position is determined by a separate position determining system, the adjacent UE may be determined as an adjacent UE for participating in the positioning process of the UE 110. That is, if the measured receive power value of the positioning request signal is greater than or equal to the threshold, it means that a distance between the UE 110 and the adjacent UE is relatively proximate, and if the distance between the UE 110 and the adjacent UE is relatively proximate, a probability of ensuring an LOS path between the UE 110 and the adjacent UE is relatively high. In addition, even if a UE is relatively proximate to the UE 110, an adjacent UE of which position information is not determined cannot contribute to determining of the distance to the UE 110. As a result, if the measured receive power value of the positioning request signal is greater than or equal to a threshold and if the adjacent UE which has received the positioning request signal is a fixed UE or a UE of which a position is determined by a separate position determining system, the adjacent UE may be determined as an adjacent UE for participating in the positioning process of the UE 110.

As shown in FIG. 10B, according to the exemplary embodiment of the present invention, the fixed UE 1021 and the UEs 1031, 1033, and 1035 of which a position is determined by the separate position determining system may transmit to the UE 110 a positioning signal for measuring a position of the UE 110. According to the exemplary embodiment of the present invention, the positioning signal may include a D2D-PRS. Accordingly, the UE 110 may receive the positioning signal from each of the fixed UE 1021 and the UEs 1031, 1033, and 1035 of which a position is determined, and may perform positioning on the basis of the received positioning signals. In this case, a procedure of performing positioning of the UE 110 will be described below in greater detail with reference to FIG. 11.

As described above, according to the exemplary embodiment of the present invention, for positioning of the UE, a positioning signal transmitted to the UE 110 may include a D2D-PRS. In this case, for accurate positioning of the UE subjected to positioning, the D2D-PRS to be transmitted to the UE 110 must be distinguished for each adjacent UE for transmitting the D2D-PRS. As such, in order for the D2D-PRS to be distinguished for each adjacent UE for transmitting the D2D-PRS, a new D2D-PRS sequence and transmission channel may be defined, or the conventionally defined D2D-RS may be utilized.

In general, the D2D-RS may be transmitted according to downlink timing based on a downlink reception time of a serving eNB or uplink timing based on a time prior to the downlink timing by a round-trip delay value between the serving eNB and the UE. For example, a DeModulation-Reference Signal (DM-RS) for demodulating a UE discovery signal and a Scheduling Assignment (SA) signal may be transmitted on the basis of the downlink timing. In addition, a DM-RS for demodulating D2D broadcast/unicast data and a Sounding Reference Signal (SRS) which is a reference signal for channel estimation on cellular may be transmitted on the basis of the uplink timing. Since the DM-RS sequence for D2D has a cell-specific feature, it is impossible to be distinguished from one UE to another. However, since allocation is performed on other Physical Resource Blocks (PRBs) through eNB-based/distributed resource scheduling, it is possible to be distinguished from one UE to another.

Accordingly, a case where a positioning signal is transmitted on the basis of uplink timing is described below with reference to FIG. 11A and FIG. 11B, and a case where a positioning signal is transmitted on the basis of downlink timing is described below with reference to FIG. 12A and FIG. 12B.

Figure 11A:
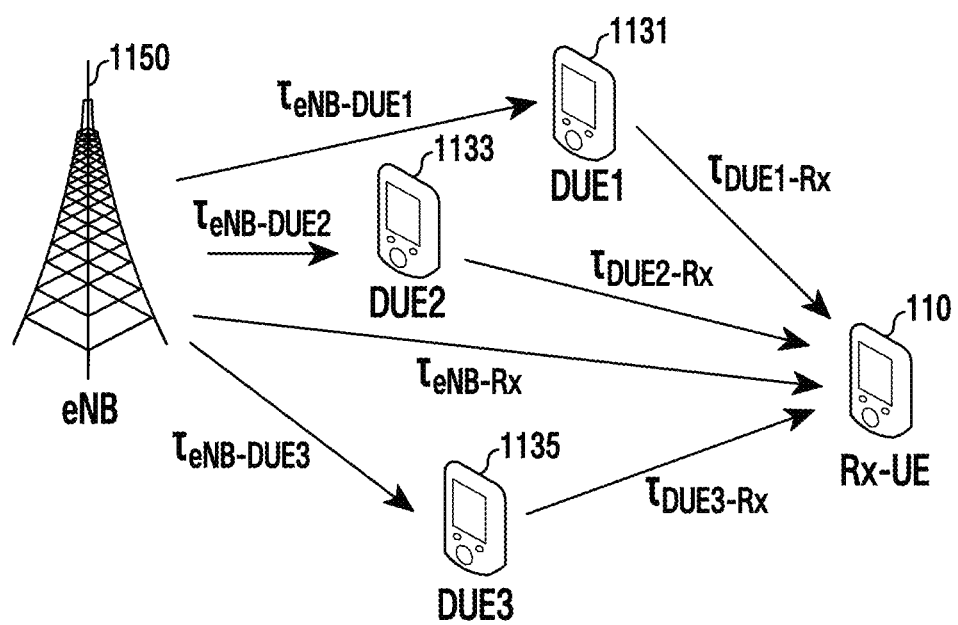
FIG. 11A and FIG. 11B illustrate a method of determining a position of a UE in a wireless communication system according to exemplary embodiments of the present invention.
Figure 11B:
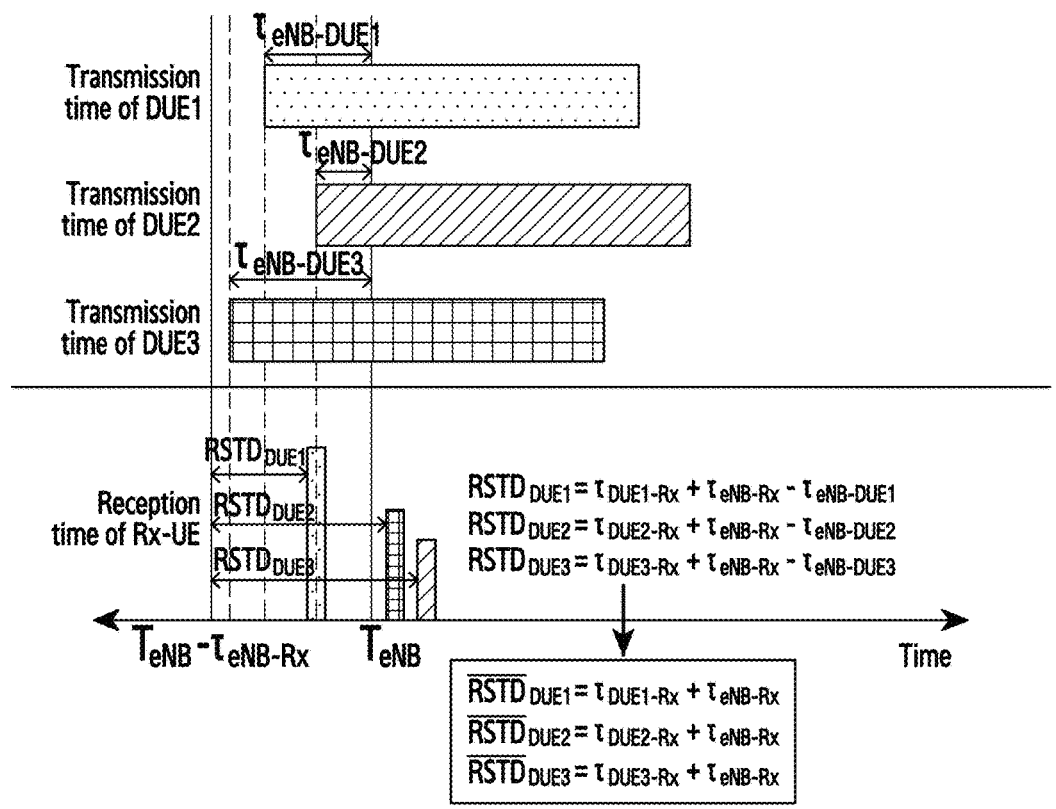

FIG. 11A and FIG. 11B illustrate a method of determining a position of a UE in a wireless communication system according to exemplary embodiments of the present invention. The method of determining the position of the UE is shown in FIG. 11A and FIG. 11B for a case where a positioning signal is transmitted on the basis of uplink timing. A case for measuring a position of the UE 110 is exemplified in FIG. 11A and FIG. 11B. A communication network of FIG. 11A may include the UE (Rx-UE) 110, an eNB 1150, a $1^{st}$ UE (DUE 1), a $2^{nd}$ UE (DUE 2) 1133, and a $3^{rd}$ UE (DUE 3) 1135 among UEs adjacent to the UE 110. Herein, the eNB 1150 may correspond to a serving eNB of the UE 110. As shown in FIG. 11A and FIG. 11B, it may be determined that a propagation delay time between the eNB 1150 and the $1^{st}$ UE 1131 is $\tau_{eNB-DUE1}$, a propagation delay time between the eNB 1150 and the $2^{nd}$ UE 1133 is $\tau_{eNB-DUE2}$, a propagation delay time between the eNB 1150 and the $3^{rd}$ UE 1135 is $\tau_{eNB-DUE3}$, a propagation delay time between the $1^{st}$ UE 1131 and the UE 110 is $\tau_{DUE1-Rx}$, a propagation delay time between the $2^{nd}$ UE 1133 and the UE 110 is $\tau_{DUE2-Rx}$, a propagation delay time between the $3^{rd}$ UE 1135 and the UE 110 is $\tau_{DUE3-Rx}$, and a propagation delay time between the eNB 1150 and the UE 110 is $\tau_{eNB-RX}$.

As shown in FIG. 11A and FIG. 11B, the UE 110 may receive a $1^{st}$ positioning signal from a $1^{st}$ UE 1231, receive a $2^{nd}$ positioning signal from a $2^{nd}$ UE 1233, and receive a $3^{rd}$ positioning signal from a $3^{rd}$ UE 1235 to determine the position of the UE 110. According to the exemplary embodiment of the present invention, if the positioning signal is transmitted on the basis of the uplink timing, the positioning signal may be transmitted at a time point advanced by a propagation delay time between an eNB and an adjacent UE with respect to a reference time $T_{eNB}$ of the eNB. In other words, according to the exemplary embodiment of the present invention, the $1^{st}$ UE 1131 may transmit the $1^{st}$ positioning signal to the UE 110 at a time point $\tau_{eNB-\tau eNB-DUE1}$, the $2^{nd}$ UE 1133 may transmit the $2^{nd}$ positioning signal to the UE 110 at a time point $\tau_{eNB-\tau eNB-DUE2}$, and the $3^{rd}$ UE 1135 may transmit the $3^{rd}$ positioning signal to the UE 110 at a time point $\tau_{eNB-\tau eNB-DUE3}$. In addition, in response thereto, the UE 110 may receive the $1^{st}$ positioning signal at a time point $\tau_{eNB-\tau eNB-DUE1}+\tau_{DUE1-Rx}$, may receive the $2^{nd}$ positioning signal at a time point $\tau_{eNB-\tau eNB-DUE2}+\tau_{DUE2-Rx}$, and may receive the $3^{rd}$ positioning signal at a time point $\tau_{eNB-\tau eNB-DUE3}+\tau_{DUE3-Rx}$. This may be generalized as shown in Equation (3) below.

Time of transmitting positioning signal of
DUE$i = T_{eNB} - \tau_{eNB-DUEi}$

Time of receiving positioning signal from
DUE$i = T_{eNB} - \tau_{eNB-DUEi} + \tau_{DUEi-Rx}$ (3)

Herein, DUE$_i$ denotes an $i^{th}$ UE adjacent to a UE which requires positioning, $T_{eNB}$ denotes a propagation delay time between the eNB and the $i^{th}$ UE adjacent to the UE which requires positioning, and $\tau_{DUEi-Rx}$ denotes a propagation delay time between the UE which requires positioning and the $i^{th}$ UE adjacent to the UE which requires positioning.

In addition, the UE 110 may calculate an offset of a time point at which the positioning signal is received for a positioning signal transmitted based on uplink timing. Herein, an offset RSTD$_{DUEi}$ of the time point at which the positioning signal is received may be defined as shown in Equation (4) below.

$$RSTD_{DUEi} = T_{eNB} - \tau_{eNB-DUEi} + \tau_{DUEi-Rx} - (T_{eNB} - \tau_{eNB-Rx}) \quad (4)$$

$$= \tau_{DUEi-Rx} + \tau_{eNB-Rx} - \tau_{eNB-DUEi}$$

Herein, DUE$_i$ denotes an $i^{th}$ UE adjacent to a UE subjected to positioning, $T_{eNB}$ denotes a reference time of an eNB, $\tau_{eNB-DUEi}$ denotes a propagation delay time between the eNB and the $i^{th}$ UE adjacent to the UE subjected to positioning, $\tau_{DUEi-Rx}$ denotes a propagation delay time between the $i^{th}$ UE adjacent to the UE subjected to positioning and the UE subjected to positioning, and $\tau_{eNB-Rx}$ denotes a propagation delay time between the eNB and the UE subjected to positioning.

In addition, for positioning of the UE 110, the UE 110 needs to eliminate the value $\tau_{eNB-DUEi}$ in Equation (4) above. In this case, the UE 110 may receive the value $\tau_{eNB-DUEi}$ directly from the eNB 1150, and the value $\tau_{eNB-DUEi}$ may be transmitted to the UE 110 by being included in each of the $1^{st}$, $2^{nd}$, and $3^{rd}$ positioning signals transmitted by each of the UEs adjacent to the UE, e.g., each of the $1^{st}$ UE 1131, $2^{nd}$ UE 1133, and the $3^{rd}$ UE 1135, to the UE 110. Accordingly, the value $\overline{RSTD}_{DUEi}$ from which the value $\tau_{eNB-DUEi}$ is eliminated is expressed by Equation (5) below.

$$\overline{RSTD}_{DUEi} = RSTD_{DUEi} + \tau_{eNB-DUEi} = \tau_{DUEi-Rx} + \tau_{eNB-Rx} \quad (5)$$

Herein, RSTD$_{DUEi}$ denotes an offset RSTD$_{DUEi}$ at a time point at which a UE subjected to positioning receives a positioning signal, $\tau_{eNB-DUEi}$ denotes a propagation delay time between an eNB and an $i^{th}$ UE adjacent to the UE subjected to positioning, $\tau_{DUEi-Rx}$ denotes a propagation delay time between the $i^{th}$ UE adjacent to the UE subjected to positioning and the UE subjected to positioning, and $\tau_{eNB-Rx}$ denotes a propagation delay time between the eNB and the UE subjected to positioning.

Next, the position of the UE 110 may be determined according to the TOA method of FIG. 6, or the position of the UE 110 may be determined according to the TDOA method of FIG. 7. First, when assuming a state where a connection between the eNB 1150 and the UE 110 is maintained, the UE 110 may determine the value $\tau_{eNB-Rx}$ on the basis of a signal transmitted from the eNB 1150. For example, if a Radio Resource Control (RRC) connection is maintained between the eNB 1150 and the UE 110, the value $\tau_{eNB-Rx}$ may be determined from a Timing Advance (TA) command. Accordingly, the UE 110 may derive a value TOA$_i$ as shown in Equation (6) below by eliminating the value $\tau_{eNB-Rx}$ in Equation (5) above.

$$TOA_i = \overline{RSTD}_{DUEi} - \tau_{eNB-Rx} = \tau_{DUEi-Rx} \quad (6)$$

Herein, $\overline{RSTD}_{DUEi}$ denotes a value obtained by eliminating a value $\tau_{eNB-DUEi}$ from an offset RSTD$_{DUEi}$ at a time point at which a UE subjected to positioning receives a positioning signal, $\tau_{eNB-Rx}$ denotes a propagation delay time between an eNB and the UE subjected to positioning, and $\tau_{DUEi-Rx}$ denotes a propagation delay time between an $i^{th}$ UE adjacent to the UE subjected to positioning and the UE subjected to positioning.

In this case, the UE 110 may determine a position of the UE 110 on the basis of coordinate information of UEs adjacent to the UE 110 and the value $TOA_i$. In this case, the UE 110 may directly receive the coordinate information of the UEs adjacent to the UE 110 from the eNB 1150, and the coordinate information may be transmitted to the UE 110 by being included in each of the $1^{st}$ positioning signal, $2^{nd}$ positioning signal, and $3^{rd}$ positioning signal transmitted to the UE 110 by each of UEs, e.g., the $1^{st}$ UE 1131, the $2^{nd}$ UE 1133, and the third UE 1135, adjacent to the UE 110.

Herein, the UE 110 may determine a distance between the UEs adjacent to the UE 110 on the basis of the value $TOA_i$ and the velocity of light. For example, a distance between the UE 110 and the $1^{st}$ UE 1131 may be determined as a $1^{st}$ distance value on the basis of a value $TOA_1$ and a value of the velocity of light, a distance between the UE 110 and the $2^{nd}$ UE 1133 may be determined as a $2^{nd}$ distance value on the basis of a value $TOA_2$ and the value of the velocity of light, and a distance between the UE 110 and the third UE 1135 may be determined as a $3^{rd}$ distance value on the basis of a value $TOA_3$ and the value of the velocity of light.

According to the TOA method as shown in FIG. 5, the UE 110 may determine a coordinate corresponding to a point of contact of a circle centered on the coordinate of the $1^{st}$ UE 1131 and having a radius corresponding to the $1^{st}$ distance value, a circle centered on the coordinate of the $2^{nd}$ UE 1133 and having a radius corresponding to the $2^{nd}$ distance value, and a circle centered on the coordinate of the third UE 1135 and having a radius corresponding to the $3^{rd}$ distance value as the position of the UE 110. Although it is described above that the UE 110 directly determines the position of the UE 110 by using the TOA method, this is for exemplary purposes only. Thus, the UE 110 may transmit the calculated $1^{st}$ distance value, $2^{nd}$ distance value, and $3^{rd}$ distance value to a position determining device (not shown in FIG. 11A), e.g., a server device, via the eNB 1150, and the position determining device may determine the position of the UE 110 on the basis of a position coordinate of UEs adjacent to the UE 110 and distance information between the UEs adjacent to the UE 110 and thereafter may transmit the position coordinate of the UE 110 to the UE 110.

In addition, although the position determining process has been described for convenience of explanation under the assumption that the UE 110 is located on the 2-dimensional plane, the present invention is not limited thereto, and thus the UE 110 may receive positioning signals respectively from four or more adjacent eNBs, and a 3-dimensional position of the UE 110 may be determined on the basis of the positioning signals.

In addition, according to the exemplary embodiment of the present invention, the position of the UE 110 may be determined by using the TDOA method of FIG. 7. That is, the UE 110 may calculate a difference of values $\overline{RSTD}_{DUEi}$ calculated in Equation (5) above to eliminate a component $\tau_{eNB-Rx}$, and as a result, a value $TDOA_{i,j}$ may be calculated as shown in Equation (7) below.

$$TDOA_{i,j} = \overline{RSTD}_{DUEi} - \overline{RSTD}_{DUEj} = \tau_{DUEi-Rx} - \tau_{DUEj-Rx} \quad (7)$$

Herein, DUEi denotes an $i^{th}$ UE adjacent to a UE subjected to positioning, $DUE_j$ denotes a $j^{th}$ UE adjacent to the UE subjected to positioning, $\overline{RSTD}_{DUEi}$ denotes a value obtained by eliminating a value $\tau_{eNB-DUEi}$ from an offset $RSTD_{DUEi}$ at a time point at which the UE subjected to positioning receives a positioning signal from the $i^{th}$ UE, $\overline{RSTD}_{DUEj}$ denote a value obtained by eliminating a value $\tau_{eNB-DUEj}$ from an offset $RSTD_{DUEj}$ at a time point at which the UE subjected to positioning receives a positioning signal from the $j^{th}$ UE, $\tau_{DUEi-Rx}$ denotes a propagation delay time between the $i^{th}$ UE adjacent to the UE subjected to positioning and the UE subjected to positioning, and $\tau_{DUEj-Rx}$ denotes a propagation delay time between the $j^{th}$ UE adjacent to the UE subjected to positioning and the UE subjected to positioning.

In this case, the UE 110 may determine a position of the UE 110 on the basis of coordinate information of UEs adjacent to the UE 110 and the value $TOA_{i,j}$. In this case, the UE 110 may directly receive the coordinate information of the UEs adjacent to the UE 110 from the eNB 1150, and the coordinate information may be transmitted to the UE 110 by being included in each of the $1^{st}$ positioning signal, $2^{nd}$ positioning signal, and $3^{rd}$ positioning signal transmitted to the UE 110 by each of UEs, e.g., the $1^{st}$ UE 1131, the $2^{nd}$ UE 1133, and the third UE 1135, adjacent to the UE 110.

In case of conforming to the TDOA method as shown in FIG. 6, the UE 110 may determine a value $TDOA_{1,2}$ between the $1^{st}$ UE 1131 and the $2^{nd}$ UE 1133, and may determine a value $TDOA_{1,3}$ between the 1st UE 1131 and the $3^{rd}$ UE 1135. Accordingly, the UE 110 may determine a $1^{st}$ hyperbolic equation corresponding to the value $TDOA_{1,2}$, determine a $2^{nd}$ hyperbolic equation corresponding to the value $TDOA_{1,3}$, and determine the position of the UE 110 geometrically in association with a point of contact of a $1^{st}$ hyperbola and a $2^{nd}$ hyperbola.

Although it has been described above that the UE 110 directly determines the position of the UE 110 through the TDOA method, this is for exemplary purposes only. Thus, the value $TDOA_{1,2}$ and the value $TDOA_{1,3}$ may be transmitted to a position determining device (not shown in FIG. 11A), e.g., a server device, via the eNB 1150, and the position determining device may determine the position of the UE 110 on the basis of a position coordinate of UEs adjacent to the UE 110 and the value $TDOA_{1,2}$ and the value $TDOA_{1,3}$, and thereafter may transmit the position coordinate of the UE 110 to the UE 110.

In addition, although such a position determining process has been described under the assumption that the UE 110 is located on a 2-dimensional plane for convenience of explanation, the present invention is not limited thereto. Thus, the UE 110 may receive a positioning signal from each of four or more adjacent UEs, and may determine a 3-dimensional position of the UE 110 on the basis thereof.

Figure 12A:
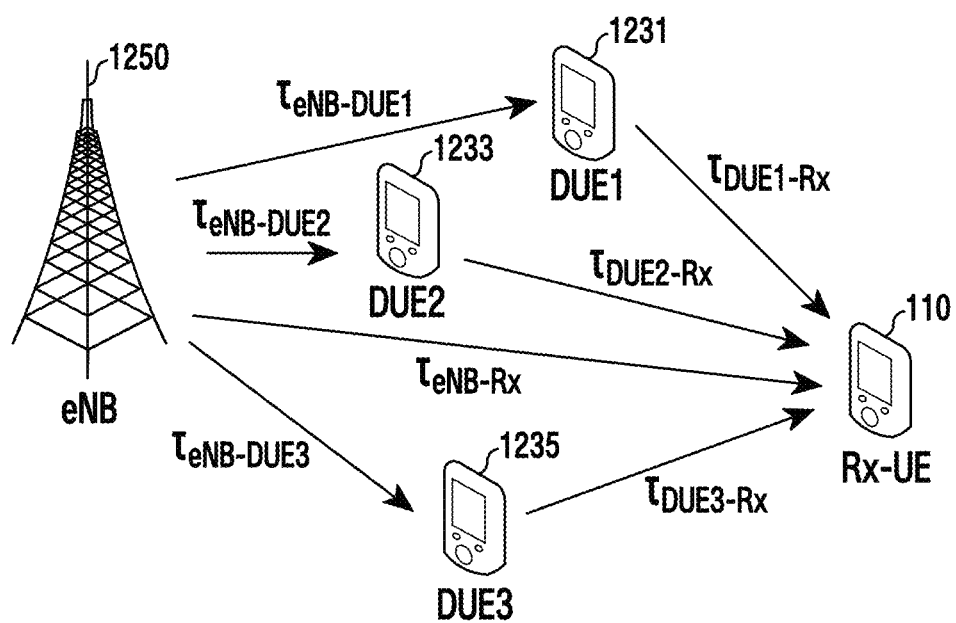
FIG. 12A and FIG. 12B illustrate a method of determining a position of a UE in a wireless communication system according to other exemplary embodiments of the present invention.
Figure 12B:
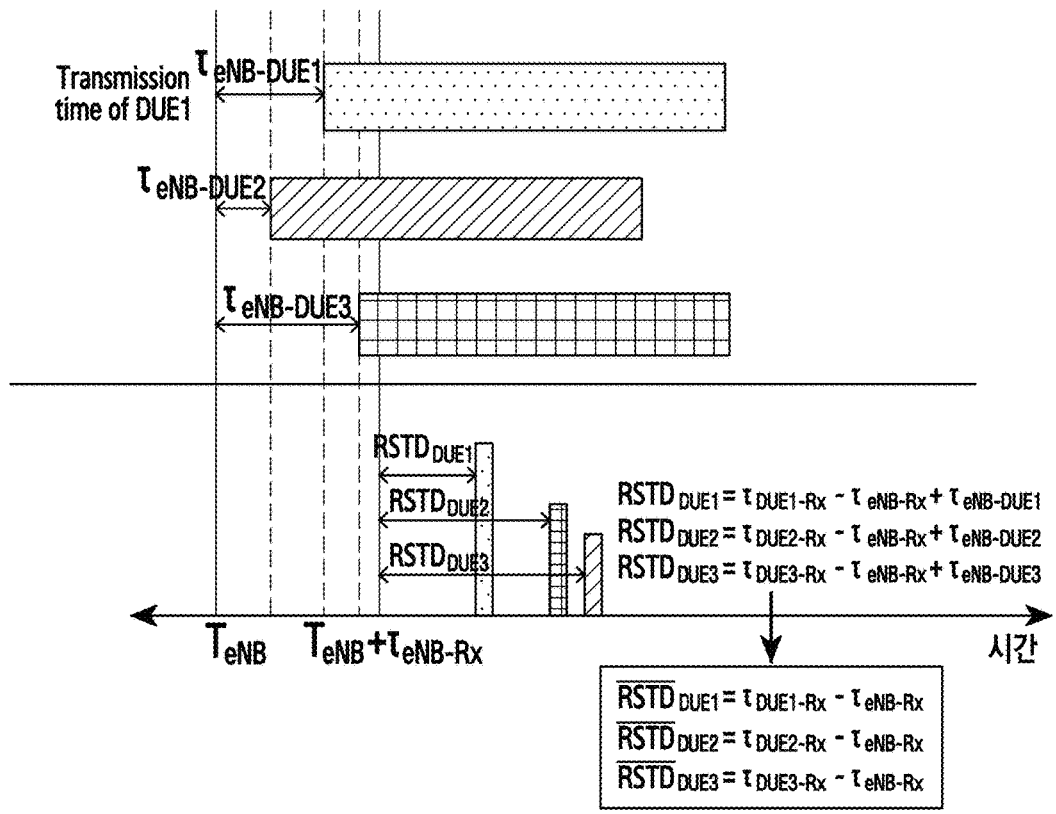

FIG. 12A and FIG. 12B illustrate a method of determining a position of a UE in a wireless communication system according to other exemplary embodiments of the present invention. That is, the method of determining the position of the UE is shown in FIG. 12A and FIG. 12B when a positioning signal is transmitted on the basis of downlink timing. A case of measuring a position of the UE 110 is exemplified in FIG. 12A and FIG. 12B.

A communication network of FIG. 12A may include the UE (Rx-UE) 110, an eNB 1250, a $1^{st}$ UE (DUE 1), a $2^{nd}$ UE (DUE 2) 1233, and a $3^{rd}$ UE (DUE 3) 1235 among UEs adjacent to the UE 110. Herein, the eNB 1250 may correspond to a serving eNB of the UE 110. As shown in FIG. 12A and FIG. 12B, it may be determined that a propagation delay time between the eNB 1250 and the $1^{st}$ UE 1231 is $\tau_{eNB-DUE1}$, a propagation delay time between the eNB 1250 and the $2^{nd}$ UE 1233 is $\tau_{eNB-DUE2}$, a propagation delay time between the eNB 1250 and the $3^{rd}$ UE 1235 is $\tau_{eNB-DUE3}$, a propagation delay time between the $1^{st}$ UE 1231 and the UE 110 is $\tau_{DUE1-Rx}$, a propagation delay time between the $2^{nd}$ UE 1233 and the UE 110 is $\tau_{DUE2\text{-}Rx}$, a propagation delay time between the $3^{rd}$ UE 1235 and the UE 110 is $\tau_{DUE3\text{-}Rx}$, and a propagation delay time between the eNB 1250 and the UE 110 is $\tau_{eNB\text{-}Rx}$.

As shown in FIG. 12A and FIG. 12B, the UE 110 may receive a 1st positioning signal from the $1^{st}$ UE 1231, receive a $2^{nd}$ positioning signal from the $2^{nd}$ UE 1233, and receive a $3^{rd}$ positioning signal from the $3^{rd}$ UE 1235 to determine the position of the UE 110. According to the exemplary embodiment of the present invention, if the positioning signal is transmitted on the basis of the downlink timing, the positioning signal may be transmitted at a time point which is later by a propagation delay time between an eNB and an adjacent UE with respect to a reference time point $T_{eNB}$ of the eNB. In other words, according to the exemplary embodiment of the present invention, the $1^{st}$ UE 1231 may transmit the $1^{st}$ positioning signal to the UE 120 at a time point $T_{eNB}+\tau_{eNB\text{-}DUE1}$, the $2^{nd}$ UE 1233 may transmit the $2^{nd}$ positioning signal to the UE 120 at a time point $T_{eNB}+\tau_{eNB\text{-}DUE2}$, and the $3^{rd}$ UE 1235 may transmit the $3^{rd}$ positioning signal to the UE 120 at a time point $T_{eNB}+\tau_{eNB\text{-}DUE3}$. In addition, in response thereto, the UE 110 may receive the $1^{st}$ positioning signal at a time point $T_{eNB}+\tau_{eNB\text{-}DUE1}+\tau_{DUE1\text{-}Rx}$, may receive the $2^{nd}$ positioning signal at a time point $T_{eNB}+\tau_{eNB\text{-}DUE2}+\tau_{DUE2\text{-}Rx}$, and may receive the $3^{rd}$ positioning signal at a time point $T_{eNB}+\tau_{eNB\text{-}DUE3}+\tau_{DUE3\text{-}Rx}$. This may be generalized as shown in Equation (8) below.

Time of transmitting positioning signal of
$$DUEi = T_{eNB} + \tau_{eNB\text{-}DUEi}$$

Time of receiving positioning signal from
$$DUEi = T_{eNB} + \tau_{eNB\text{-}DUEi} + \tau_{DUEi\text{-}Rx} \quad (8)$$

Herein, DUEi denotes an $i^{th}$ UE adjacent to a UE subjected to positioning, $T_{eNB}$ denotes a propagation delay time between an eNB and the $i^{th}$ UE adjacent to the UE subjected to positioning, and $\tau_{DUEi\text{-}Rx}$ denotes a propagation delay time between the UE subjected to positioning and the $i^{th}$ UE adjacent to the UE subjected to positioning.

In addition, the UE 110 may calculate an offset of a time point at which the positioning signal is received for a positioning signal transmitted based on uplink timing. Herein, an offset $RSTD_{DUEi}$ of the time point at which the positioning signal is received may be defined as shown in Equation (9) below.

$$RSTD_{DUEi} = T_{eNB} + \tau_{eNB-DUEi} + \tau_{DUEi-Rx} - (T_{eNB} + \tau_{eNB-Rx}) \quad (9)$$
$$= \tau_{DUEi-Rx} - \tau_{eNB-Rx} + \tau_{eNB-DUEi}$$

Herein, DUEi denotes an $i^{th}$ UE adjacent to a UE subjected to positioning, $T_{eNB}$ denotes a reference time of an eNB, $\tau_{eNB\text{-}DUEi}$ denotes a propagation delay time between the eNB and the $i^{th}$ UE adjacent to the UE subjected to positioning, $\tau_{DUEi\text{-}Rx}$ denotes a propagation delay time between the $i^{th}$ UE adjacent to the UE subjected to positioning and the UE subjected to positioning, and $\tau_{eNB\text{-}Rx}$ denotes a propagation delay time between the eNB and the UE subjected to positioning.

In addition, for positioning of the UE 110, the UE 110 needs to eliminate the value $\tau_{eNB\text{-}DUEi}$ in Equation (9) above. In this case, the UE 110 may receive the value $\tau_{eNB\text{-}DUEi}$ directly from the eNB 1250, and the value $\tau_{eNB\text{-}DUEi}$ may be transmitted to the UE 110 by being included in each of the $1^{st}$, $2^{nd}$, and $3^{rd}$ positioning signals transmitted by each of the UEs adjacent to the UE, e.g., each of the $1^{st}$ UE 1231, $2^{nd}$ UE 1233, and the $3^{rd}$ UE 1235, to the UE 110. Accordingly, the value $\overline{RSTD}_{DUEi}$ from which the value $\tau_{eNB\text{-}DUEi}$ is eliminated is expressed by Equation (10) below.

$$\overline{RSTD}_{DUEi} = RSTD_{DUEi} - \tau_{eNB-DUEi} = \tau_{DUEi-Rx} - \tau_{eNB-Rx} \quad (10)$$

Herein, $RSTD_{DUEi}$ denotes an offset $RSTD_{DUEi}$ at a time point at which a UE subjected to positioning receives a positioning signal, $\tau_{eNB\text{-}DUEi}$ denotes a propagation delay time between an eNB and an $i^{th}$ UE adjacent to the UE subjected to positioning, $\tau_{DUEi\text{-}Rx}$ denotes a propagation delay time between the $i^{th}$ UE adjacent to the UE subjected to positioning and the UE subjected to positioning, and $\tau_{eNB\text{-}Rx}$ denotes a propagation delay time between the eNB and the UE subjected to positioning.

Next, the position of the UE 110 may be determined according to the TOA method of FIG. 6, or the position of the UE 110 may be determined according to the TDOA method of FIG. 7. First, when assuming a state where a connection between the eNB 1250 and the UE 110 is maintained, the UE 110 may determine the value $\tau_{eNB\text{-}Rx}$ on the basis of a signal transmitted from the eNB 1250. For example, if an RRC connection is maintained between the eNB 1250 and the UE 110, the value $\tau_{eNB\text{-}Rx}$ may be determined from a TA command. Accordingly, the UE 110 may derive a value $TOA_i$ as shown in Equation (11) below by eliminating the value $\tau_{eNB\text{-}Rx}$ in Equation (10) above.

$$TOA_i = \overline{RSTD}_{DUEi} + \tau_{eNB-Rx} = \tau_{DUEi-Rx} \quad (11)$$

Herein, $\overline{RSTD}_{DUEi}$ denotes a value obtained by eliminating a value $\tau_{eNB\text{-}DUEi}$ from an offset $RSTD_{DUEi}$ at a time point at which a UE subjected to positioning receives a positioning signal, $\tau_{eNB\text{-}Rx}$ denotes a propagation delay time between an eNB and the UE subjected to positioning, and $\tau_{DUEi\text{-}Rx}$ denotes a propagation delay time between an $i^{th}$ UE adjacent to the UE subjected to positioning and the UE subjected to positioning.

In this case, the UE 110 may determine a position of the UE 110 on the basis of coordinate information of UEs adjacent to the UE 110 and the value $TOA_i$. In this case, the UE 110 may directly receive the coordinate information of the UEs adjacent to the UE 110 from the eNB 1250, and the coordinate information may be transmitted to the UE 110 by being included in each of the $1^{st}$ positioning signal, $2^{nd}$ positioning signal, and $3^{rd}$ positioning signal transmitted to the UE 110 by each of UEs, e.g., the $1^{st}$ UE 1231, the $2^{nd}$ UE 1233, and the third UE 1235, adjacent to the UE 110.

Herein, the UE 110 may determine a distance between the UEs adjacent to the UE 110 on the basis of the value $TOA_i$ and the velocity of light. For example, a distance between the UE 110 and the $1^{st}$ UE 1231 may be determined as a $1^{st}$ distance value on the basis of a value $TOA_1$ and a value of the velocity of light, a distance between the UE 110 and the $2^{nd}$ UE 1233 may be determined as a $2^{nd}$ distance value on the basis of a value $TOA_2$ and the value of the velocity of light, and a distance between the UE 110 and the third UE 1235 may be determined as a $3^{rd}$ distance value on the basis of a value $TOA_3$ and the value of the velocity of light.

According to the TOA method as shown in FIG. 5, the UE 110 may determine a coordinate corresponding to a point of contact of a circle centered on the coordinate of the $1^{st}$ UE 1231 and having a radius corresponding to the $1^{st}$ distance value, a circle centered on the coordinate of the $2^{nd}$ UE 1233 and having a radius corresponding to the $2^{nd}$ distance value, and a circle centered on the coordinate of the third UE 1235 and having a radius corresponding to the $3^{rd}$ distance value as the position of the UE 110. Although it is described above that the UE 110 directly determines the position of the UE 110 by using the TOA method, this is for exemplary purposes only. Thus, the UE 110 may transmit the calculated $1^{st}$ distance value, $2^{nd}$ distance value, and $3^{rd}$ distance value to a position determining device (not shown in FIG. 12A), e.g., a server device, via the eNB 1250, and the position determining device may determine the position of the UE 110 on the basis of a position coordinate of UEs adjacent to the UE 110 and distance information between the UEs adjacent to the UE 110 and thereafter may transmit the position coordinate of the UE 110 to the UE 110.

In addition, although the position determining process has been described for convenience of explanation under the assumption that the UE 110 is located on the 2-dimensional plane, the present invention is not limited thereto, and thus the UE 110 may receive positioning signals respectively from four or more adjacent eNBs, and a 3-dimensional position of the UE 110 may be determined on the basis of the positioning signals.

In addition, according to the exemplary embodiment of the present invention, the position of the UE 110 may be determined by using the TDOA method of FIG. 7. That is, the UE 110 may calculate a difference of values $\overline{RSTD}_{DUEi}$ calculated in Equation (10) above to eliminate a component $\tau_{eNB-Rx}$, and as a result, a value $TDOA_{i,j}$ may be calculated as shown in Equation (12) below.

$$TDOA_{i,j} = \overline{RSTD}_{DUEi} - \overline{RSTD}_{DUEj} = \tau_{DUEi-Rx} - \tau_{DUEj-Rx} \quad (12)$$

Herein, $DUE_i$ denotes an $i^{th}$ UE adjacent to a UE subjected to positioning, $DUE_j$ denotes a $j^{th}$ UE adjacent to the UE subjected to positioning, $\overline{RSTD}_{DUEi}$ denotes a value obtained by eliminating a value $\tau_{eNB-DUEi}$ from an offset $RSTD_{DUEi}$ at a time point at which the UE subjected to positioning receives a positioning signal from an $i^{th}$ UE, $\overline{RSTD}_{DUEj}$ denote a value obtained by eliminating the value $\tau_{eNB-DUEj}$ from an offset $RSTD_{DUEj}$ at a time point at which the UE subjected to positioning receives a positioning signal from the $j^{th}$ UE, $\tau_{DUEi-Rx}$ denotes a propagation delay time between the $i^{th}$ UE adjacent to the UE subjected to positioning and the UE subjected to positioning, and $\tau_{DUEj-Rx}$ denotes a propagation delay time between the $j^{th}$ UE adjacent to the UE subjected to positioning and the UE subjected to positioning.

In this case, the UE 110 may determine a position of the UE 110 on the basis of coordinate information of UEs adjacent to the UE 110 and the value $TOA_{i,j}$. In this case, the UE 110 may directly receive the coordinate information of the UEs adjacent to the UE 110 from the eNB 1250, and the coordinate information may be transmitted to the UE 110 by being included in each of the $1^{st}$ positioning signal, $2^{nd}$ positioning signal, and $3^{rd}$ positioning signal transmitted to the UE 110 by each of UEs, e.g., the $1^{st}$ UE 1231, the $2^{nd}$ UE 1233, and the third UE 1235, adjacent to the UE 110.

In case of conforming to the TDOA method as shown in FIG. 6, the UE 110 may determine a value $TDOA_{1,2}$ between the $1^{st}$ UE 1231 and the $2^{nd}$ UE 1233, and may determine a value $TDOA_{1,3}$ between the $1^{st}$ UE 1231 and the $3^{rd}$ UE 1235. Accordingly, the UE 110 may determine a $1^{st}$ hyperbolic equation corresponding to the value $TDOA_{1,2}$, determine a $2^{nd}$ hyperbolic equation corresponding to the value $TDOA_{1,3}$, and determine the position of the UE 110 geometrically in association with a point of contact of a $1^{st}$ hyperbola and a $2^{nd}$ hyperbola.

Although it has been described above that the UE 110 directly determines the position of the UE 110 through the TDOA method, this is for exemplary purposes only. Thus, the value $TDOA_{1,2}$ and the value $TDOA_{1,3}$ may be transmitted to a position determining device (not shown in FIG. 12A), e.g., a server device, via the eNB 1150, and the position determining device may determine the position of the UE 110 on the basis of a position coordinate of UEs adjacent to the UE 110 and the value $TDOA_{1,2}$ and the value $TDOA_{1,3}$, and thereafter may transmit the position coordinate of the UE 110 to the UE 110.

In addition, although such a position determining process has been described under the assumption that the UE 110 is located on a 2-dimensional plane for convenience of explanation, the present invention is not limited thereto. Thus, the UE 110 may receive a positioning signal from each of four or more adjacent UEs, and may determine a 3-dimensional position of the UE 110 on the basis thereof.

Figure 13:
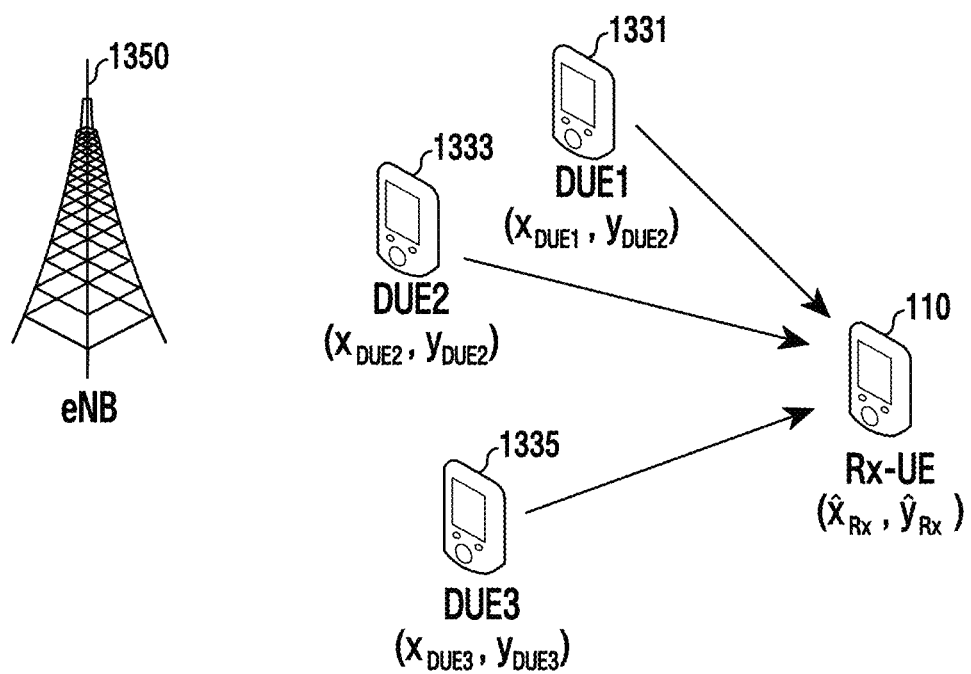
FIG. 13 illustrates a method of evaluating a determined position of a UE in a wireless communication system according to other exemplary embodiments of the present invention.

FIG. 13 illustrates a method of evaluating a determined position of a UE in a wireless communication system according to other exemplary embodiments of the present invention.

A communication network of FIG. 13 may include the UE (Rx-UE) 110, a $1^{st}$ UE (DUE 1) 1331 adjacent to the UE 110, a $2^{nd}$ UE (DUE 2) 1333, a $3^{rd}$ UE (DUE 3) 1335, and an eNB 1350. Herein, the UE 110 may perform D2D communication with respect to each of adjacent UEs, i.e., the 1st UE 1131, the $2^{nd}$ UE 1333, and the $3^{rd}$ UE 1335, to determine a position of the UE 110. In this case, as shown in FIG. 13, it may be predetermined that a position coordinate of the $1^{st}$ UE 1331 is $(X_{DUE1}, y_{DUE1})$, a position coordinate of the $2^{nd}$ UE 1333 is $(X_{DUE2}, y_{DUE2})$, and a position coordinate of the $3^{rd}$ UE 1335 is $(X_{DUE3}, y_{DUE3})$. The UE 110 may receive position coordinates of the adjacent UEs from the eNB. Alternatively, the position coordinates may be received from the adjacent UEs by being included in a positioning signal transmitted by the adjacent UEs to the UE 110.

Under the premise that a position coordinate of the UE 110 is determined as $(\hat{x}_{Rx}, \hat{y}_{Rx})$ according to the procedure described above in FIG. 12 or FIG. 13, whether the position coordinate $(\hat{x}_{Rx}, \hat{y}_{Rx})$ of the UE is accurately determined may be evaluated. As described above in FIG. 7, a propagation delay error caused by an NLOS path is characterized to be in proportion to a distance difference between a transmitting end and a receiving end and to have a positive value. In other words, the closer the actual distance between the UE 110 and the adjacent UEs, the smaller the positioning error caused by the NLOS path.

According to the characteristic of the positioning error caused by the NLOS path, the UE 110 may calculate a distance $\hat{r}_i$ to the adjacent UEs as shown in Equation (13) below on the basis of a currently determined position coordinate $(\hat{x}_{Rx}, \hat{y}_{Rx})$ of the UE 110, thereby evaluating reliability for the currently determined position coordinate of the UE 110.

$$\hat{r}_i = \sqrt{(x_{DUEi} - \hat{x}_{Rx})^2 + (y_{DUEi} - \hat{y}_{Rx})^2} \quad (13)$$

Herein, $x_{DUEi}$ denotes an x-position coordinate of an $i^{th}$ UE adjacent to a UE subjected to positioning, $y_{DUEi}$ denotes a y-position coordinate of the $i^{th}$ UE adjacent to the UE subjected to positioning, $\hat{x}_{Rx}$ denotes a currently determined x-position coordinate of the UE subjected to positioning, and $\hat{y}_{Rx}$ denotes a currently determined y-position coordinate of the UE subjected to positioning.

If a distance value, determined based on Equation (13) above, between the UE 110 and the adjacent UE is less than or equal to a threshold, the UE 110 may determine that an error caused by the NLOS path is relatively small, and as a result, may finally evaluate that the currently determined position coordinate $(\hat{x}_{Rx}, \hat{y}_{Rx})$ of the UE 110 is a reliable value. If at least one of the distance values between the UE 110 and the adjacent UEs is greater than or equal to the threshold, the UE 110 may determine that the error caused by the NLOS path is relatively great, and as a result, may finally evaluate that the currently determined position coordinate ($\hat{x}_{Rx}$, $\hat{y}_{Rx}$) of the UE 110 as a value which is difficult to be reliable. Accordingly, the UE 110 may retransmit a positioning request signal to the eNB 1350 or the adjacent UEs, thereby performing again the positioning on the UE 110.

Figure 14:
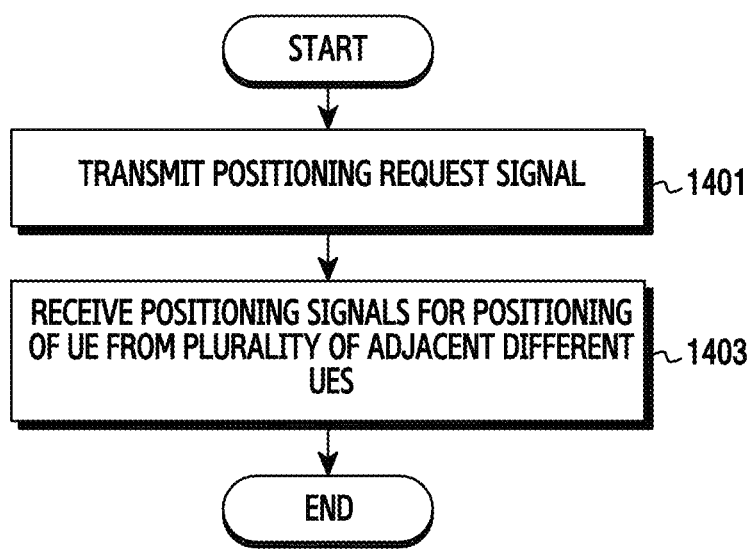
FIG. 14 is a flowchart illustrating an operation of a UE subjected to positioning in a wireless communication system according to other exemplary embodiments of the present invention.

FIG. 14 is a flowchart illustrating an operation of a UE subjected to positioning in a wireless communication system according to other exemplary embodiments of the present invention. An operating method of the UE 110 is exemplified in FIG. 14.

First, in step 1401, the UE may transmit a positioning request signal. Herein, the positioning request signal implies a signal for starting positioning based on D2D communication between the UE and a plurality of adjacent UEs adjacent to the UE. According to the exemplary embodiment of the present invention, the UE may transmit the positioning request signal to an eNB or transmit the positioning request signal to the adjacent UEs.

Next, in step 1403, the UE may receive positioning signals for positioning of the UE from a plurality of adjacent other UEs, in other words, the adjacent UEs. In this case, the positioning signals imply a signal used as a reference to perform positioning based on D2D communication between the UE and the plurality of adjacent UEs. As described above in FIG. 11 and FIG. 12 in detail, the UE may perform positioning of the UE through the aforementioned TOA and TDOA methods or the like on the basis of propagation delay time information on the positioning signal.

Figure 15:
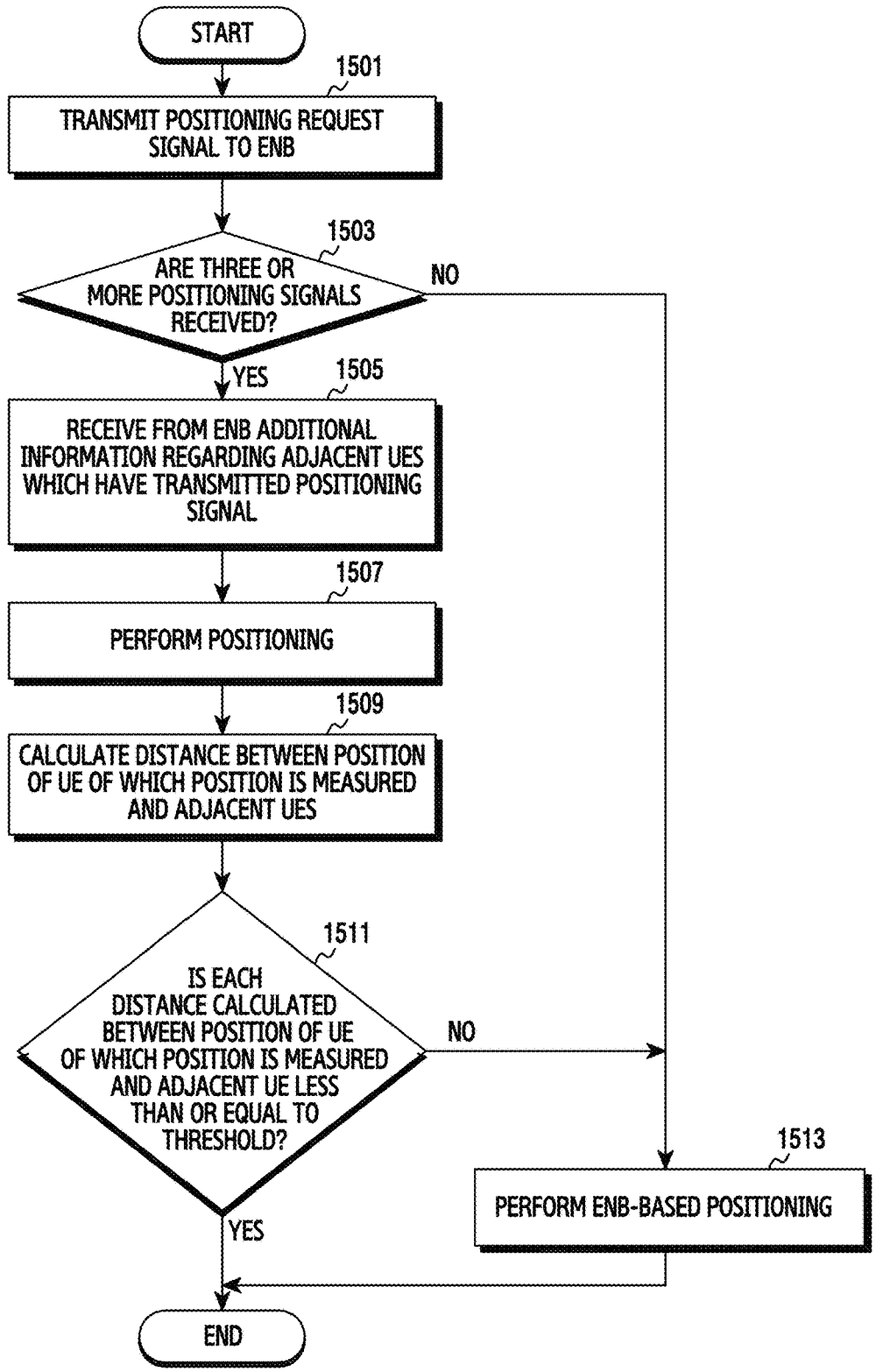
FIG. 15 is a flowchart illustrating an operation of a UE subjected to positioning in a wireless communication system according to exemplary embodiments of the present invention.

FIG. 15 is a flowchart illustrating an operation of a UE subjected to positioning in a wireless communication system according to exemplary embodiments of the present invention. An operating method of the UE 110 is exemplified in FIG. 15.

First, in step 1501, the UE may transmit a positioning request signal for requesting for positioning of the UE to an eNB. Accordingly, a plurality of adjacent UEs for participating in a positioning process based on D2D communication between the UE and the plurality of UEs adjacent to the UE may be determined by the eNB which has received the positioning request signal.

Next, in step 1503, the UE may decide whether three or more positioning signals are received. In other words, the UE decides whether three or more positioning signals are received from a plurality of adjacent UEs. That is, the UE confirms whether three or more positioning signals transmitted from other adjacent UEs are detected. Herein, whether the signals are detected may be decided on the basis of an energy level, receive signal strength, or the like. If the three or more positioning signals are not received, the UE proceeds to step 1513 described below.

Otherwise, if the three or more positioning signals are received, proceeding to step 1505, the UE may receive, from the eNB, additional information regarding adjacent UEs which have transmitted the positioning signal. For example, the UE may receive a $1^{st}$ positioning signal from a $1^{st}$ adjacent UE, receive a $2^{nd}$ positioning signal from a $2^{nd}$ adjacent UE, and receive a $3^{rd}$ signal from a $3^{rd}$ adjacent UE. In some exemplary embodiments, the UE may receive, from the eNB, position coordinate information of the $1^{st}$ UE, position coordinate information of the $2^{nd}$ UE, position coordinate information of the $3^{rd}$ UE, and information on a propagation delay time between the eNB and the $1^{st}$ UE, a propagation delay time between the eNB and the $2^{nd}$ UE, and a propagation delay time between the eNB and the $3^{rd}$ UE. In other exemplary embodiments, the UE may receive, from other UEs, position coordinate information of the $1^{st}$ UE, position coordinate information of the $2^{nd}$ UE, position coordinate information of the $3^{rd}$ UE, and information on a propagation delay time between the eNB and the $1^{st}$ UE, a propagation delay time between the eNB and the $2^{nd}$ UE, and a propagation delay time between the eNB and the $3^{rd}$ UE.

In this case, proceeding to step 1507, positioning may be performed based on D2D communication between the UE and the plurality of adjacent UEs. In other words, as described above in FIG. 11 and FIG. 12 in detail, the UE may perform positioning of the UE through the aforementioned TOA and TDOA methods or the like, on the basis of information on a propagation delay time for the $1^{st}$ positioning signal, a propagation delay time for the $2^{nd}$ positioning signal, and a propagation delay time for the $3^{rd}$ positioning signal. However, according to another exemplary embodiment of the present invention, the step 1507 may be replaced with a process in which the UE transmits measurement-related information to another device (e.g., a server) and receives a measured position.

In addition, in step 1509, the UE may calculate each of distances between the measured position of the UE and the adjacent UEs. In other words, the UE may calculate each of a distance between the UE and the $1^{st}$ UE, a distance between the UE and the $3^{rd}$ UE, and a distance between the UE and the $2^{nd}$ UE on the basis of the position coordinate of the UE measured through step 1501 to step 1507.

Next, in step 1511, the UE decides whether each of distances calculated between the position of the UE of which the position is measured and the adjacent UEs is less than or equal to a threshold. In other words, as described above in FIG. 13 in detail, if each of distances calculated between the position of the UE of which the position is measured and the adjacent UEs is less than or equal to the threshold, the UE may decide that an error caused by an NLOS path is relatively small, and as a result, may finally evaluate that the currently determined position coordinate of the UE is a reliable value.

In operation 1503, if the UE does not receive three or more positioning signals from the plurality of adjacent UEs, in other words, if the UE receives two or less positioning signals from the plurality of adjacent UEs, proceeding to step 1513, eNB-based positioning may be performed. In other words, according to the exemplary embodiment of the present invention, under the assumption that a 2-dimensional coordinate of the UE is measured, a positioning signal must be received from at least three adjacent UEs to perform positioning based on D2D communication. If such a condition is not satisfied, the positioning based on D2D communication is impossible, and the eNB-based positioning is performed.

In addition, in step 1511, if at least one of distances calculated between the position of the UE of which the position is measured and the adjacent UEs is greater than or equal to the threshold, the UE may decide that there is an error caused by the NLOS path, and as a result, may finally evaluate that the currently determined position coordinate of the UE is a value which is difficult to be reliable. In this case, proceeding to step 1513, eNB-based positioning is performed.

According to the exemplary embodiment of the present invention, it has been described that, if a specific condition is not satisfied, proceeding to step 1513, the eNB-based positioning is performed. However, this is for exemplary purposes only, and thus optionally, the D2D-based positioning process may be iteratively performed by repeating the steps 1501 to 1511.

Figure 16:
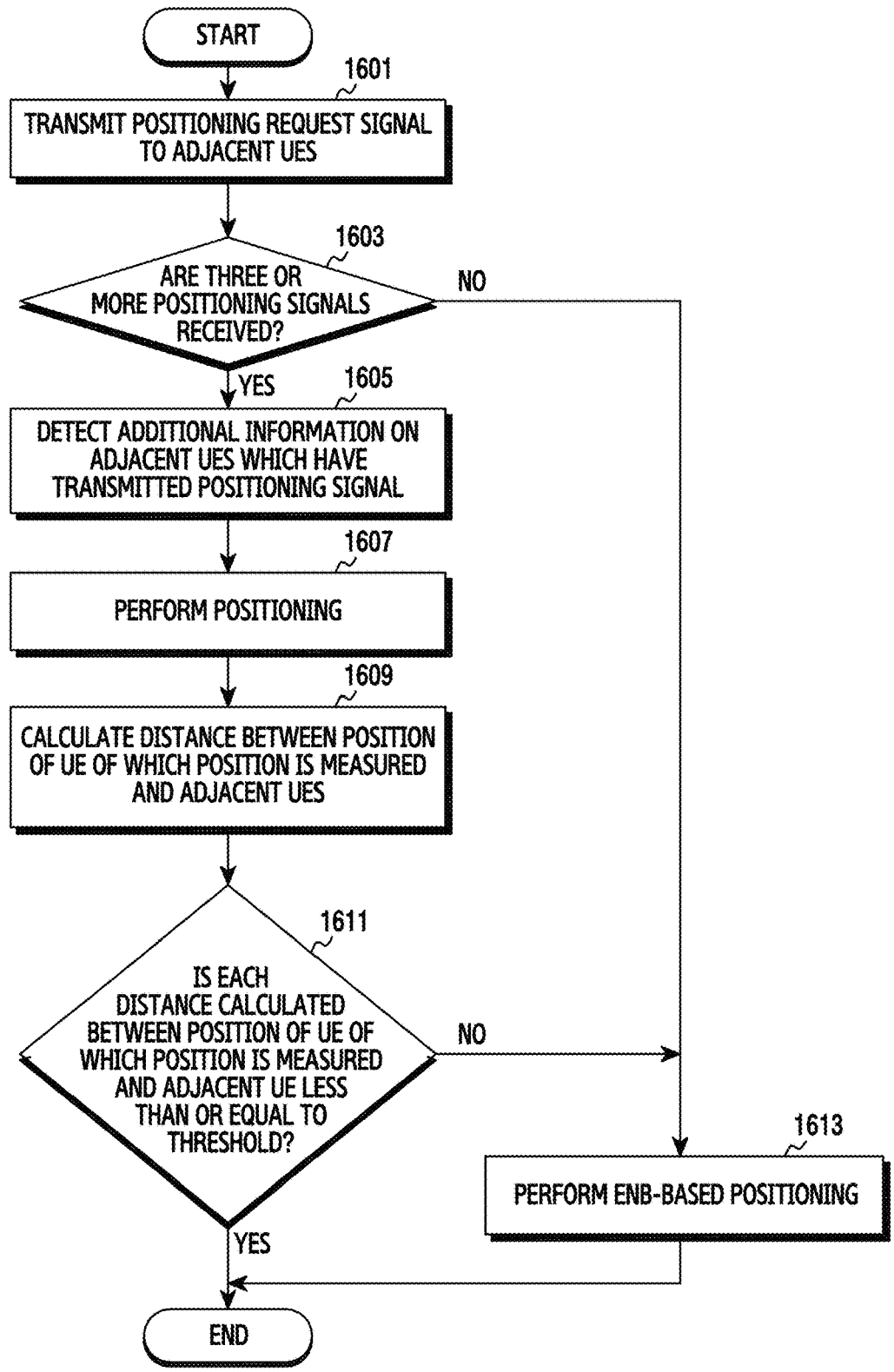
FIG. 16 is a flowchart illustrating an operation of a UE subjected to positioning in a wireless communication system according to other exemplary embodiments of the present invention.

FIG. 16 is a flowchart illustrating an operation of a UE subjected to positioning in a wireless communication system according to other exemplary embodiments of the present invention. An operating method of the UE 110 is exemplified in FIG. 16.

First, in step 1601, the UE transmits a positioning request signal to adjacent UEs. In other words, the UE broadcasts the positioning request signal. That is, the UE may transmit the positioning request signal for requesting for the positioning of the UE to a plurality of adjacent UEs adjacent to the UE. Accordingly, the plurality of adjacent UEs may receive the positioning request signal from the UE, and some of the plurality of adjacent UEs which have received the positioning request signal may be determined as UEs for participating in a positioning process based on D2D communication between the UE and the plurality of adjacent UEs.

Next, in step 1603, the UE decides whether three or more positioning signals are received. In other words, the UE decides whether the three or more positioning signals are received from the plurality of adjacent UEs. That is, the UE confirms whether three or more positioning signals transmitted from other adjacent UEs are detected. Herein, whether the signals are detected may be determined on the basis of an energy level, a receive signal strength, or the like. If the three or more positioning signals are not received, the UE proceeds to step 1613 described below.

Otherwise, if the three or more positioning signals are received, proceeding to step 1605, the UE is capable of detecting additional information on the adjacent UEs which have transmitted the positioning signal. For example, the UE may receive a $1^{st}$ positioning signal from a $1^{st}$ adjacent UE, receive a $2^{nd}$ positioning signal from a $2^{nd}$ adjacent UE, and receive a $3^{rd}$ signal from a $3^{rd}$ adjacent UE. In this case, the UE may detect position coordinate information of the $1^{st}$ UE and propagation delay time information between the eNB and the $1^{st}$ UE, which are included in the $1^{st}$ positioning signal, detect position coordinate information of the $2^{nd}$ UE and propagation delay time information between the eNB and the $2^{nd}$ UE, which are included in the $2^{nd}$ positioning signal, and detect position coordinate information of the $3^{rd}$ UE and propagation delay time information between the eNB and the $3^{rd}$ UE, which are included in the $3^{rd}$ positioning signal.

In this case, proceeding to step 1607, positioning may be performed based on D2D communication between the UE and the plurality of adjacent UEs. In other words, as described above in FIG. 11 and FIG. 12 in detail, the UE may perform positioning of the UE through the aforementioned TOA and TDOA methods or the like, on the basis of information on a propagation delay time for the $1^{st}$ positioning signal, a propagation delay time for the $2^{nd}$ positioning signal, and a propagation delay time for the $3^{rd}$ positioning signal. However, according to another exemplary embodiment of the present invention, the step 1607 may be replaced with a process in which the UE transmits measurement-related information to another device (e.g., a server) and receives a measured position.

In addition, in step 1609, the UE may calculate each of distances between the measured position of the UE and the adjacent UEs. In other words, the UE may calculate each of a distance between the UE and the $1^{st}$ UE, a distance between the UE and the $3^{rd}$ UE, and a distance between the UE and the $2^{nd}$ UE on the basis of the position coordinate of the UE measured through step 1601 to step 1607.

Next, in step 1611, the UE decides whether each of distances calculated between the position of the UE of which the position is measured and the adjacent UEs is less than or equal to a threshold. In other words, as described above in FIG. 13 in detail, if each of distances calculated between the position of the UE of which the position is measured and the adjacent UEs is less than or equal to the threshold, the UE may decide that an error caused by an NLOS path is relatively small, and as a result, may finally evaluate that the currently determined position coordinate of the UE is a reliable value.

Otherwise, in operation 1603, if the UE does not receive three or more positioning signals from the plurality of adjacent UEs, in other words, if the UE receives two or less positioning signals from the plurality of adjacent UEs, proceeding to step 1613, eNB-based positioning may be performed. In other words, according to the exemplary embodiment of the present invention, under the assumption that a 2-dimensional coordinate of the UE is measured, a positioning signal must be received from at least three adjacent UEs to perform positioning based on D2D communication. If such a condition is not satisfied, the positioning based on D2D communication is impossible, and the eNB-based positioning is performed.

In addition, in step 1611, if at least one of distances calculated between the position of the UE of which the position is measured and the adjacent UEs is greater than or equal to the threshold, the UE may decide that there is an error caused by the NLOS path, and as a result, may finally evaluate that the currently determined position coordinate of the UE is a value which is difficult to be reliable. In this case, proceeding to step 1613, eNB-based positioning is performed.

According to the exemplary embodiment of the present invention, it has been described that, if a specific condition is not satisfied, proceeding to step 1613, the eNB-based positioning is performed. However, this is for exemplary purposes only, and thus optionally, the D2D-based positioning process may be iteratively performed by repeating the steps 1601 to 1611.

Figure 17:
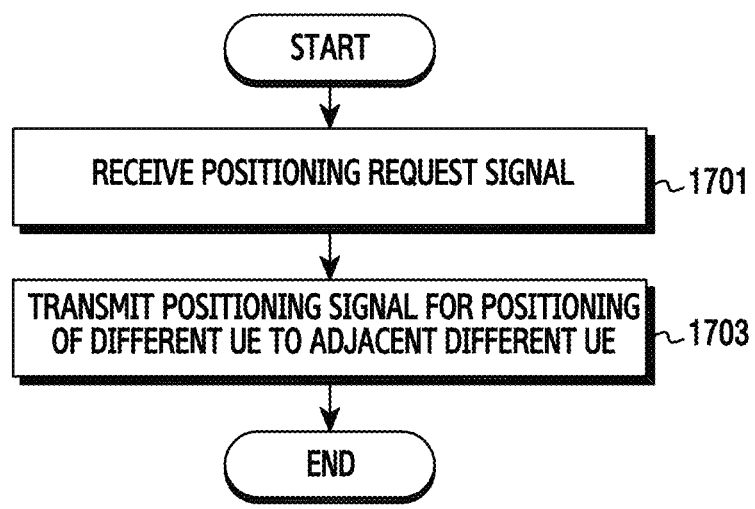
FIG. 17 is a flowchart illustrating an operation of an adjacent UE for determining a position of a UE in a wireless communication system according to other exemplary embodiments of the present invention.

FIG. 17 is a flowchart illustrating an operation of an adjacent UE for determining a position of a UE in a wireless communication system according to other exemplary embodiments of the present invention. An operating method of a UE adjacent to the UE 110 is exemplified in FIG. 17.

First, in step 1701, an adjacent UE adjacent to the UE may receive a positioning request signal. Herein, the positioning request signal implies a signal for starting positioning based on D2D communication between the UE and a plurality of adjacent UEs adjacent to the UE. According to the exemplary embodiment of the present invention, the adjacent UE may receive the positioning request signal from the UE or may receive the positioning request signal from an eNB.

Next, in step 1703, the adjacent UE may transmit a positioning signal for positioning of the UE to a other adjacent UE, in other words, the UE. In this case, the positioning signal implies a signal used as a reference to perform positioning based on D2D communication between the UE and the plurality of adjacent UEs. As described above in FIG. 11 and FIG. 12 in detail, the UE which has received the positioning signal may perform positioning of the UE through the aforementioned TOA and TDOA methods or the like on the basis of propagation delay time information on the positioning signal.

Figure 18:
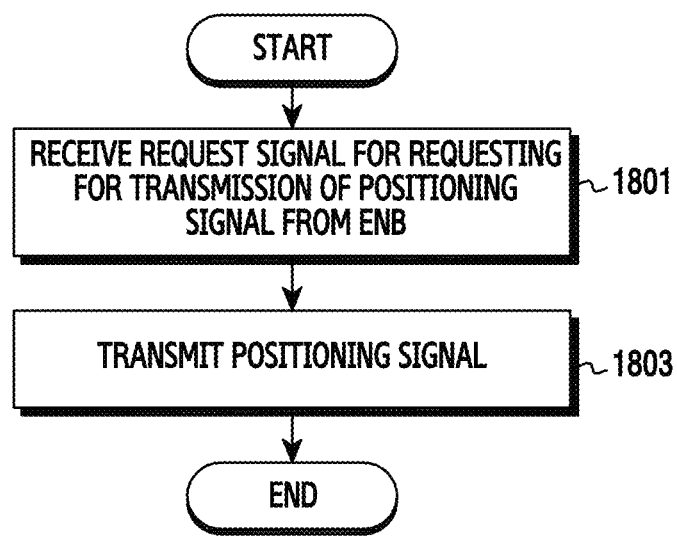
FIG. 18 is a flowchart illustrating an operation of an adjacent UE for determining a position of a UE in a wireless communication system according to exemplary embodiments of the present invention.

FIG. 18 is a flowchart illustrating an operation of an adjacent UE for determining a position of a UE in a wireless communication system according to exemplary embodiments of the present invention. An operating method of a UE adjacent to the UE 110 is exemplified in FIG. 18.

First, in step 1801, a UE adjacent to the UE may receive a request signal for requesting for transmission of a positioning signal from an eNB. In other words, for the positioning of the UE, the eNB may receive the request signal for instructing the adjacent UE to transmit the positioning signal, and in response thereto, the adjacent UE may receive the request signal.

Next, in step 1803, the adjacent UE may transmit the positioning signal to the UE. In response thereto, upon receiving the positioning signal, as described above in FIG. 11 and FIG. 12 in detail, the UE may perform the positioning of the UE through the aforementioned TOA and TDOA methods or the like on the basis of propagation delay time information regarding the positioning signal.

Figure 19:
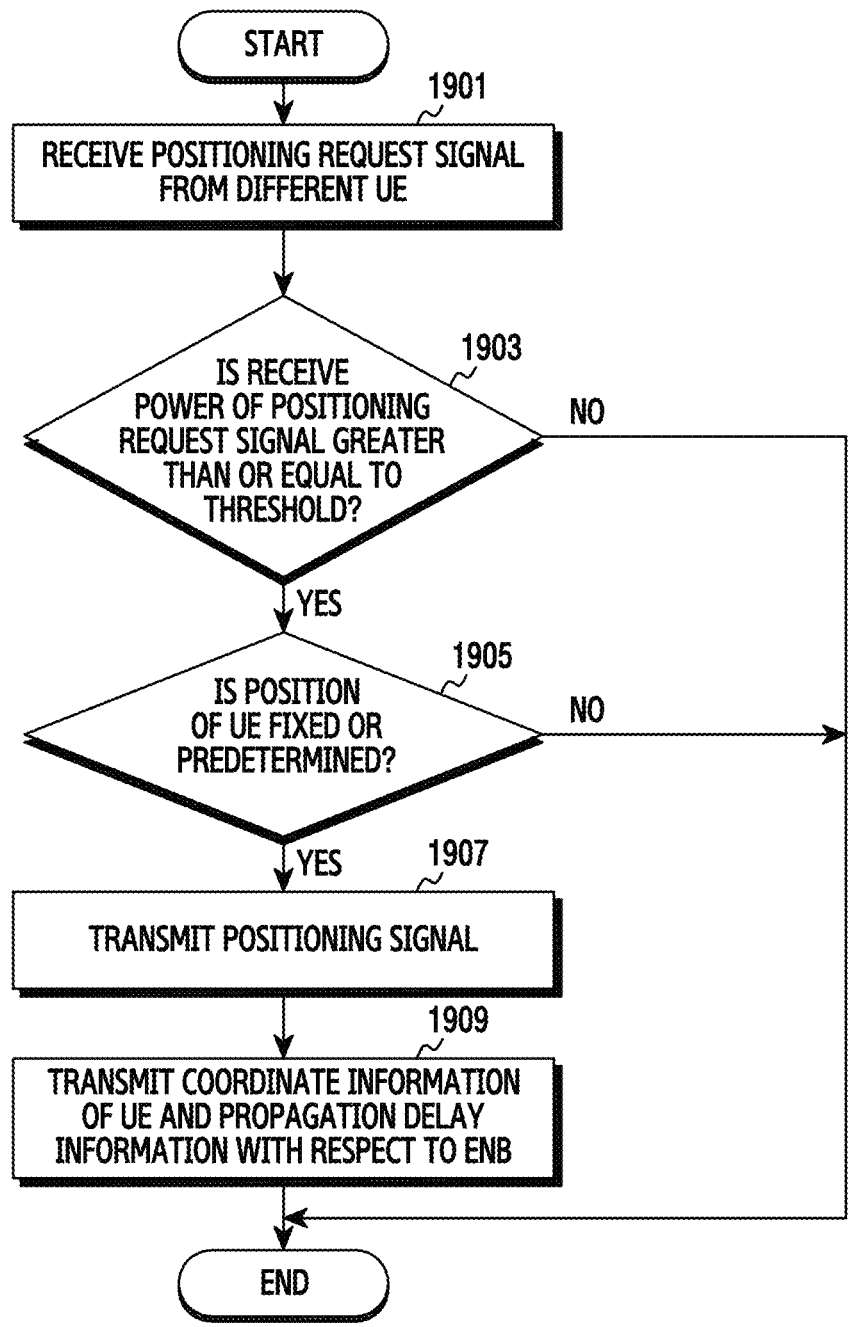
FIG. 19 is a flowchart illustrating an operation of an adjacent UE for determining a position of a UE in a wireless communication system according to other exemplary embodiments of the present invention.

FIG. 19 is a flowchart illustrating an operation of an adjacent UE for determining a position of a UE in a wireless communication system according to other exemplary embodiments of the present invention. An operating method of a UE adjacent to the UE 110 is exemplified in FIG. 19.

First, in step 1901, a UE adjacent to the UE may receive a positioning request signal from the UE. In other words, for the positioning of the UE, the UE may transmit the positioning request signal for instructing transmission of the positioning signal to the adjacent UE, and in response thereto, the adjacent UE may receive the request signal.

Next, in step 1903, the adjacent UE may decide whether receive power of the positioning request signal is greater than or equal to a threshold, and may determine whether to transmit the positioning signal to the UE on the basis of the decision. In other words, the adjacent UE may decide that a distance between the UE and the adjacent UE is relatively proximate if measured receive power value of the positioning request signal is greater than or equal to the threshold, and may decide that a probability of ensuring a LOS path between the UE and the adjacent UE is relatively high if the distance between the UE and the adjacent UE is relatively proximate. As a result, the procedure may proceed to step 1905.

In addition, in step 1905, the adjacent UE may decide whether the position of the adjacent UE is fixed or predetermined. In other words, if position information of the adjacent UE is not determined, even if the distance between the UE and the adjacent UE is relatively proximate, the adjacent UE of which position information is not determined cannot contribute to determining of the distance between the UE and the adjacent UE. Accordingly, if the position of the adjacent UE is fixed or predetermined, proceeding to step 1907, the adjacent UE transmits a positioning signal to the UE.

Otherwise, if the receive power of a positioning request signal is less than the threshold in step 1903 or if the position of the adjacent UE is not fixed or is not predetermined in step 1905, the adjacent UE may determine that it corresponds to a UE which cannot contribute to measuring of the distance between the UE and the adjacent UE. As a result, the procedure according to the exemplary embodiment of the present invention may end.

In addition, the adjacent UE may transmit a positioning signal to the UE in step 1907, and may transmit coordinate information of the adjacent UE and propagation delay information with respect to the adjacent UE and the eNB in step 1909. In this case, upon receiving the positioning signal, the coordinate information of the adjacent UE, and the propagation delay information with respect to the adjacent UE and the eNB, as shown in FIG. 11 and FIG. 12, the UE may perform positioning of the UE through the aforementioned TOA and TDOA methods or the like on the basis of propagation delay time information on the positioning signal.

In some exemplary embodiments, the UE may receive the propagation delay information. The propagation delay information may be propagation delay information between the eNB and other UEs. For example, the UE may receive the propagation delay information from the other UEs. For another example, the UE may receive the propagation delay information from the eNB.

In some other exemplary embodiments, the UE may confirm the propagation delay information from the positioning signals.

Figure 20:
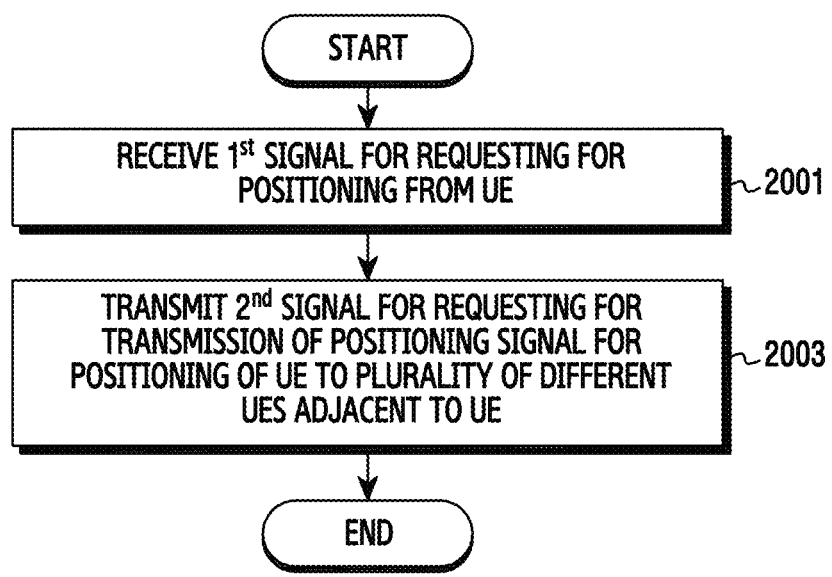
FIG. 20 is a flowchart illustrating an operation of an evolved NodeB (eNB) for determining a position of a UE in a wireless communication system according to other exemplary embodiments of the present invention.

FIG. 20 is a flowchart illustrating an operation of an eNB for determining a position of a UE in a wireless communication system according to other exemplary embodiments of the present invention.

First, in step 2001, an eNB may receive a $1^{st}$ signal for requesting for positioning from the UE. Herein, the $1^{st}$ signal implies a signal for starting positioning based on D2D communication between the UE and a plurality of adjacent UEs adjacent to the UE.

Next, in step 2003, the eNB may transmit a $2^{nd}$ signal for requesting for transmission of a positioning signal for positioning of the UE to a plurality of other UEs adjacent to the UE, in other words, to the plurality of adjacent UEs.

In this case, the adjacent UEs which have received the $2^{nd}$ signal may transmit a positioning signal for positioning of the UE, and the UE which has received the positioning signal may perform positioning of the UE as described above in FIG. 11 and FIG. 12 in detail through the aforementioned TOA and TDOA methods or the like on the basis of propagation delay time information on the positioning signal.

Figure 21:
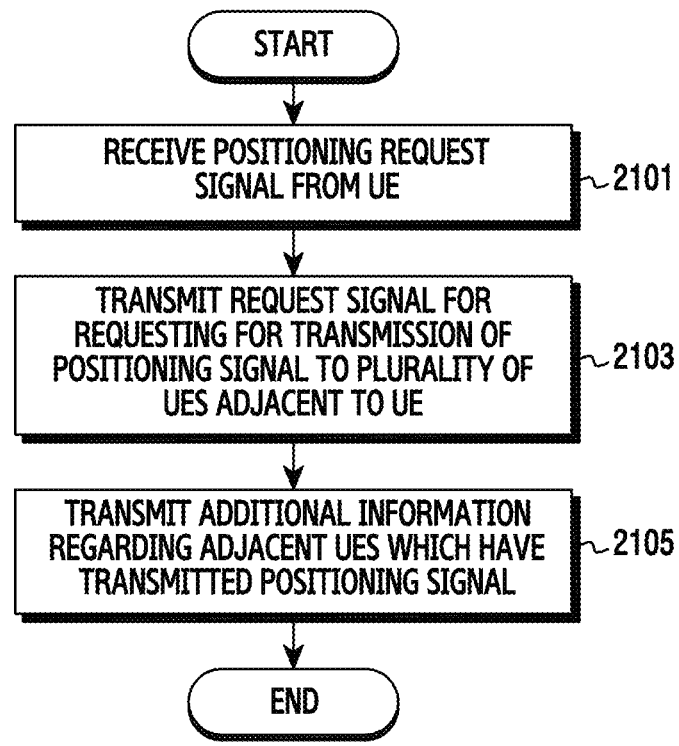
FIG. 21 is a flowchart illustrating an operation of an eNB for determining of a position of a UE in a wireless communication system according to exemplary embodiments of the present invention.

FIG. 21 is a flowchart illustrating an operation of an eNB for determining of a position of a UE in a wireless communication system according to exemplary embodiments of the present invention.

First, in step 2101, an eNB may receive a positioning request signal from a UE. Accordingly, upon receiving the positioning request signal, the eNB may be capable of determining the UE and a plurality of adjacent UEs for participating in a positioning process based on D2D communication between the plurality of UEs adjacent to the UE.

Next, in step 2103, the eNB may transmit a request signal for requesting the plurality of UEs adjacent to the UE to transmit a positioning signal. In other words, for the positioning of the UE, the eNB may receive the request signal for instructing the plurality of adjacent UEs to transmit the positioning signal, and in response thereto, each of the adjacent UEs may receive the request signal.

In addition, in step 2105, the eNB may transmit, to the UE, additional information regarding the adjacent UEs which have transmitted the positioning signal. In other words, the eNB may transmit, to the positioning UE, position coordinate information of the adjacent UEs which have transmitted the position signal, propagation delay time information between the eNB and the adjacent UEs which have transmitted the positioning signal, or the like, and the positioning UE may perform positioning on the positioning UE on the basis of the received information.

Figure 22:
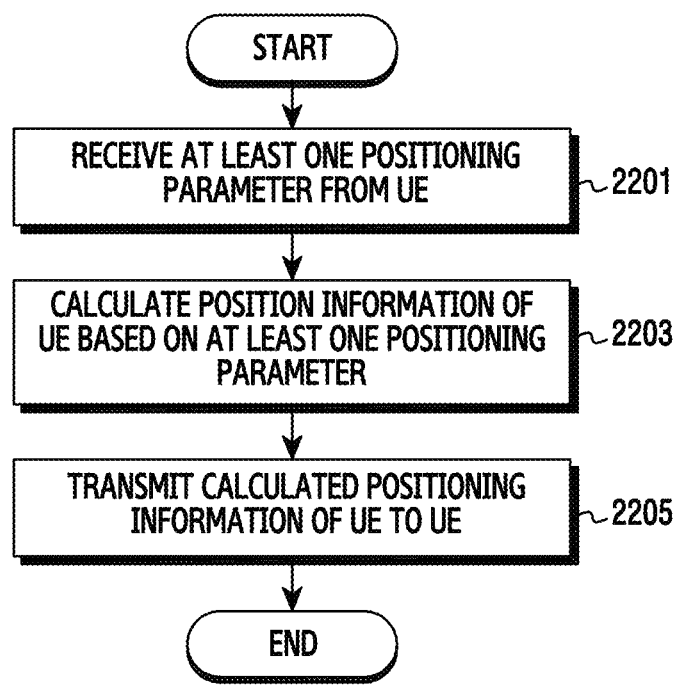
FIG. 22 is a flowchart illustrating an operation of a position determining device for determining a position of a UE in a wireless communication system according to other exemplary embodiments of the present invention.

FIG. 22 is a flowchart illustrating an operation of a position determining device for determining a position of a UE in a wireless communication system according to other exemplary embodiments of the present invention. An operating method of another device is exemplified in FIG. 22 when a position of the UE 110 is measured by the another device other than the UE 110.

First, in step 2201, a position determining device may receive at least one positioning parameter from a UE. According to the exemplary embodiment of the present invention, the UE may be referred to as a UE subjected to positioning, and as described above in FIG. 11 and FIG. 12, the at least one positioning parameter may include a value $TOA_i$ and a value $TDOA_{i,j}$. As a result, the position determining device may receive at least one of the value $TOA_i$ and the value $TDOA_{i,j}$.

Next, in step 2203, the position determining device may calculate position information of the UE on the basis of at least one positioning parameter. In other words, the position determining device may calculate the position information of the UE according to the TOA method or the TDOA method as described above in FIG. 11 and FIG. 12 in detail on the basis of at least one of the values $TOA_i$ and $TDOA_{i,j}$ received from the UE.

In addition, in step 2205, the position determining device may transmit the calculated position information of the UE to the UE. In other words, a position coordinate of the UE determined according to the TOA method or the TDOA method may be transmitted to the UE.

Measurement parameters for positioning may be collected according to the aforementioned various exemplary embodiments. Herein, the measurement parameters may include a reception time, reception time difference, or the like for a positioning signal. The positioning based on the measurement parameters may be performed by a UE, an eNB, or an additional device. In this case, a detailed process of the positioning is as follows.

In the description regarding FIG. 1 to FIG. 22, a method of determining a 2-dimensional position of a UE in a wireless communication system is mainly described according to the exemplary embodiment of the present invention. However, as described above, the method of determining the position of the UE according to the exemplary embodiment of the present invention is not limited to 2-dimensional position determination, and thus may also be applied to 3-dimensional position determination. That is, the aforementioned position determining method may also be applied in a situation of FIG. 23 described below.

Figure 23:
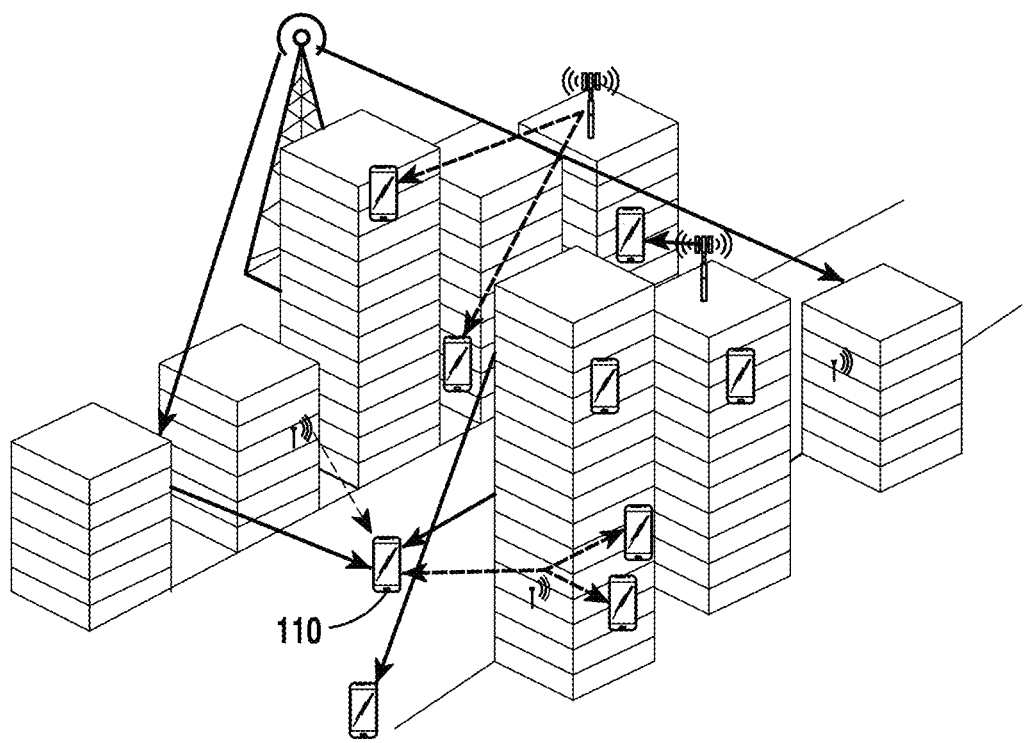
FIG. 23 illustrates a method of determining a position of a UE in a wireless communication system according to exemplary embodiments of the present invention.

FIG. 23 illustrates a method of determining a position of a UE in a wireless communication system according to exemplary embodiments of the present invention. Referring to FIG. 23, the UE 110 is located between high-rise buildings. As shown in FIG. 23, in a situation where the number of users located in the high-rise building or the like is increasing, it is difficult to determine a correct position of the UE 110 through a 2-dimensional position determining method, and thus the correct position of the UE 110 may be determined through a 3-dimensional position determining method. Accordingly, a more effective position determining method is required in the determining of the 3-dimensional position of the UE.

As described above in FIG. 6, a plurality of hyperbolic equations corresponding to a value $TDOA_i$ for an $i^{th}$ eNB (if the position of the UE is determined based on the eNB) or an adjacent UE (if the position of the UE is determined based on D2D communication) may be determined according to Equation (2) above, and the position of the UE may be determined through a decision algorithm for determining a solution of the plurality of hyperbolic equations.

According to the exemplary embodiment of the present invention, the decision algorithm may include a Taylor series-based algorithm. In other words, according to the Taylor series-based algorithm, a non-linear hyperbolic equation, of which a solution is difficult to be obtained, may be expended into a linear equation through the Taylor series, and an approximate solution of the hyperbolic equation may be determined through iterative estimation. A process of expanding and approximating the hyperbolic equation into a linear equation through the Taylor series is expressed by Equation (14) below.

$$r_{(t,i,j)}(x_t, y_t, x_i, y_i, x_y, y_y) = \sqrt{(x_t - x_i)^2 + (y_t - y_i)^2} - \sqrt{(x_t - x_j)^2 + (y_t - y_j)^2} \quad (14)$$

$$= m_{(i,j)} - e_{(t,i,j)}$$

$$= r_{(t,i,j)} + \frac{\partial r_{(t,i,j)}}{\partial x_t} \Delta x +$$

$$\frac{\partial r_{(t,i,j)}}{\partial y_t} \Delta y + \ldots$$

$$\cong r_{(t,i,j)} + \frac{\partial r_{(t,i,j)}}{\partial x_t} \Delta x + \frac{\partial r_{(t,i,j)}}{\partial y_t} \Delta y$$

Herein, $r_{(t,i,j)}$ denotes a reception time difference of a hyperbolic equation generated based on an $i^{th}$ eNB or UE or a $j^{th}$ eNB or UE when an algorithm based on Taylor series is performed t times, m(i,j) denotes an actual value of r(t,i,j), e(i,j) denotes an error when measuring m(i,j), and $\Delta x$ and $\Delta y$ denote an amount of positional change generated when the algorithm based on the Taylor series is performed iteratively.

In Equation (14) above, a $1^{st}$-order linear equation which is approximated to $\Delta x$ and $\Delta y$ is determined by eliminating the terms $\Delta x$ and $\Delta y$ of a $2^{nd}$ order or a higher order. Thereafter, a matrix equation for estimating $\Delta x$ and $\Delta y$ may be generated after substituting a UE's initial position value randomly set at $(x_t, y_t)$. In this case, the initial position value may be set to an average position of eNBs adjacent to the UE which intends to determine the position or, if the position is determined based on D2D, may set to an average position of an adjacent fixed UE. Herein, a matrix equation for estimating $\Delta x$ and $\Delta y$ is expressed by Equation (15) below.

$$\begin{bmatrix} \frac{\partial r_{(0,2,1)}}{\partial x_0} & \frac{\partial r_{(0,2,1)}}{\partial y_0} \\ \frac{\partial r_{(0,3,1)}}{\partial x_0} & \frac{\partial r_{(0,3,1)}}{\partial y_0} \end{bmatrix} \begin{bmatrix} \Delta x \\ \Delta y \end{bmatrix} = \begin{bmatrix} m_{(2,1)} - r_{(0,2,1)} \\ m_{(3,1)} - r_{(0,3,1)} \end{bmatrix} - \begin{bmatrix} e_{(2,1)} \\ e_{(3,1)} \end{bmatrix} \quad (15)$$

Herein, $r_{(t,i,j)}$ denotes a reception time difference of a hyperbolic equation generated based on an $i^{th}$ eNB or UE or a $j^{th}$ eNB or UE when an algorithm based on Taylor series is performed t times, m(i,j) denotes an actual value of r(t,i,j), e(i,j) denotes an error when measuring m(i,j), and $\Delta x$ and $\Delta y$ denote an amount of positional change generated when the algorithm based on the Taylor series is performed iteratively.

In addition, in Equation (15), $\delta$ which is a matrix of $\Delta x$ and $\Delta y$ may be acquired by performing an operation of a transpose matrix and an inverse matrix.

$$\delta = [H^T Q^{-1} H]^{-1} H^T Q^{-1} Z \quad (16)$$

Herein, the matrix H denotes $$\begin{bmatrix} \frac{\partial r_{(0,2,1)}}{\partial x_0} & \frac{\partial r_{(0,2,1)}}{\partial y_0} \\ \frac{\partial r_{(0,3,1)}}{\partial x_0} & \frac{\partial r_{(0,3,1)}}{\partial y_0} \end{bmatrix},$$

the matrix Z denotes $$\begin{bmatrix} m_{(2,1)} - r_{(0,2,1)} \\ m_{(3,1)} - r_{(0,3,1)} \end{bmatrix} - \begin{bmatrix} e_{(2,1)} \\ e_{(3,1)} \end{bmatrix},$$

and the matrix Q denotes a covariance matrix for a positioning error.

Estimation values $x_1$ and $y_1$ of the positioning of the UE may be acquired by iterating the algorithm one time by applying the $\Delta x$ and $\Delta y$ acquired through Equation (16) above to the initial position value $x_0$ and $y_0$ of the UE as shown in Equation (17) below, and a coordinate (x,y) of a UE having a minimum square solution may be determined by iteratively performing the aforementioned matrix operation.

$$\begin{bmatrix} x_1 \\ y_1 \end{bmatrix} = \begin{bmatrix} x_0 \\ y_0 \end{bmatrix} + \begin{bmatrix} \Delta x \\ \Delta y \end{bmatrix} \quad (17)$$

According to another exemplary embodiment of the present invention, the decision algorithm may include a Fang algorithm. In other words, according to the Fang algorithm, the position of the UE may be measured by determining a solution of a simultaneous equation after simplifying the hyperbolic equation through an operation of performing parallel movement and rotation movement on a non-linear type hyperbolic equation of which a solution is difficult to be obtained in general. In this case, the Fang algorithm is characterized in that a iterative operation does not exist unlike in the algorithm based on the Taylor series.

According to the exemplary embodiment of the present invention, when it is assumed that eNB-based positioning is performed, in the presence of $1^{st}$, $2^{nd}$, and $3^{rd}$ eNBs adjacent to a UE which requires positioning, a position coordinate $(x_1, y_1)$ of the $1^{st}$ eNB may be set to an origin (0, 0) on any coordinate plane, and a position coordinate of the $2^{nd}$ eNB may be set to $(x_2, 0)$ so that the $2^{nd}$ eNB is located on an x-axis on the coordinate plane. Accordingly, a $1^{st}$ hyperbolic equation $r_{(2,1)}$ generated on the basis of the $1^{st}$ and $2^{nd}$ eNBs and a $2^{nd}$ hyperbolic equation $r_{(3,1)}$ generated on the basis of the $1^{st}$ and $3^{rd}$ eNBs may be determined by Equation (18) below.

$$r_{(2,1)} = \sqrt{(x_t-x_2)^2+y_t^2} - \sqrt{x_t^2+y_t^2}$$

$$r_{(3,1)} = \sqrt{(x_t-x_3)^2+(y_t-y_3)^2} - \sqrt{x_t^2+y_t^2} \quad (18)$$

Herein, $x_t$ and $y_t$ denote an x-axis coordinate and y-axis coordinate of the UE which requires positioning, $x_2$ denotes an x-axis coordinate of the $2^{nd}$ eNB, and $x_3$ and $y_3$ denote an x-axis coordinate and y-axis coordinate of the $3^{rd}$ eNB.

In this case, it may be summarized as an equation regarding $x_t$ and $y_t$ as shown in Equation (19) below by squaring both sides of each hyperbolic equation based on Equation (18) above.

$$y_t = gx_t + h \quad (19)$$

Herein, $g=\{r_{(3,1)}(x_2/r_{(2,1)})-x_3\}/y_3$ $h=\{K_3-r_{(3,1)}^2+r_{(3,1)}\cdot r_{(2,1)}(1-(x_2/r_{(2,1)})^2)\}/2y_3$, and $K_3=x_3^2+y_3^2 \cdot r_{(2,1)}$ denotes a $1^{st}$ hyperbolic equation generated based on the $1^{st}$ and $2^{nd}$ eNBs, $r_{(3,1)}$ denotes a $2^{nd}$ hyperbolic equation generated based on the $1^{st}$ and $3^{rd}$ eNBs, $x_t$ and $y_t$ denote an x-axis coordinate and y-axis coordinate of a UE which requires positioning, $x_2$ denotes an x-axis coordinate of the $2^{nd}$ eNB, and $x_3$ and $y_3$ denote an x-axis coordinate and y-axis coordinate of the $3^{rd}$ eNB.

In addition, if Equation (19) above is substituted to the $2^{nd}$ hyperbolic equation in Equation (18) above, it may be summarized as a $2^{nd}$-order equation regarding $x_t$ as shown in Equation (20) below.

$$dx_t^2 + ex_t + f = 0 \quad (20)$$

Herein, $d=-\{1-(x_2/r_{(2,1)})^2+g^2\}$, $e=x_2\{1-(x_2/r_{(2,1)})^2\}-2gh$, and $f=(r_{(2,1)}^2/4)\{1-(x_2/r_{(2,1)})^2\}^2-h^2$. Also, $g=\{r_{(3,1)}(x_2/r_{(2,1)})-x_3\}/y_3$, $h=\{K_3-r_{(3,1)}^2+r_{(3,1)}\cdot r_{(2,1)}(1-(x_2/r_{(2,1)})^2)\}/2y_3$, and $K_3=x_3^2+y_3^2\cdot r_{(2,1)}$ denotes a $1^{st}$ hyperbolic equation generated based on the $1^{st}$ and $2^{nd}$ eNBs, $r_{(3,1)}$ denotes a $2^{nd}$ hyperbolic equation generated based on the $1^{st}$ and $3^{rd}$ eNBs, $x_t$ and $y_t$ denote an x-axis coordinate and y-axis coordinate of a UE which requires positioning, $x_2$ denotes an x-axis coordinate of the $2^{nd}$ eNB, and $x_3$ and $y_3$ denote an x-axis coordinate and y-axis coordinate of the $3^{rd}$ eNB.

In this case, an x-axis coordinate of the UE which requires positioning may be determined by determining a solution $x_t$ of Equation (20) above, and a value $y_t$ may be determined by substituting the value $x_t$ to Equation (19) above. As a result, the position coordinate of the UE may be finally determined.

Although the procedure of determining the position of the UE subjected to positioning through the Fang algorithm has been described above under the assumption that the eNB-based positioning is performed, this is for exemplary purposes only, and thus the position determining through the Fang algorithm may also be achieved even if the D2D-based positioning is performed. In this case, the $1^{st}$, $2^{nd}$, and $3^{rd}$ eNBs exemplified above may be replaced with $1^{st}$, $2^{nd}$, and $3^{rd}$ UEs adjacent to the UE subjected to positioning.

Figure 24:
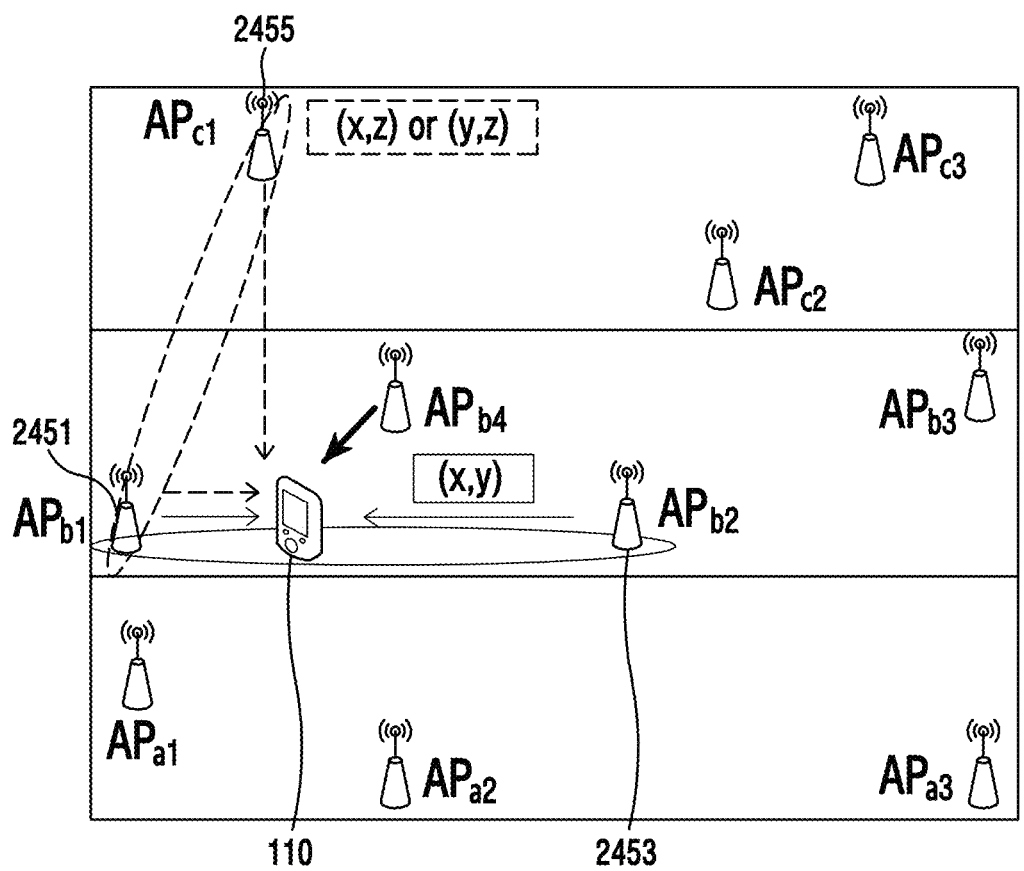
FIG. 24 illustrates a method of determining a 3-dimensional position of a UE in a wireless communication system according to exemplary embodiments of the present invention.

FIG. 24 illustrates a method of determining a 3-dimensional position of a UE in a wireless communication system according to exemplary embodiments of the present invention. In other words, the following description is about various exemplary embodiments of determining the 3-dimensional position of the UE by utilizing the aforementioned decision algorithm.

As shown in FIG. 24, the UE 110 may perform positioning on the basis of a relationship with the adjacent eNBs or Access Points (APs). According to the exemplary embodiment of the present invention, hyperbolic equations as shown in Equation (21) below may be determined according to the TDOA method described in FIG. 6 on the basis of a relationship with the UE 110 and an $AP_{b1}$ 2451, $AP_{b2}$ 2453, and $AP_{b3}$ 2455 adjacent to the UE 110.

$$r_{xy}(b1,c1) = \sqrt{(x_t-x_{b1})^2+(y_t-y_{b1})^2} - \sqrt{(x_t-x_{c1})^2+(y_t-y_{c1})^2}$$

$$r_{xy}(b2,c1) = \sqrt{(x_t-x_{b2})^2+(y_t-y_{b2})^2} - \sqrt{(x_t-x_{c1})^2+(y_t-y_{c1})^2} \quad (21)$$

Herein, $x_t$ and $y_t$ denote an x-axis coordinate and y-axis coordinate of a UE, $r_{xy(b1,c1)}$ denotes a $1^{st}$ hyperbolic equation generated on the basis of $AP_{b1}$ and $AP_{c1}$ to determine the coordinates $x_t$ and $y_t$ of a UE subjected to positioning, $r_{xy(b2,c1)}$ denotes a $2^{nd}$ hyperbolic equation generated on the basis of $AP_{b2}$ and $AP_{c1}$ to determine the coordinates $x_t$ and $y_t$ of the UE subjected to positioning, $x_{b1}$ and $y_{b1}$ denote an x-axis coordinate and y-axis coordinate of $AP_{b1}$, $x_{b2}$ and $y_{b2}$ denote an x-axis coordinate and y-axis coordinate of $AP_{b2}$, and $x_{c1}$ and $y_{c1}$ denote an x-axis coordinate and y-axis coordinate of $AP_{c1}$.

In this case, a solution $(x_t, y_t)$ corresponding to the $1^{st}$ hyperbolic equation and the $2^{nd}$ hyperbolic equation may be determined according to the Taylor series-based decision algorithm or Fang algorithm described above in FIG. 23.

According to the exemplary embodiment of the present invention, in order to determine a coordinate $x_z$ on a z-axis of the UE 110 on the basis of the determined coordinate $(x_t, y_t)$ of the UE 110 as described above, a value $x_t$ or a value $y_t$ may be replaced with a value $z_t$ in Equation (21) above to generate a new hyperbola simultaneous equations, and thereafter may calculate each solution to determine the value $z_t$. As such, the new hyperbola simultaneous equation generated by replacing the value $y_t$ to the value $z_t$ is expressed by Equation (22) below, and the new hyperbola simultaneous equation generated by replacing the value $x_t$ to the value $z_t$ is expressed by Equation (23) below.

$$r_{xz}(b1,c1) = \sqrt{(x_t-x_{b1})^2+(z_t-z_{b1})^2} - \sqrt{(x_t-x_{c1})^2+(z_t-z_{c1})^2}$$

$$r_{xz}(b2,c1) = \sqrt{(x_t-x_{b2})_2+(z_t-z_{b2})^2} - \sqrt{(x_t-x_{c1})_2+(z_t-z_{c1})^2} \quad (22)$$

Herein, $x_t$ and $z_t$ denote an x-axis coordinate and z-axis coordinate of a UE, $r_{xz(b1,c1)}$ denotes a $1^{st}$ hyperbolic equation generated on the basis of $AP_{b1}$ and $AP_{c1}$ to determine the coordinates $x_t$ and $z_t$ of a UE subjected to positioning, $r_{xz(b2,c1)}$ denotes a $2^{nd}$ hyperbolic equation generated on the basis of $AP_{b2}$ and $AP_{c1}$ to determine the coordinates $x_t$ and $z_t$ of the UE subjected to positioning, $x_{b1}$ and $z_{b1}$ denote an x-axis coordinate and z-axis coordinate of $AP_{b1}$, $x_{b2}$ and $z_{b2}$ denote an x-axis coordinate and z-axis coordinate of $AP_{b2}$, and $x_{c1}$ and $z_{c1}$ denote an x-axis coordinate and z-axis coordinate of $AP_{c1}$.

$$r_{yz}(b1,c1) = \sqrt{(z_t-z_{b1})^2+(y_t-y_{b1})^2} - \sqrt{(z_t-z_{c1})^2+(y_t-y_{c1})^2}$$

$$r_{yz}(b2,c1) = \sqrt{(z_t-z_{b2})^2+(y_t-y_{b2})^2} - \sqrt{(z_t-z_{c1})^2+(y_t-y_{c1})^2} \quad (23)$$

Herein, $y_t$ and $z_t$ denote a y-axis coordinate and z-axis coordinate of a UE, $r_{yz(b1,c1)}$ denotes a $1^{st}$ hyperbolic equation generated on the basis of $AP_{b1}$ and $AP_{c1}$ to determine the coordinates $y_t$ and $z_t$ of a UE subjected to positioning, $r_{yz(b2,c1)}$ denotes a $2^{nd}$ hyperbolic equation generated on the basis of $AP_{b2}$ and $AP_{c1}$ to determine the coordinates $y_t$ and $z_t$ of the UE subjected to positioning, $y_{b1}$ and $z_{b1}$ denote a y-axis coordinate and z-axis coordinate of $AP_{b1}$, $y_{b2}$ and $z_{b2}$ denote a y-axis coordinate and z-axis coordinate of $AP_{b2}$, and $y_{c1}$ and $z_{c1}$ denote a y-axis coordinate and z-axis coordinate of $AP_{c1}$.

In this case, according to the Taylor series-based decision algorithm or, in particular, the Fang algorithm described above in FIG. 23, a solution $(x_t, y_t)$ corresponding to the $1^{st}$ hyperbolic equation and the $2^{nd}$ hyperbolic equation of Equation (22) above may be determined, or a solution $(y_t, z_t)$ corresponding to the $1^{st}$ hyperbolic equation and the $2^{nd}$ hyperbolic equation of Equation (23) above may be determined. As a result, a 3-dimensional coordinate $(x_t, y_t, z_t)$ of a UE 2410 for requesting for the position determination may be finally determined.

Figure 25:
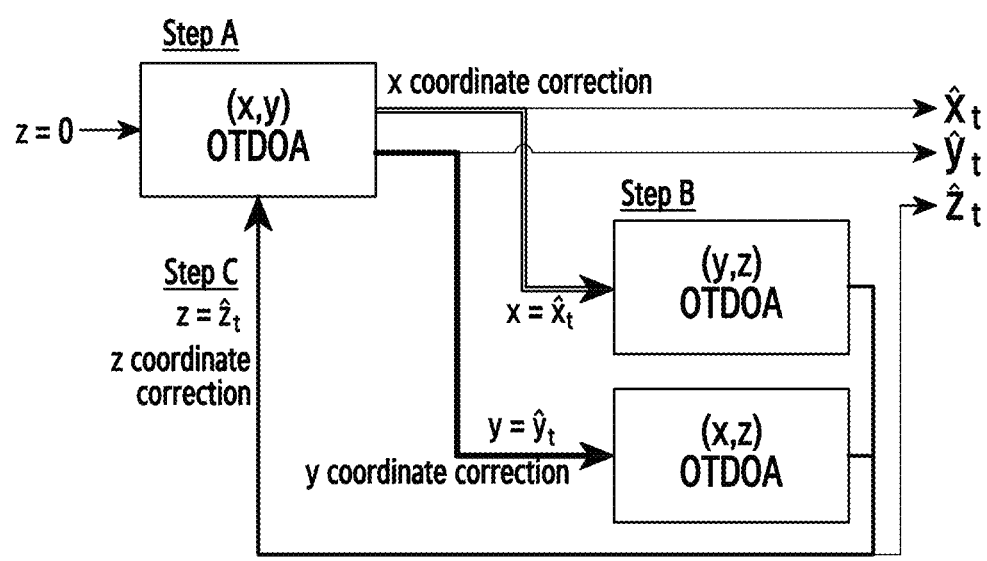
FIG. 25 illustrates a method of determining a 3-dimensional position of a UE in a wireless communication system according to other exemplary embodiments of the present invention.

FIG. 25 illustrates a method of determining a 3-dimensional position of a UE in a wireless communication system according to other exemplary embodiments of the present invention. A case where an initial value is 0 is exemplified in FIG. 25. In FIG. 25, a 3-dimensional position coordinate of a UE which intends to determine a position is expressed by $(x_t, y_t, z_t)$.

As shown in FIG. 25, the position determination includes a step A for determining a value of the remaining coordinate axes on the basis of an initial value for one coordinate axis and a step B for updating a value of a coordinate axis corresponding to the initial value on the basis of the result of the step A. In addition, the position determination is iteratively performed by performing the step A again on the basis of the result of the step B.

Referring to FIG. 25, in the step A, under the assumption that there is no initially configured position coordinate information of the UE for the z-axis, the coordinate $(x_t, y_t)$ may be determined on the basis of a relationship between the UE and other devices adjacent to the UE (e.g., an eNB, an adjacent UE, etc.), for example, other devices which have transmitted a positioning signal. In the following description, it is assumed that a $1^{st}$ device, a $2^{nd}$ device, and a $3^{rd}$ device have transmitted the positioning signal. Herein, the coordinate $(x_t, y_t)$ may be determined by the TDOA method described above in FIG. 6. In addition, the 2-dimensional coordinate $(x_t, y_t)$ of the UE may be initially determined according to the Taylor series-based decision algorithm or Fang algorithm exemplified in FIG. 23. In this case, the initially determined 2-dimensional coordinate of the UE may be expressed by $(\hat{x}_t, \hat{y}_t)$. According to the exemplary embodiment of the present invention, the coordinate $(\hat{x}_t, \hat{y}_t)$ of the UE may be determined by the UE, or may be determined by a position determining device, e.g., a server device or the like, coupled to the UE.

Next, in the step B, the coordinate $z_t$ of the UE may be determined by performing TDOA for determining the coordinate $(x_t, z_t)$ of the UE on the basis of the coordinate $(\hat{x}_t, \hat{y}_t)$. In order to perform the determination procedure according to the Fang algorithm of FIG. 23, a hyperbolic equation based on the TDOA method must be configured such that information for 3 types of coordinates are all applicable. Therefore, the Fang algorithm described above in FIG. 23 needs to be expanded as shown in Equation (24) below so that information regarding the 3 types of coordinates are all applied. In other words, Equation (24) below is a result of applying the value $\hat{y}_t$ determined in the step A to the Fang algorithm described above in FIG. 23. In this case, similarly to the description of FIG. 23, the coordinate $(x_1, y_1, z_1)$ of the $1^{st}$ device may be set to an origin (0, 0, 0) on a coordinate plane, and in the coordinate $(x_2, y_2, z_2)$ of the $2^{nd}$ device, the coordinate $z_2$ may be set to '0' so as to be located on a x-y plane.

$$r_{(2,1)} = \sqrt{(x_t-x_2)^2+(\hat{y}_t-y_2)^2+z_t^2} - \sqrt{x_t^2+\hat{y}_t^2+z_t^2}$$

$$r_{(3,1)} = \sqrt{(x_t-x_3)^2+(\hat{y}_t-y_3)^2+(z_t-z_3)^2} - \sqrt{x_t^2+\hat{y}_t^2+z_t^2} \quad (24)$$

Herein, $\hat{y}_t$ denotes a UE's y-axis coordinate determined in the step A, $x_t$ and $z_t$ denote an x-axis coordinate and z-axis coordinate of a UE which requires positioning, $r(2,1)$ denotes a 1st hyperbolic equation generated based on a $1^{st}$ device and a $2^{nd}$ device to determine $x_t$ and $z_t$ as a result of correcting the value $\hat{y}_t$, $r_{(3,1)}$ denotes a $2^{nd}$ hyperbolic equation generated based on the $1^{st}$ device and a $3^{rd}$ device to determine $x_t$ and $z_t$ as a result of the value $\hat{y}_t$, $x_2$ and $y_2$ denote an x-axis coordinate and y-axis coordinate of the $2^{nd}$ device, and $x_3$, $y_3$, and $z_3$ respectively denote an x-axis coordinate, y-axis coordinate, and z-axis coordinate of the $3^{rd}$ device.

In this case, it may be summarized as an equation regarding $x_t$ and $z_t$ as shown in Equation (25) below by squaring both sides of each hyperbolic equation based on Equation (24) above.

$$z_t = g'x_t + h' \quad (25)$$

Herein, $g' = \{x_2 (r_{(3,1)}/r_{(2,1)}) - x_3\} z_3$, $$h' = \left\{ \begin{array}{l} K'_3 - r^2_{(3,1)} + r_{(3,1)} \cdot r_{(2,1)}\left(1 - \left(\sqrt{K_2}/r_{(2,1)}\right)^2\right) \\ + 2\hat{y}_t(y_2(r_{(3,1)}/r_{(2,1)}) - y_3) \end{array} \right\} / 2z_3,$$

and $K_2 = x_2^2 + y_2^2$, $K'_3 = x_3^2 + y_3^2 + z_3^2$. $\hat{y}_t$ denotes a UE's y-axis coordinate determined in the step A, $x_t$ and $z_t$ denote an x-axis coordinate and z-axis coordinate of a UE which requires positioning, $r_{(2,1)}$ denotes a $1^{st}$ hyperbolic equation generated based on a $1^{st}$ device and a $2^{nd}$ device to determine $x_t$ and $z_t$ as a result of correcting the value $\hat{y}_t$, $r_{(3,1)}$ denotes a $2^{nd}$ hyperbolic equation generated based on the $1^{st}$ device and a $3^{rd}$ device to determine $x_t$ and $z_t$ as a result of the value $\hat{y}_t$, $x_2$ and $y_2$ denote an x-axis coordinate and y-axis coordinate of the $2^{nd}$ device, and $x_3$, $y_3$, and $z_3$ respectively denote an x-axis coordinate, y-axis coordinate, and z-axis coordinate of the $3^{rd}$ device.

In addition, if Equation (25) above is substituted to the $2^{nd}$ hyperbolic equation in Equation (24) above, it may be summarized as a $2^{nd}$-order equation regarding $x_t$ as shown in Equation (26) below.

$$d'x_t^2 + e'x_t + f' + i \cdot \hat{y}_t^2 + j \cdot \hat{y} = 0 \quad (26)$$

Herein, $d' = -\{1 - (x_2/r_{(2,1)})^2 + g'^2\}$, $e' = x_2\{1 - (\sqrt{K_2}/r_{(2,1)})^2 + \hat{y}_t(2y_2/r_{(2,1)})\} - 2g'h'$, $f' = (r_{(2,1)}^2/4) \cdot \{1 - (\sqrt{K_2}/r_{(2,1)})^2\}^2 - h'^2$, $i = -\{1 - (y_2/r_{(2,1)})^2\}$, $j = y_2\{1 - (\sqrt{K_2}/r_{(2,1)})^2\}$, $g' = \{x_2(r_{(3,1)}/r_{(2,1)}) - x_3\}/z_3$, $$h' = \left\{ \begin{array}{l} K'_3 - r^2_{(3,1)} + r_{(3,1)} \cdot r_{(2,1)}\left(1 - \left(\sqrt{K_2}/r_{(2,1)}\right)^2\right) \\ + 2\hat{y}_t(y_2(r_{(3,1)}/r_{(2,1)}) - y_3) \end{array} \right\} / 2z_3,$$

and $K_2 = x_2^2 + y_2^2$, $K'_3 = x_3^2 + y_3^2 + z_3^2$. $\hat{y}_t$ denotes a UE's y-axis coordinate determined in the step A, $x_t$ and $z_t$ denote an x-axis coordinate and z-axis coordinate of a UE which requires positioning, $r_{(2,1)}$ denotes a $1^{st}$ hyperbolic equation generated based on a $1^{st}$ device and a $2^{nd}$ device to determine $x_t$ and $z_t$ as a result of correcting the value $\hat{y}_t$, $r_{(3,1)}$ denotes a $2^{nd}$ hyperbolic equation generated based on the $1^{st}$ device and a $3^{rd}$ device to determine $x_t$ and $z_t$ as a result of the value $\hat{y}_t$, $x_2$ and $y_2$ denote an x-axis coordinate and y-axis coordinate of the $2^{nd}$ device, and $x_3$, $y_3$, and $z_3$ respectively denote an x-axis coordinate, y-axis coordinate, and z-axis coordinate of the $3^{rd}$ device.

In this case, an x-axis coordinate of the UE which requires positioning may be determined by determining a solution $x_t$ of Equation (26) above, and a value $y_t$ may be determined by substituting the value $z_t$ to Equation (25) above. In this case, the determined value $z_t$ may be set to a value $\hat{z}_t$.

A process of determining the value $\hat{z}_t$ as a result of calculation performed by applying the value $\hat{y}_t$ determined in the step A to the Fang algorithm described above in FIG. 23 has been described above according to the exemplary embodiment of the present invention. Likewise, the value $\hat{z}_t$ may be determined as a result of calculation performed by applying the value $\hat{x}_t$ determined in the step A to the Fang algorithm described above in FIG. 23 on the basis of the principle described above in Equation (24) to Equation (26).

In addition, in step C, a coordinate $(x_t, y_t)$ of the UE which requires positioning may be newly determined on the basis of the value $\hat{z}_t$ determined as a result of calculation performed by applying the value $\hat{y}_t$ to the Fang algorithm or the value $\hat{z}_t$ determined as a result of calculation performed by applying the value $\hat{x}_t$ to the Fang algorithm. In other words, the coordinate $(x_t, y_t)$ of the UE which requires positioning may be newly determined on the basis of the value $\hat{z}_t$ determined as a result of calculation performed by applying the value $\hat{y}_t$ to the Fang algorithm or the value $\hat{z}_t$ determined as a result of calculation performed by applying again the value $\hat{x}_t$ to the Fang algorithm. As such, the process of newly determining the coordinate $(x_t, y_t)$ of the UE may be performed by using a process similar to the process described in the step B, and if the finally determined coordinate of the UE is no longer changed and is determined as a fixed value as a result of iteratively performing the step A to the step C, such an iterative process may end. As a result, the 3-dimensional position coordinate of the UE may be finally determined.

Figure 26:
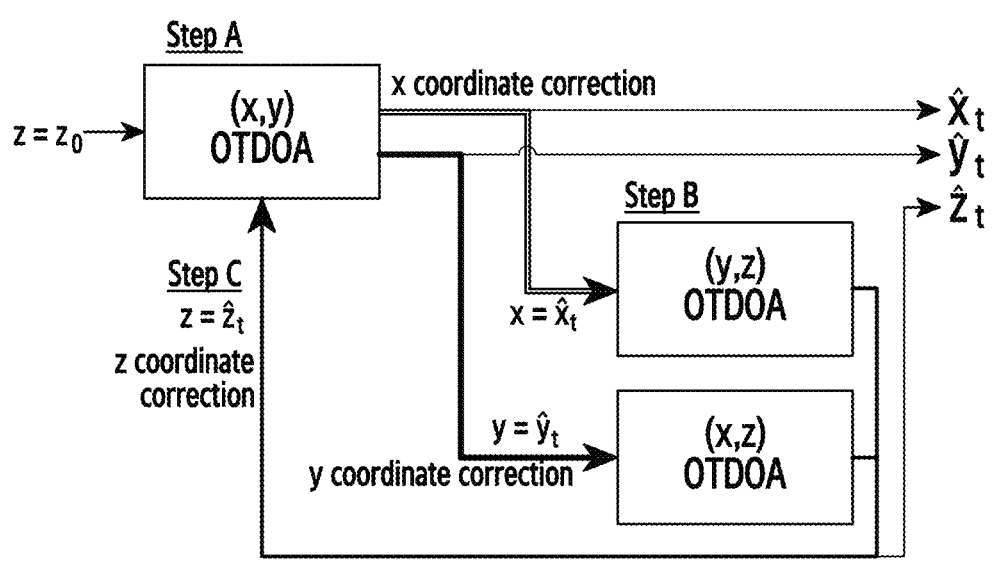
FIG. 26 illustrates a method of determining a 3-dimensional position of a UE in a wireless communication system according to other exemplary embodiments of the present invention.

FIG. 26 illustrates a method of determining a 3-dimensional position of a UE in a wireless communication system according to other exemplary embodiments of the present invention. A case where an initial value is not 0 is exemplified in FIG. 26.

In particular, if a 3-dimensional position coordinate of a UE which intends to determine a position is $(x_t, y_t, z_t)$, the position coordinate of the UE may be determined by the TDOA method described above in FIG. 6. In particular, if it is assumed that positioning for the UE is periodically performed, the UE or a position determining device coupled to the UE may create a data base to store a periodically measured position coordinate of the UE in a storage device included in the UE or the position determining device. In this case, the most recently determined position coordinate of the UE may be determined as an initial position coordinate. According to the exemplary embodiment of the present invention, a z-coordinate value $z_0$ may be determined as a value having a highest accuracy in the initial position coordinate.

In a step A, according to the principle described above in Equation (24) to Equation (26), the 2-dimensional coordinate $(x_t, y_t)$ of the UE may be initially determined by applying the value $z_0$ to the Fang algorithm described above in FIG. 23. In this case, the initially determined 2-dimensional coordinate of the UE may be expressed by $(\hat{x}_t, \hat{y}_t)$. According to the exemplary embodiment of the present invention, the coordinate $(\hat{x}_t, \hat{y}_t)$ of the UE may be determined by the UE, or may be determined by a position determining device, e.g., a server device or the like, coupled to the UE.

Next, in a step B, the coordinate $z_t$ of the UE may be determined by performing TDOA for determining the coordinate $(x_t, z_t)$ of the UE on the basis of the coordinate $(\hat{x}_t, \hat{y}_t)$. In other words, according to the principle described above in Equation (24) to Equation (26), a value $z_t$ may be determined as a result of applying the value $\hat{y}_t$ in the step A to the Fang algorithm described above in FIG. 23. In this case, the determined value $z_t$ may be set to a value $\hat{z}_t$. Likewise, the value $\hat{z}_t$ may be determined as a result of calculation performed by applying the value $\hat{x}_t$ determined in the step A to the Fang algorithm described above in FIG. 23.

In addition, in a step C, a coordinate $(x_t, y_t)$ of the UE which requires positioning may be newly determined on the basis of the value $\hat{z}_t$ determined as a result of calculation performed by applying the value $\hat{y}_t$ to the Fang algorithm or a value $\hat{z}_t$ determined as a result of calculation performed by applying the value $\hat{x}_t$ to the Fang algorithm. In other words, the coordinate $(x_t, y_t)$ of the UE may be newly determined in such a manner that the value $\hat{z}_t$ determined as a result of calculation performed by applying the value $\hat{y}_t$ to the Fang algorithm or the value $\hat{z}_t$ determined as a result of calculation performed by applying the value $\hat{x}_t$ to the Fang algorithm is applied again to the Fang algorithm. As such, the process of newly determining the coordinate $(x_t, y_t)$ of the UE may be performed through a process similar to the process described in the step A to the step B, and if a finally determined coordinate of the UE is no longer changed and is determined as a fixed value as a result of iteratively performing the step A to the step C, such an iterative process may end. As a result, the 3-dimensional position coordinate of the UE can be finally determined.

Figure 27:
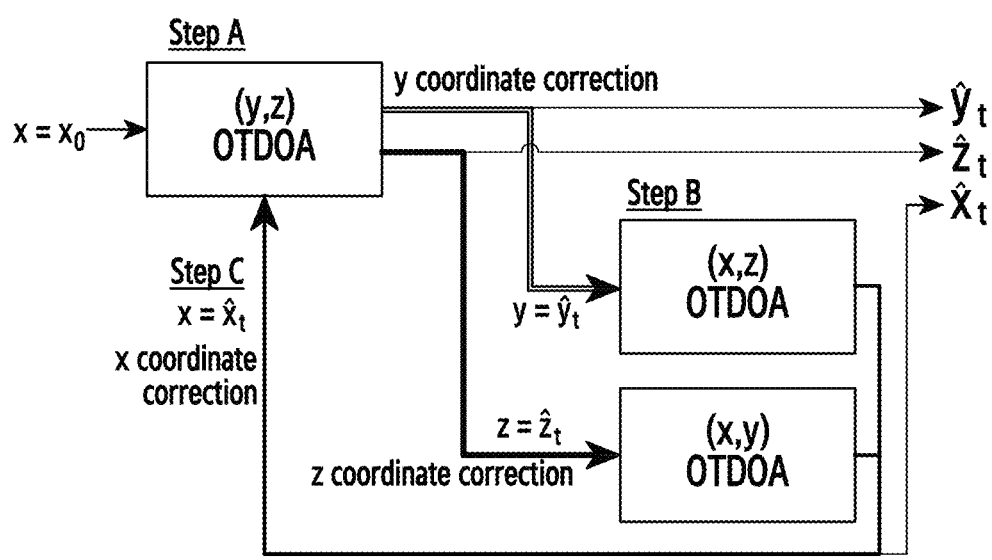
FIG. 27 illustrates a method of determining a 3-dimensional position of a UE in a wireless communication system according to other exemplary embodiments of the present invention.

FIG. 27 illustrates a method of determining a 3-dimensional position of a UE in a wireless communication system according to other exemplary embodiments of the present invention. A case where an initial value is not 0 is exemplified in FIG. 27.

In particular, if a 3-dimensional position coordinate of a UE which intends to determine a position is $(x_t, y_t, z_t)$, the position coordinate of the UE may be determined by the TDOA method described above in FIG. 6. In particular, if it is assumed that positioning for the UE is periodically performed, the UE or a position determining device coupled to the UE may create a data base to store a periodically measured position coordinate of the UE in a storage device included in the UE or the position determining device. In this case, the most recently determined position coordinate of the UE may be determined as an initial position coordinate. According to the exemplary embodiment of the present invention, an x-coordinate value $x_0$ may be determined as a value having a highest accuracy in the initial position coordinate.

In a step A, according to the principle described above in Equation (24) to Equation (26), the 2-dimensional coordinate $(y_t, z_t)$ of the UE may be initially determined by applying the value $x_0$ to the Fang algorithm described above in FIG. 23. In this case, the initially determined 2-dimensional coordinate of the UE may be expressed by $(\hat{y}_t, \hat{z}_t)$. According to the exemplary embodiment of the present invention, the coordinate $(\hat{y}_t, \hat{z}_t)$ of the UE may be determined by the UE, or may be determined by a position determining device, e.g., a server device or the like, coupled to the UE.

Next, in a step B, the coordinate $x_t$ of the UE may be determined by performing TDOA for determining the coordinate $(x_t, z_t)$ of the UE on the basis of the coordinate $(\hat{y}_t, \hat{z}_t)$. In other words, according to the principle described above in Equation (24) to Equation (26), a value $x_t$ may be determined as a result of applying the value $\hat{y}_t$ in the step A to the Fang algorithm described above in FIG. 23. In this case, the determined value $x_t$ may be set to a value $\hat{x}_t$. Likewise, the value $\hat{x}_t$ may be determined as a result of calculation performed by applying the value $\hat{z}_t$ determined in the step A to the Fang algorithm described above in FIG. 23.

In addition, in a step C, a coordinate $(y_t, z_t)$ of the UE which requires positioning may be newly determined on the basis of the value $\hat{x}_t$ determined as a result of calculation performed by applying the value $\hat{y}_t$ to the Fang algorithm or the value $\hat{x}_t$ determined as a result of calculation performed by applying the value $\hat{z}_t$ to the Fang algorithm. In other words, the coordinate $(y_t, z_t)$ of the UE which requires positioning may be newly determined on the basis of the value $\hat{x}_t$ determined as a result of calculation performed by applying the value $\hat{y}_t$ to the Fang algorithm or the value $\hat{x}_t$ determined as a result of calculation performed by applying again the value $\hat{z}_t$ to the Fang algorithm. As such, the process of newly determining the coordinate $(y_t, z_t)$ of the UE may be performed by using a process similar to the process described in the step A and the step B, and if the finally determined coordinate of the UE is no longer changed and is determined as a fixed value as a result of iteratively performing the step A to the step C, such an iterative process may end. As a result, the 3-dimensional position coordinate of the UE may be finally determined.

Figure 28:
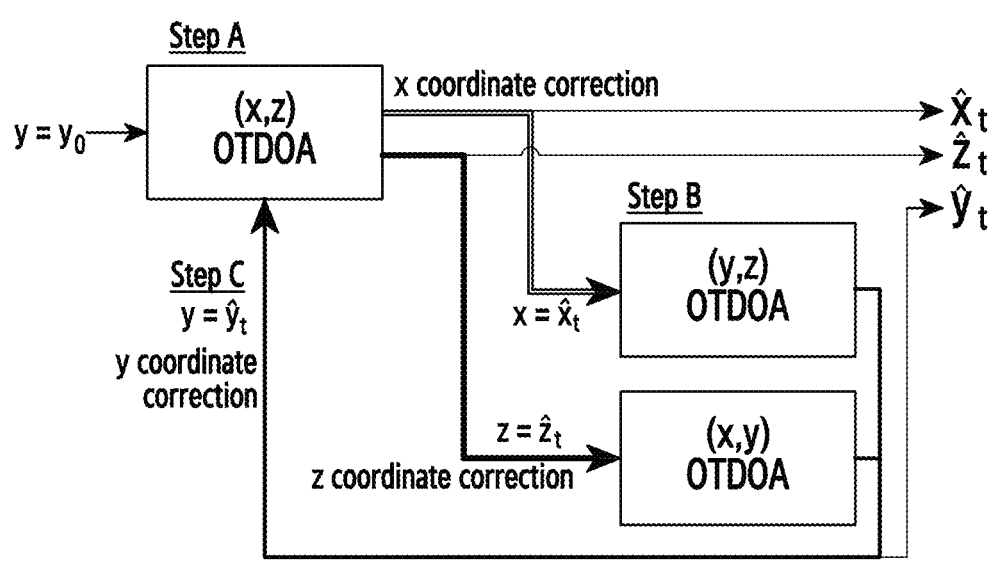
FIG. 28 illustrates a method of determining a 3-dimensional position of a UE in a wireless communication system according to other exemplary embodiments of the present invention.

FIG. 28 illustrates a method of determining a 3-dimensional position of a UE in a wireless communication system according to other exemplary embodiments of the present invention. A case where an initial value is not 0 is exemplified in FIG. 28.

In particular, if a 3-dimensional position coordinate of a UE which intends to determine a position is $(x_t, y_t, z_t)$, the position coordinate of the UE may be determined by the TDOA method described above in FIG. 6. In particular, if it is assumed that positioning for the UE is periodically performed, the UE or a position determining device coupled to the UE may create a data base to store a periodically measured position coordinate of the UE in a storage device included in the UE or the position determining device. In this case, the most recently determined position coordinate of the UE may be determined as an initial position coordinate. According to the exemplary embodiment of the present invention, a y-coordinate value $y_0$ may be determined as a value having a highest accuracy in the initial position coordinate.

In a step A, according to the principle described above in Equation (24) to Equation (26), the 2-dimensional coordinate $(x_t, z_t)$ of the UE may be initially determined by applying the value $y_0$ to the Fang algorithm described above in FIG. 23. In this case, the initially determined 2-dimensional coordinate of the UE may be expressed by $(\hat{x}_t, \hat{z}_t)$. According to the exemplary embodiment of the present invention, the coordinate $(\hat{x}_t, \hat{z}_t)$ of the UE may be determined by the UE, or may be determined by a position determining device, e.g., a server device or the like, coupled to the UE.

Next, in a step B, the coordinate $y_t$ of the UE may be determined by performing TDOA for determining the coordinate $(x_t, y_t)$ of the UE on the basis of the coordinate $(\hat{x}_t, \hat{z}_t)$. In other words, according to the principle described above in Equation (24) to Equation (26), a value $y_t$ may be determined as a result of applying the value $\hat{z}_t$ in the step A to the Fang algorithm described above in FIG. 23. In this case, the determined value $y_t$ may be set to a value $\hat{y}_t$. Likewise, the value $\hat{y}_t$ may be determined as a result of calculation performed by applying the value $\hat{x}_t$ determined in the step A to the Fang algorithm described above in FIG. 23.

In addition, in a step C, a coordinate $(x_t, z_t)$ of the UE which requires positioning may be newly determined on the basis of the value $\hat{y}_t$ determined as a result of calculation performed by applying the value $\hat{z}_t$ to the Fang algorithm or a value $\hat{y}_t$ determined as a result of calculation performed by applying the value $\hat{x}_t$ to the Fang algorithm. In other words, the coordinate $(x_t, z_t)$ of the UE may be newly determined in such a manner that the value $\hat{y}_t$ determined as a result of calculation performed by applying the value $\hat{z}_t$ to the Fang algorithm or the value $\hat{y}_t$ determined as a result of calculation performed by applying the value $\hat{x}_t$ to the Fang algorithm is applied again to the Fang algorithm. As such, the process of newly determining the coordinate $(x_t, z_t)$ of the UE may be performed through a process similar to the process described in the step A to the step B, and if a finally determined coordinate of the UE is no longer changed and is determined as a fixed value as a result of iteratively performing the step A to the step C, such an iterative process may end. As a result, the 3-dimensional position coordinate of the UE can be finally determined.

Figure 29:
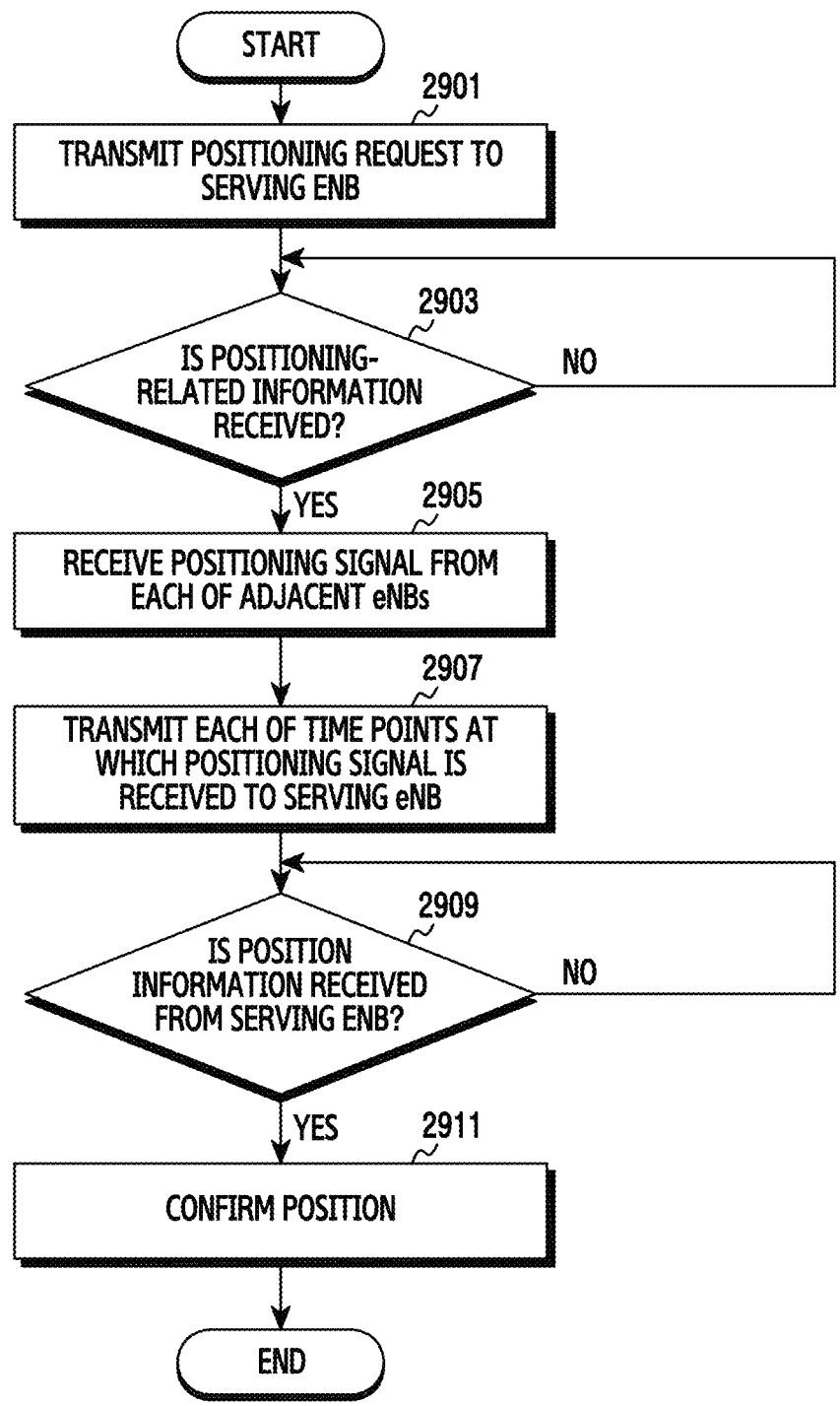
FIG. 29 is a flowchart illustrating an operation of a UE for position determination in a wireless communication system according to exemplary embodiments of the present invention.

FIG. 29 is a flowchart illustrating an operation of a UE for position determination in a wireless communication system according to exemplary embodiments of the present invention.

First, in step 2901, a UE which requires positioning may transmit a positioning request to a serving eNB. A positioning process for the UE may start through the positioning request.

Next, in step 2903, the UE may decide whether positioning-related information is received from the serving eNB. Herein, the positioning-related information may include information regarding adjacent eNBs or adjacent UEs for participating in the positioning process, in particular, position information of the adjacent eNBs or the adjacent UEs.

In addition, in step 2905, the UE may receive a positioning signal from each of the adjacent eNBs. Herein, the positioning signal is a signal for determining a position of the UE. According to the exemplary embodiment of the present invention, the positioning signal may include a reference signal. In addition, although it is described in step 2905 that the positioning signal is received from the adjacent eNBs, this is for exemplary purposes only, and thus the positioning signal may be optionally received from the adjacent UEs.

Next, in step 2907, the UE may transmit to the serving eNB each of time points at which the positioning signal is received. Herein, each of time points at which the positioning signal is received is information used as a reference for measuring the position of the UE, and according to the exemplary embodiment of the present invention, the position of the UE may be determined on the basis of information regarding each of the time points at which the positioning signal is received, by using the TDOA method described above in FIG. 6.

In addition, in step 2909, the UE may determine whether position information of the UE is received from the serving eNB. In other words, if the position information of the UE delivered by the serving eNB is received, proceeding to step 2911, the UE may finally confirm the position of the UE.

Figure 30:
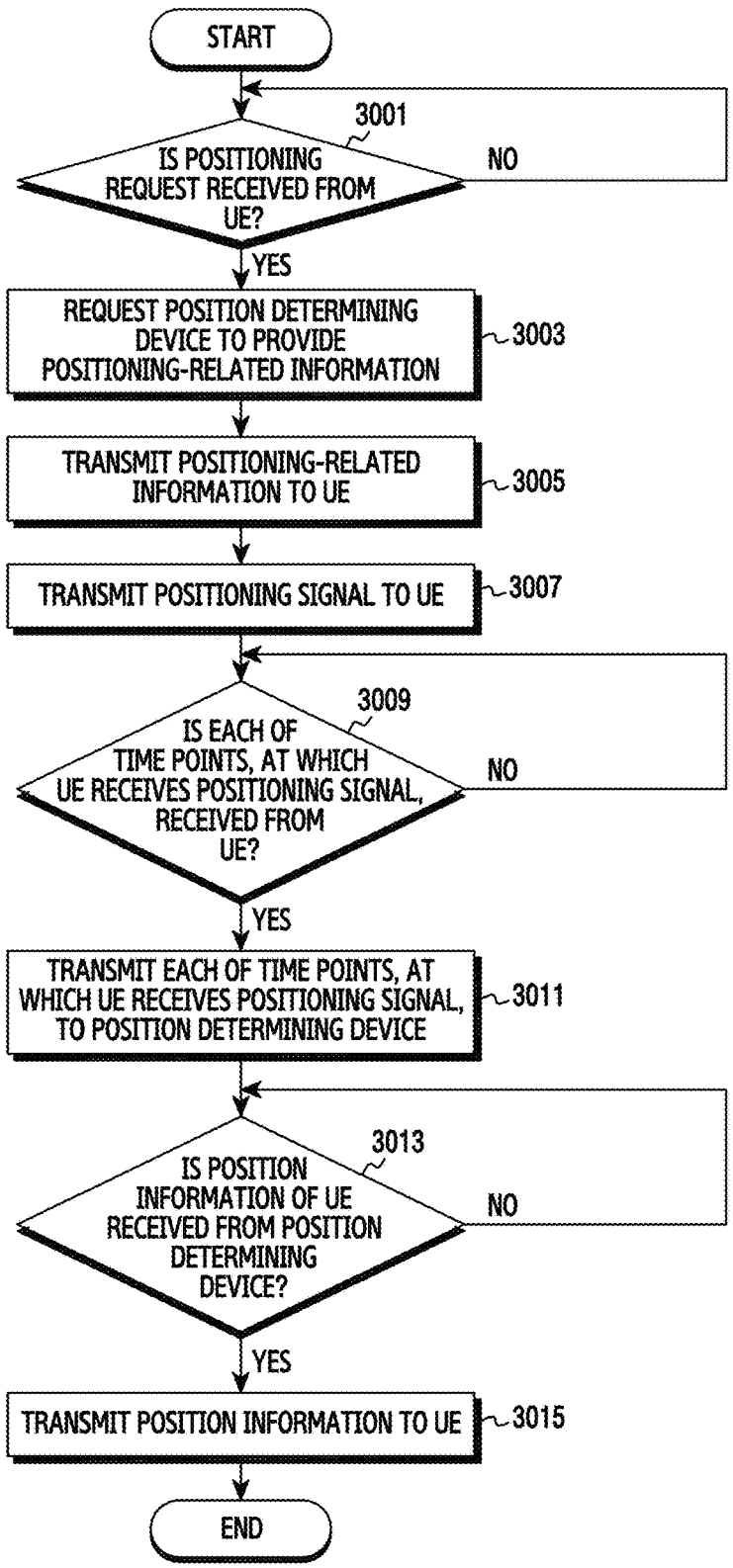
FIG. 30 is a flowchart illustrating an operation of an eNB for determining a position of a UE in a wireless communication system according to exemplary embodiments of the present invention.

FIG. 30 is a flowchart illustrating an operation of an eNB for determining a position of a UE in a wireless communication system according to exemplary embodiments of the present invention.

First, in step 3001, an eNB may decide whether a positioning request is received from a UE which requires positioning. As such, a positioning process may start for the UE through the positioning request.

Next, in step 3003, the eNB may request a position determining device associated with the eNB to provide positioning-related information. Herein, the positioning-related information may include information regarding adjacent eNBs or adjacent UEs for participating in the positioning process, in particular, position information of the adjacent eNBs or the adjacent UEs. In addition, if the positioning-related information is received from the position determining device, proceeding to step 3005, the eNB may transmit the positioning-related information to the UE.

In addition, in step 3007, the eNB may transmit a positioning signal to the UE. Herein, the positioning signal is a signal for determining a position of the UE. According to the exemplary embodiment of the present invention, the positioning signal may include a reference signal. In addition, although it is described in the step 3007 that the eNB transmits the positioning signal to the UE, this is for exemplary purposes only, and thus the eNB may optionally allow UEs adjacent to the UE to transmit the positioning signal.

Next, in step 3009, the eNB may determine whether each of time points at which the UE receives the positioning signal is received from the UE. If the time point is received from the UE, proceeding to step 3011, the eNB may transmit to the position determining device each of the time points at which the UE receives the positioning signal. Herein, each of time points at which the positioning signal is received is information used as a reference for measuring the position of the UE, and according to the exemplary embodiment of the present invention, the position of the UE may be determined on the basis of information regarding each of the time points at which the positioning signal is received, by using the TDOA method described above in FIG. 6.

In addition, in step 3013, the eNB may determine whether the position information of the UE is received from the position determining device. If the position information of the UE is received, proceeding to step 3015, the eNB may transmit the position information to the UE.

Figure 31:
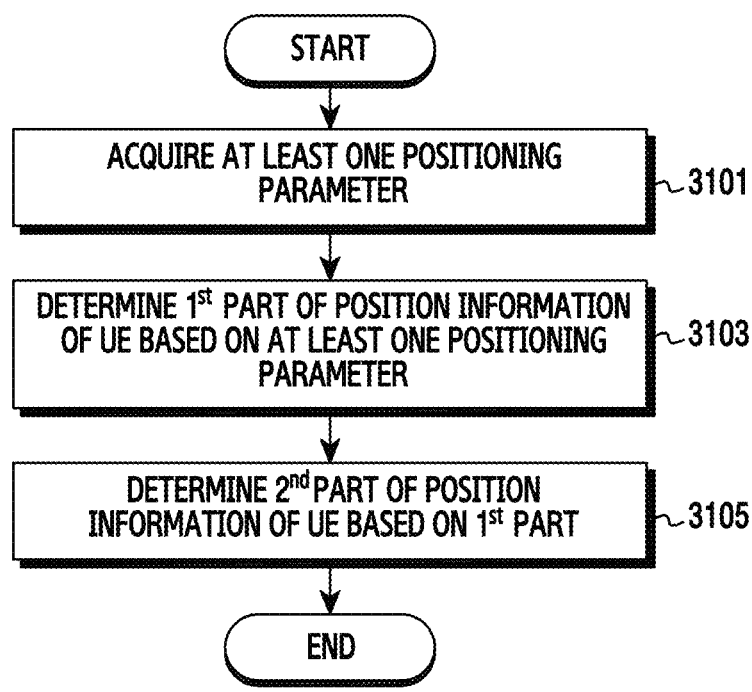
FIG. 31 is a flowchart illustrating an operation of a position determining device for determining a position of a UE in a wireless communication system according to exemplary embodiments of the present invention.

FIG. 31 is a flowchart illustrating an operation of a position determining device for determining a position of a UE in a wireless communication system according to exemplary embodiments of the present invention.

First, in step 3101, the position determining device may acquire at least one positioning parameter. In this case, the position determining device may include a UE or a separate device coupled to the UE. Herein, the UE may correspond to a UE which requires positioning, and the positioning parameter may include information corresponding to a time point at which the UE receives a positioning signal from adjacent eNBs or adjacent UEs. In this case, the positioning parameter is information used as a reference for positioning of the UE, and the position of the UE may be determined on the basis of the positioning parameter through the following steps.

Next, in step 3103, the position determining device may determine a $1^{st}$ part of position information of the UE on the basis of the at least one positioning parameter. According to the exemplary embodiment of the present invention, the $1^{st}$ part of the UE may be determined on the basis of the positioning parameter by using the TDOA method described in FIG. 6. According to the exemplary embodiment of the present invention, the $1^{st}$ part may be a 2-dimensional position coordinate (x, y) of the $1^{st}$ part.

In addition, in step 3105, the position determining device may determine a $2^{nd}$ part of the UE on the basis of the $1^{st}$ part. According to the exemplary embodiment of the present invention, a position coordinate of the UE corresponding to the $1^{st}$ part may be determined as (x, y), and the $2^{nd}$ part may be determined on the basis of one coordinate, e.g., a y-coordinate, of the position coordinate (x, y) of the UE. In other words, the position determining device may determine a z-coordinate of the UE on the basis of the positioning parameter and the y-coordinate of the UE determined from the $1^{st}$ part, on the basis of the principle described above in Equation (24) to Equation (26).

Figure 32:
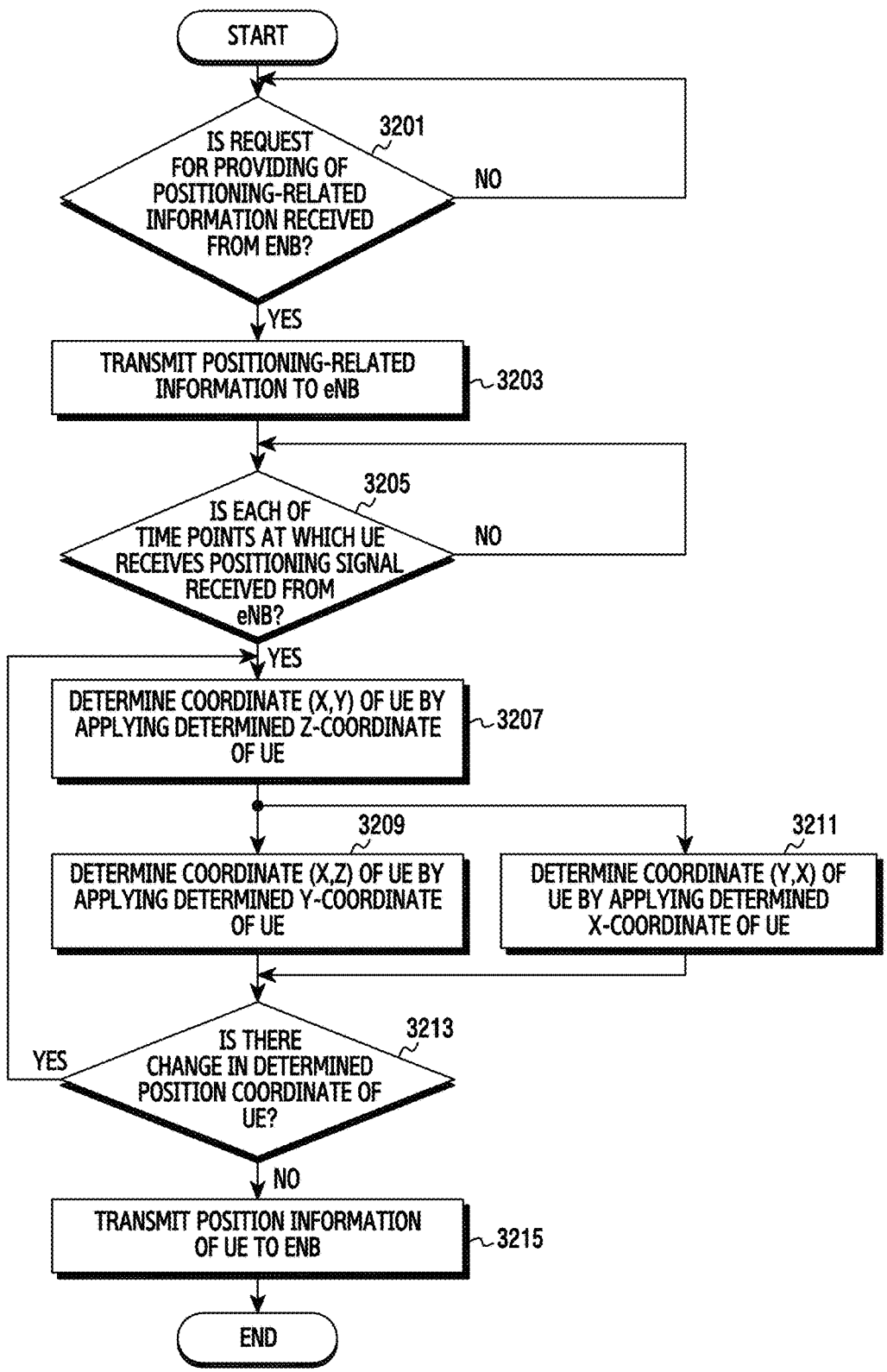
FIG. 32 is a flowchart illustrating an operation of a position determining device for determining a position of a UE in a wireless communication system according to other exemplary embodiments of the present invention.

FIG. 32 is a flowchart illustrating an operation of a position determining device for determining a position of a UE in a wireless communication system according to other exemplary embodiments of the present invention.

First, in step 3201, the position determining device may receive information related to a UE which requires positioning, that is, a request for positioning-related information, from an eNB. Through the request for the positioning-related information, the position determining device may recognize that a positioning process for the UE is to be started.

Next, in step 3203, the position determining device may transmit the positioning-related information to the eNB. Herein, the positioning-related information may include information regarding adjacent eNBs or adjacent UEs for participating in the positioning process, in particular, position information of the adjacent eNBs or the adjacent UEs. In addition, if the positioning-related information is received from the position determining device, the eNB may transmit the positioning-related information to the UE.

In addition, in step 3205, the position determining device may receive from the eNB whether the UE receives a time point at which a positioning signal is received. Herein, each of time points at which the positioning signal is received is information used as a reference for measuring the position of the UE, and the position of the UE may be determined on the basis of information regarding each of the time points at which the positioning signal is received in the following step.

In addition, if the position determining device receives information regarding each of time points at which the positioning signal is received from the eNB, proceeding to step 3207, the position determining device may determine a coordinate (x, y) of the UE by applying a predetermined z-coordinate of the UE. Herein, the predetermined z-coordinate of the UE implies the z-coordinate of the UE, which is determined in a previous step under the premise that a position coordinate for the UE is iteratively determined. If the determining of the position of the UE is initially performed in step 3207, the predetermined z-coordinate of the UE may be determined as '0'. In addition, according to the exemplary embodiment of the present invention, the position determining device may determine the coordinate (x, y) of the UE on the basis of information regarding each of time points at which the positioning signal is received and the predetermined z-coordinate of the UE on the basis of the principle described above in Equation (24) to Equation (26).

Next, in step 3209, the position determining device may determine the coordinate (x, z) of the UE by applying the determined coordinate y of the UE. Herein, the determined y-coordinate of the UE may include the y-coordinate of the UE determined in step 3207. In this case, according to the exemplary embodiment of the present invention, the position determining device may determine the coordinate (x, z) of the UE on the basis of information regarding each of time points at which the positioning signal is received and the predetermined y-coordinate of the UE on the basis of the principle described above in Equation (24) to Equation (26).

Next, in step 3211, the position determining device may determine the coordinate (x, z) of the UE by applying the determined x-coordinate of the UE. Herein, the determined x-coordinate of the UE may include the x-coordinate of the UE determined in step 3207. In this case, according to the exemplary embodiment of the present invention, the position determining device may determine the coordinate (y, z) of the UE on the basis of information regarding each of time points at which the positioning signal is received and the predetermined x-coordinate of the UE on the basis of the principle described above in Equation (24) to Equation (26).

Next, in step 3213, the position determining device may decide whether there is a change in the determined position coordinate value of the UE. If a position coordinate of the UE initially determined is different from a position coordinate of the UE determined through the steps 3207 to 3211, the position determining device may decide that there is a change in the determined position coordinate value of the UE. As a result, proceeding to step 3207, the position coordinate of the UE may be iteratively determined. On the contrary, if the position coordinate of the UE initially determined is the same as the position coordinate of the UE determined through the steps 3207 to 3211, the position determining device may decide that there is no change in the determined position coordinate value of the UE.

If it is decided in step 3213 that there is no change in the determined position coordinate value of the UE, proceeding to step 3215, the position determining device may transmit the position information of the UE to the eNB. That is, the position determining device may transmit to the eNB the UE's final position information determined through the steps 3207 to 3211.

Figure 33:
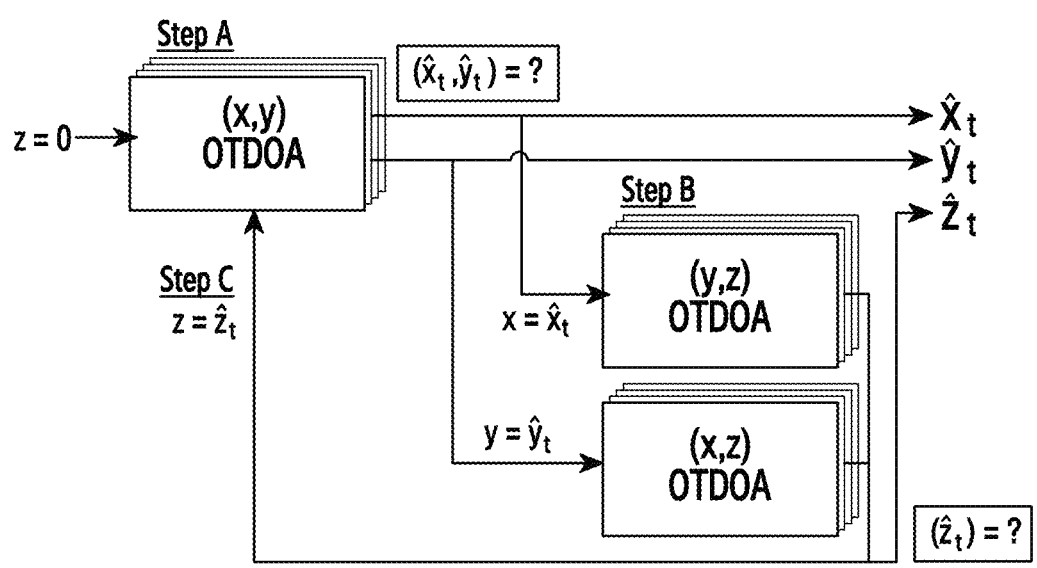
FIG. 33 illustrates a method of determining a final position of a UE in a wireless communication system according to exemplary embodiments of the present invention.

FIG. 33 illustrates a method of determining a final position of a UE in a wireless communication system according to exemplary embodiments of the present invention.

According to the method described in FIG. 25 to FIG. 32, positioning for a UE which requires positioning may be iteratively performed, and as a result, there is a need to determine a final position value of the UE among a plurality of position estimation values for the UE. A situation regarding how to determine a final position coordinate ($\hat{x}_t, \hat{y}_t, \hat{z}_t$) of the UE is shown in FIG. 33 as a result of iteratively performing the step A to the step C.

According to the exemplary embodiment of the present invention, a method of averaging the plurality of position estimation values may be used to determine the final position coordinate of the UE. Further, since there is a need to eliminate in advance some inaccurate position estimation values which may significantly degrade positioning performance in order to more improve accuracy of positioning, a weighted average estimation value may be considered as shown in Equation (27) below.

$$\bar{z}_t = \sum_{k=1}^{N_z} w(k) z_t(k) \Big/ \sum_{k=1}^{N_z} w(k) \quad (27)$$

$$z_t(u) = \underset{u \in N_z}{\mathrm{Max}}(|z_t(u) - \bar{z}_t|)$$

$$\hat{z}_t = \frac{1}{N_z - 1} \left( \sum_{k=1}^{N_z} z_t(k) - z_t(u) \right)$$

Herein, $\bar{z}_t$ denotes a weighted average estimation value, w(k) denotes a weight value related to the number of occurrences of pre-acquired position estimation values in association with positioning of the UE, $z_t(u)$ denotes an estimation value of which a Root Mean Square Error (RMSE) is maximum, and $\hat{z}_t$ denotes a final average measurement value regarding a z-coordinate of the UE.

In this case, by considering a characteristic in that an estimation value which is close to an actual value occurs more frequently, an estimation value $z_t(u)$ of which an RMSE is maximum with respect to the weighted average estimation value $\bar{z}_t$ having the number of occurrences of the acquired estimation values as a weight value may be eliminated to determine the final average measurement value $\bar{z}_t$ regarding the z-coordinate of the UE.

Figure 34:
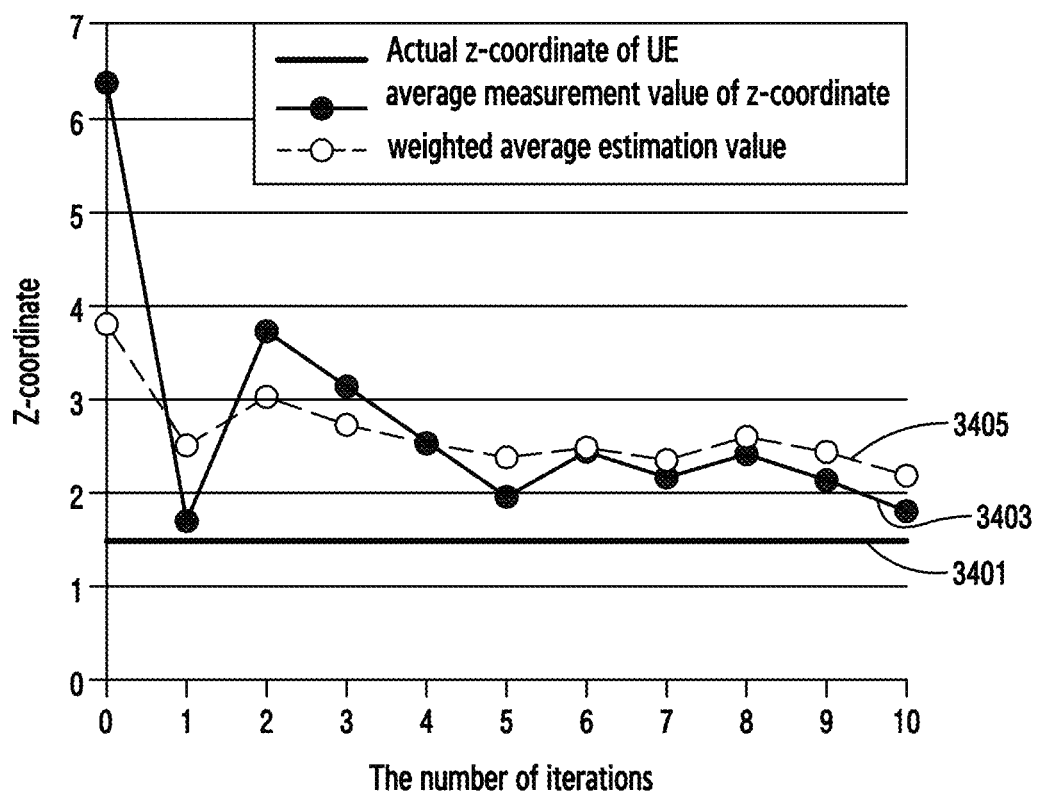
FIG. 34 illustrates a graph for a method of determining a final position of a UE in a wireless communication system according to exemplary embodiments of the present invention.

FIG. 34 illustrates a graph for a method of determining a final position of a UE in a wireless communication system according to exemplary embodiments of the present invention. In the graph, a horizontal axis denotes the number of times of iterating positioning for a UE which requests positioning, and a vertical axis denotes a z-coordinate of the UE.

Referring to FIG. 34, according to the exemplary embodiment of the present invention, an actual z-coordinate of the UE may be determined to 1.5 as indicated by a reference numeral 3401. In addition, as described above in FIG. 33, if a method of averaging the plurality of positioning values is used to determine the final position coordinate of the UE, a z-coordinate average measurement value of the UE may be determined as indicated by a reference numeral 3403. In addition, as described above in FIG. 33, the final average measurement value for the z-coordinate of the UE may be determined as indicated by a reference numeral 3405 as a result of considering a weighted average estimation value. In particular, in case of considering the weighted average estimation value, it can be confirmed that the final average measurement value is being converged to an actual position of the UE when the number of times of iterating positioning for the UE is increased.

Figure 35:
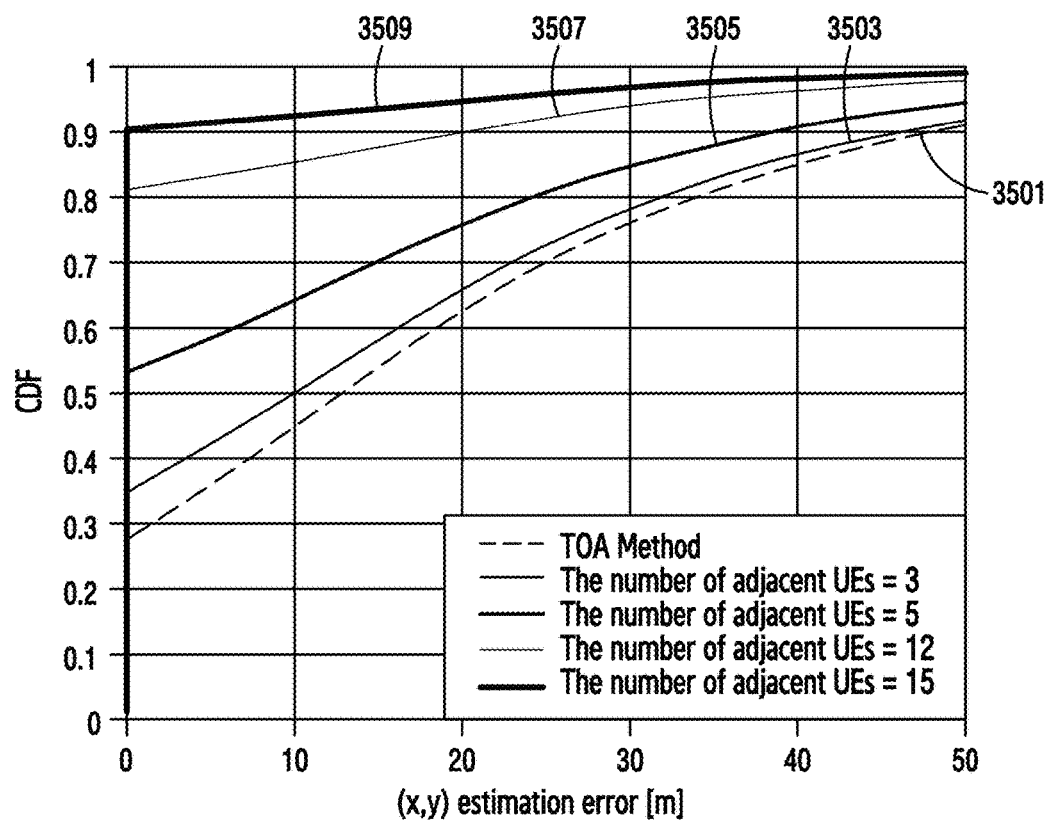
FIG. 35 illustrates a performance improvement effect based on a method of determining a position of a UE in a wireless communication system according to exemplary embodiments of the present invention.

FIG. 35 illustrates a performance improvement effect based on a method of determining a position of a UE in a wireless communication system according to exemplary embodiments of the present invention.

Referring to FIG. 35, in the graph of FIG. 35, a horizontal axis denotes an estimation error for a coordinate (x, y) of a UE which requires positioning, and a vertical axis denotes a Cumulative Distribution Function (CDF). In addition, under the premise that the TOA method is used as described above in FIG. 5, a case where eNB-based positioning is performed is indicated by a reference number 3501. Under the premise that D2D-based positioning is performed, a case where the number of adjacent UEs is 3 is indicated by a reference numeral 3503. Under the premise that D2D-based positioning is performed, a case where the number of adjacent UEs is 5 is indicated by a reference numeral 3505. Under the premise that D2D-based positioning is performed, a case where the number of adjacent UEs is 12 is indicated by a reference numeral 3507. Under the premise that D2D-based positioning is performed, a case where the number of adjacent UEs is 15 is indicated by a reference numeral 3509.

As shown in FIG. 35, in comparison with a result obtained by performing positioning using the eNB-based TOA method (see 3501), it can be confirmed that positioning performance is improved by performing positioning using the D2D-based TOA method (see 3503 to 3509). In addition, when the positioning is performed by using the D2D-based TOA method, it can be confirmed that the positioning performance is improved in proportion to the increase in the number of adjacent UEs participating in the positioning method.

Figure 36:
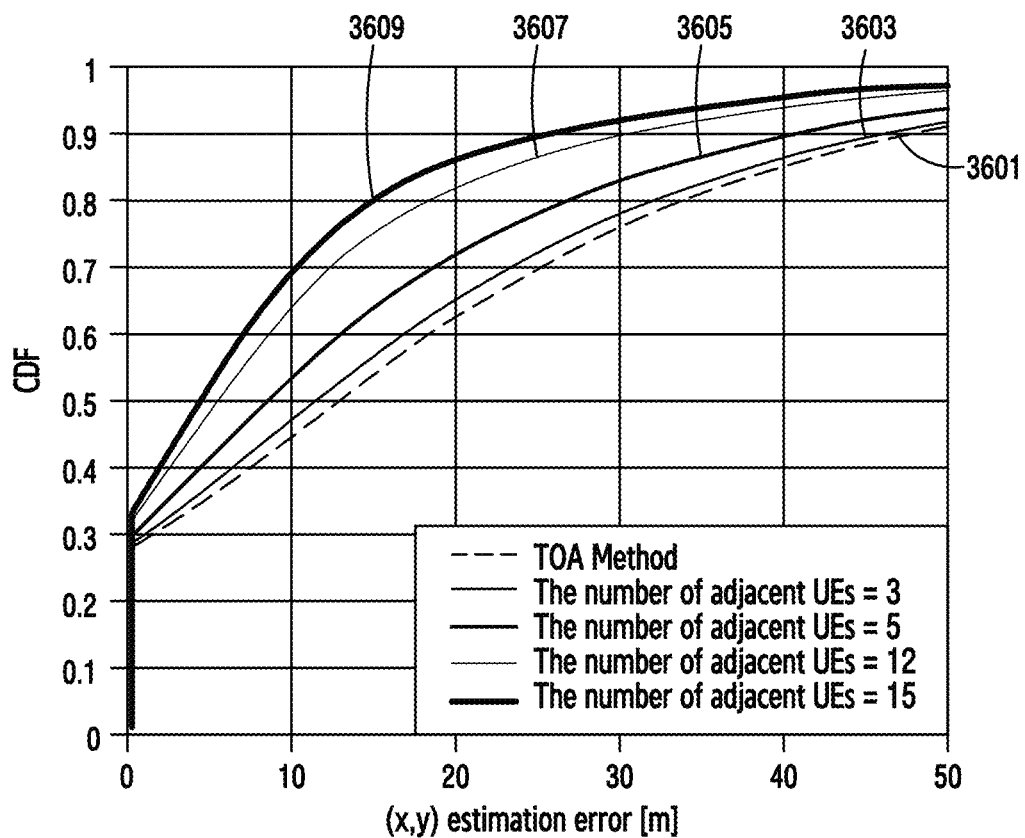
FIG. 36 illustrates a performance improvement effect based on a method of determining a position of a UE in a wireless communication system according to other exemplary embodiments of the present invention.

FIG. 36 illustrates a performance improvement effect based on a method of determining a position of a UE in a wireless communication system according to other exemplary embodiments of the present invention.

Referring to FIG. 36, in the graph of FIG. 36, a horizontal axis denotes an estimation error for a coordinate (x, y) of a UE which requires positioning, and a vertical axis denotes a CDF. In addition, under the premise that the TDOA method is used as described above in FIG. 6, a case where eNB-based positioning is performed is indicated by a reference number 3601. Under the premise that D2D-based positioning is performed, a case where the number of adjacent UEs is 3 is indicated by a reference numeral 3603. Under the premise that D2D-based positioning is performed, a case where the number of adjacent UEs is 5 is indicated by a reference numeral 3605. Under the premise that D2D-based positioning is performed, a case where the number of adjacent UEs is 12 is indicated by a reference numeral 3607. Under the premise that D2D-based positioning is performed, a case where the number of adjacent UEs is 15 is indicated by a reference numeral 3609.

As shown in FIG. 36, in comparison with a result obtained by performing positioning using the eNB-based TDOA method (see 3601), it can be confirmed that positioning performance is improved by performing positioning using the D2D-based TDOA method (see 3603 to 3609). In addition, when the positioning is performed by using the D2D-based TDOA method, it can be confirmed that the positioning performance is improved in proportion to the increase in the number of adjacent UEs participating in the positioning method.

Figure 37:
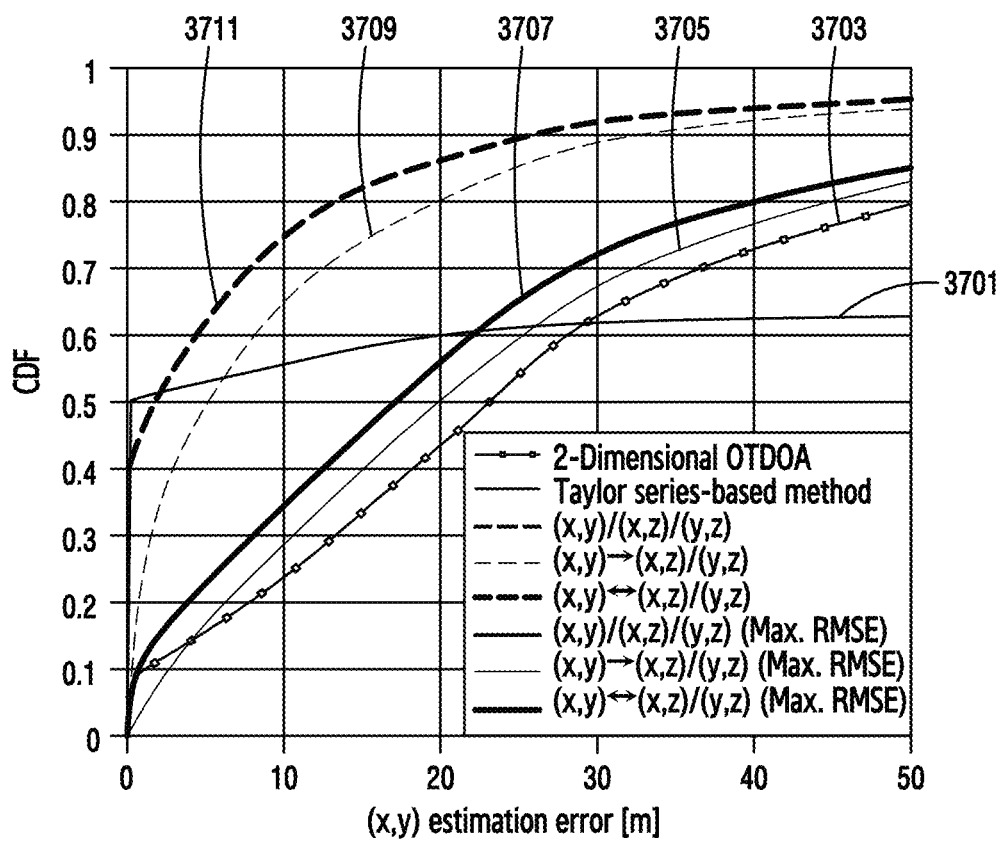
FIG. 37 illustrates a performance improvement effect based on a method of determining a position of a UE in a wireless communication system according to other exemplary embodiments of the present invention.

FIG. 37 illustrates a performance improvement effect based on a method of determining a position of a UE in a wireless communication system according to other exemplary embodiments of the present invention.

Referring to FIG. 37, in the graph of FIG. 37, a horizontal axis denotes an estimation error for a coordinate (x, y) of a UE which requires positioning, and a vertical axis denotes a CDF. In addition, a case where positioning is performed by using a Taylor series-based method is indicated by a reference numeral 3701, a case where positioning is performed by using the TDOA method described in FIG. 6 is indicated by a reference numeral 3703, a case where positioning is performed by considering a weighted average estimation value as described above in FIG. 33 is indicated by a reference numeral 3705, a case where iterative positioning is performed by considering a weighted average estimation value as described above in FIG. 33 is indicated by a reference numeral 3707, and ideal result values corresponding to the reference numerals 3705 and 3707 are respectively indicated by reference numerals 3709 and 3711.

In this case, according to the result indicated by the reference numeral 3701, a positioning value is diverged with a probability of about 60%, whereas as a result of performing positioning by considering a weighted average estimation value similarly to the result indicated by the reference numerals 3709 and 3711, it can be confirmed that positioning performance is improved starting from a point where the probability exceeds approximately 60%.

Figure 38:
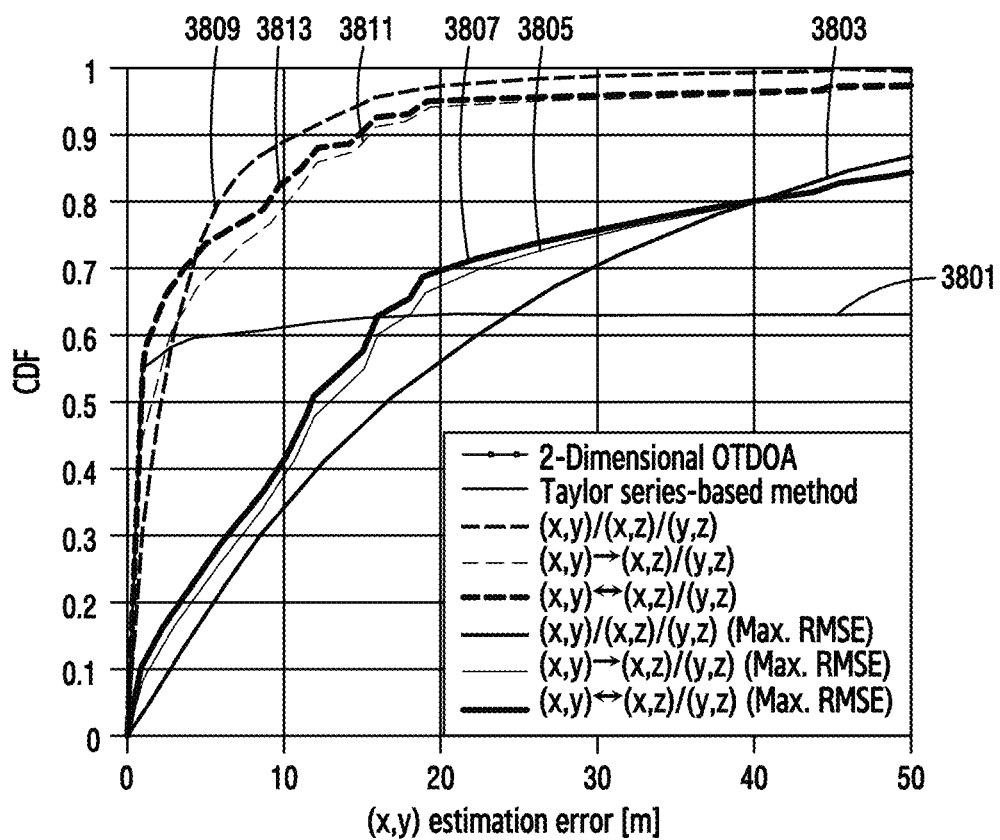
FIG. 38 illustrates a performance improvement effect based on a method of determining a position of a UE in a wireless communication system according to other exemplary embodiments of the present invention.

FIG. 38 illustrates a performance improvement effect based on a method of determining a position of a UE in a wireless communication system according to other exemplary embodiments of the present invention.

Referring to FIG. 38, in the graph of FIG. 38, a horizontal axis denotes an estimation error for a z-coordinate of a UE which requires positioning, and a vertical axis denotes a CDF. In addition, a case where positioning is performed by using a Taylor series-based method is indicated by a reference numeral 3801, a case where positioning is performed on coordinates x, y, and z for the UE by considering a weighted average estimation value as described above in FIG. 33 is indicated by a reference numeral 3603, a case where positioning is performed by considering a weighted average estimation value as described above in FIG. 33 is indicated by a reference numeral 3605, and a case where iterative positioning is performed by considering a weighted average estimation value as described above in FIG. 33 is indicated by a reference numeral 3607. In addition, ideal result values corresponding to the reference numerals 3803, 3805, and 3807 are respectively indicated by reference numerals 3809, 3811, and 3813.

In this case, according to the result indicated by the reference numeral 3801, a positioning value is diverged with a probability of about 60%, whereas as a result of performing positioning by considering a weighted average estimation value similarly to the result indicated by the reference numerals 3803, 3805, and 3807, it can be confirmed that positioning performance is improved starting from a point where the probability exceeds approximately 60%.

While the present invention has been particularly shown and described with reference to exemplary embodiments thereof, it will be understood by those skilled in the art that various modifications and changes in form and details may be made therein without departing from the spirit of the invention. Operations according to exemplary embodiments of the present invention may be implemented by a single processor. In this case, a program instruction for performing an operation implemented with various computers may be recorded in a computer readable recording medium. The computer readable recording medium may include a program instruction, a data file, a data structure, etc., in an independent or combined manner. The program instruction may be designed and configured particularly for the present invention, or may be known and usable to those ordinarily skilled in the art. The computer readable recording medium may be a hardware device configured particularly to store and perform a program instruction, for example, a hard disk, a magnetic medium such as a floppy disc and a magnetic tape, an optical storage medium such as a Compact Disc-ROM (CD-ROM) or a Digital Versatile Disc (DVD), a magnetic-optic medium such as a floptical disc, a Read Only Memory (ROM), a Random Access Memory (RAM), a flash memory, etc. An example of the program instruction includes not only a machine language created by a compiler but also a high-level language executable by a computer by using an interpreter or the like. When a base station or a relay described in the present invention is entirely or partially implemented with a computer program, a computer readable recording medium which stores the computer program is also included in the present invention. Therefore, the scope of the invention is defined not by the detailed description of the invention but by the appended claims, and all differences within the scope will be construed as being included in the present invention.

The invention claimed is:

1. An apparatus for a terminal in a wireless communication system, the apparatus comprising:
    a transceiver; and
    at least one processor operatively coupled with the transceiver,
    wherein the at least one processor is configured to:
        transmit a first signal for requesting positioning,
        receive positioning signals for positioning of the terminal from a first plurality of other terminals, the first plurality of other terminals comprising at least one position determined terminal with a determined position and an expiration time for the determined position,
        determine distance values between the terminal and the first plurality of other terminals based on the positioning signals, and
        if at least one of the distance values is greater than or equal to a threshold value, transmit a second signal for requesting positioning for receiving other positioning signals from a second plurality of other terminals except terminals whose expiration time has elapsed.

2. The apparatus of claim 1, wherein the at least one processor is further configured to determine a position of the terminal based on the positioning signals.

3. The apparatus of claim 1, wherein the at least one processor is further configured to:
    transmit measurement parameters for the positioning signals, and
    receive position information of the terminal.

4. The apparatus of claim 1, wherein the at least one processor is further configured to receive at least one of information regarding a position coordinate of each of the first plurality of other terminals and propagation delay information between a base station and the first plurality of other terminals.

5. The apparatus of claim 1, wherein the at least one processor is further configured to confirm at least one of information regarding a position coordinate of each of the first plurality of other terminals and propagation delay information between a base station and the first plurality of other terminals from the positioning signals.

6. The apparatus of claim 1, wherein the at least one processor is further configured to:
    if the at least one distance value is greater than or equal to the threshold, receive the positioning signals, and determine the position of the terminal based on the positioning signals.

7. The apparatus of claim 1, wherein the at least one processor is further configured to receive, from the first plurality of other terminals, at least one of information regarding a position coordinate of each of the first plurality of other terminals and propagation delay information between a base station and the first plurality of other terminals from the positioning signals.

8. The apparatus of claim 1, wherein the first signal for requesting positioning is transmitted to the first plurality of other terminals.

9. The apparatus of claim 1, wherein the at least one processor is configured to:
    transmit, to the first plurality of other terminals, the first signal for requesting positioning, and
    receive, from the first plurality of other terminals, the positioning signals, if a receive power value of the first signal is greater than a threshold and the positioning of the terminal is predetermined.

10. An apparatus for a base station in a wireless communication system, the apparatus comprising:
    a transceiver; and
    at least one processor operatively coupled with the transceiver,
    wherein the at least one processor is configured to:
        receive from a terminal a first signal for requesting positioning,
        transmit, to a first plurality of other terminals a second signal for requesting for transmission of a positioning signal for the positioning of the terminal,
        wherein the first plurality of other terminals comprises at least one position determined terminal with a determined position and an expiration time for the determined position, and
        receive, from the terminal, a third signal for requesting positioning for receiving positioning signals from a second plurality of other terminals except terminals whose expiration time has elapsed.

11. The apparatus of claim 10, wherein the at least one processor is further configured to transmit to the terminal, at least one of information regarding a position coordinate of each of the first plurality of other terminals and propagation delay information between the base station and the first plurality of other terminals.

12. An apparatus for determining a position of a terminal in a wireless communication system, the apparatus comprising:
- a transceiver; and
- at least one processor operatively coupled with the transceiver,
- wherein the at least one processor is configured to:
  - acquire at least one positioning parameter regarding positions of a first plurality of other terminals, wherein the first plurality of other terminals comprises at least one position determined terminal with a determined position and an expiration time for the determined position,
  - determine a first part of position information of the terminal based on the at least one positioning parameter,
  - determine a second part of the position information of the terminal based on the first part of the position information, the position information is used for determining distance values between the terminal and the first plurality of other terminals, and
  - if at least one of the distance values is greater than or equal to a threshold value, acquire at least one other positioning parameter regarding positions of a second plurality of other terminals except terminals whose expiration time has elapsed.

13. The apparatus of claim 12,
wherein the first part of the position information comprises two-dimensional position coordinates regarding one part of a plane among three-dimensional position coordinates of the terminal, and
wherein the second part comprises at least one remaining coordinate except for the first part of the position information among the three-dimensional position coordinates.

14. The apparatus of claim 12, wherein the positioning parameter is determined based on positioning parameters transmitted from a first device, a second device, and a third device, and
wherein the at least one processor is further configured to:
- set a position of the first device to an origin of three-dimensional coordinate axes for expressing the position information, and
- rotate the three-dimensional coordinate axes so that the second device is located on one axis among the coordinate axes.

15. The apparatus of claim 12, wherein the at least one processor is configured to:
- determine the first part of the position information based on a pre-defined initial value or a predetermined position coordinate value of the terminal.

16. The apparatus of claim 12, wherein the at least one processor is further configured to:
- update the first part of the position information based on the second part.

17. The apparatus of claim 12, wherein the at least one processor is further configured to:
- transmit, to the terminal, the first part and the second part of the position information.

* * * * *